United States Patent
Li et al.

(10) Patent No.: US 11,963,032 B2
(45) Date of Patent: Apr. 16, 2024

(54) TRAFFIC ROUTING METHOD, APPARATUS, AND SYSTEM

(71) Applicant: HUAWEI TECHNOLOGIES CO., LTD., Guangdong (CN)

(72) Inventors: Yongcui Li, Beijing (CN); Ao Lei, Beijing (CN); Hui Ni, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 49 days.

(21) Appl. No.: 17/738,782

(22) Filed: May 6, 2022

(65) Prior Publication Data

US 2022/0264356 A1    Aug. 18, 2022

Related U.S. Application Data

(63) Continuation of application No. PCT/CN2019/116803, filed on Nov. 8, 2019.

(51) Int. Cl.
    *H04W 28/02*   (2009.01)
    *H04L 47/20*   (2022.01)
    *H04L 47/2483* (2022.01)

(52) U.S. Cl.
    CPC ......... *H04W 28/0236* (2013.01); *H04L 47/20* (2013.01); *H04L 47/2483* (2013.01)

(58) Field of Classification Search
    CPC . H04L 47/20; H04L 47/2483; H04W 28/0236
    See application file for complete search history.

(56) References Cited

U.S. PATENT DOCUMENTS

| 11,172,405 | B2* | 11/2021 | Kim ............... H04M 15/8044 |
| 2015/0319078 | A1 | 11/2015 | Lee et al. |
| 2015/0358235 | A1* | 12/2015 | Zhang ............... H04L 45/745 370/230 |

(Continued)

FOREIGN PATENT DOCUMENTS

| CN | 109275160 A | 1/2019 |
| CN | 109428909 A | 3/2019 |
| WO | 2018232759 A1 | 12/2018 |

OTHER PUBLICATIONS

3GPP TS 23.501 V16.2.0 (Sep. 2019), "3rd Generation Partnership Project; Technical Specification Group Services and System Aspects; System Architecture for the 5G System (5GS); Stage 2 (Release 16)," Sep. 2019, 389 pages.

(Continued)

*Primary Examiner* — Chi H Pham
*Assistant Examiner* — Weibin Huang
(74) *Attorney, Agent, or Firm* — Fish & Richardson P.C.

(57) ABSTRACT

The present disclosure provides example traffic routing methods, apparatuses, and systems. One example method includes determining, by a session management network element, a routing rule, where the routing rule indicates a first traffic steering entity to send a first traffic to a first function entity, or send a second traffic to a second function entity or an access device, where the first traffic is a traffic on which first traffic steering control is to be performed, and the second traffic is a traffic on which the first traffic steering control has been performed. The routing rule is sent by the session management network element to the first traffic steering entity in a session management process.

20 Claims, 30 Drawing Sheets

(56) References Cited

U.S. PATENT DOCUMENTS

| | | | |
|---|---|---|---|
| 2018/0192390 A1 | 7/2018 | Li et al. | |
| 2018/0192471 A1* | 7/2018 | Li | H04W 4/60 |
| 2019/0014454 A1* | 1/2019 | Garcia Martin | H04L 12/1425 |
| 2019/0109721 A1 | 4/2019 | Qiao et al. | |
| 2019/0268232 A1* | 8/2019 | Garcia Azorero | H04L 47/20 |
| 2019/0274178 A1* | 9/2019 | Salkintzis | H04W 76/15 |
| 2020/0136911 A1* | 4/2020 | Assali | H04L 67/1008 |
| 2020/0351254 A1* | 11/2020 | Xiong | H04L 12/4633 |
| 2021/0368397 A1 | 11/2021 | Sun et al. | |

OTHER PUBLICATIONS

3GPP TS 23.502 V16.2.0 (Sep. 2019), "3rd Generation Partnership Project; Technical Specification Group Services and System Aspects; Procedures for the 5G System (5GS); Stage 2 (Release 16)," Sep. 2019, 524 pages.

China Mobile, "23.503: PCF provides local traffic routing policy to SMF based on AF request," 3GPP TSG-SA2 Meeting #135, S2-1909158, Split, Croatia, Oct. 14-18, 2019, 15 pages.

Huawei, "Traffic Steering Control support of Provisioning of PCC rules," 3GPP TSG-CT WG3 Meeting #97, C3-183846, Osaka, Japan, May 21-24, 2018, 5 pages.

PCT International Search Report and Written Opinion issued in International Application No. PCT/CN2019/116803 dated Aug. 11, 2020, 13 pages (with English translation).

Extended European Search Report issued in European Application No. 19952041.2 dated Sep. 15, 2022, 11 pages.

* cited by examiner

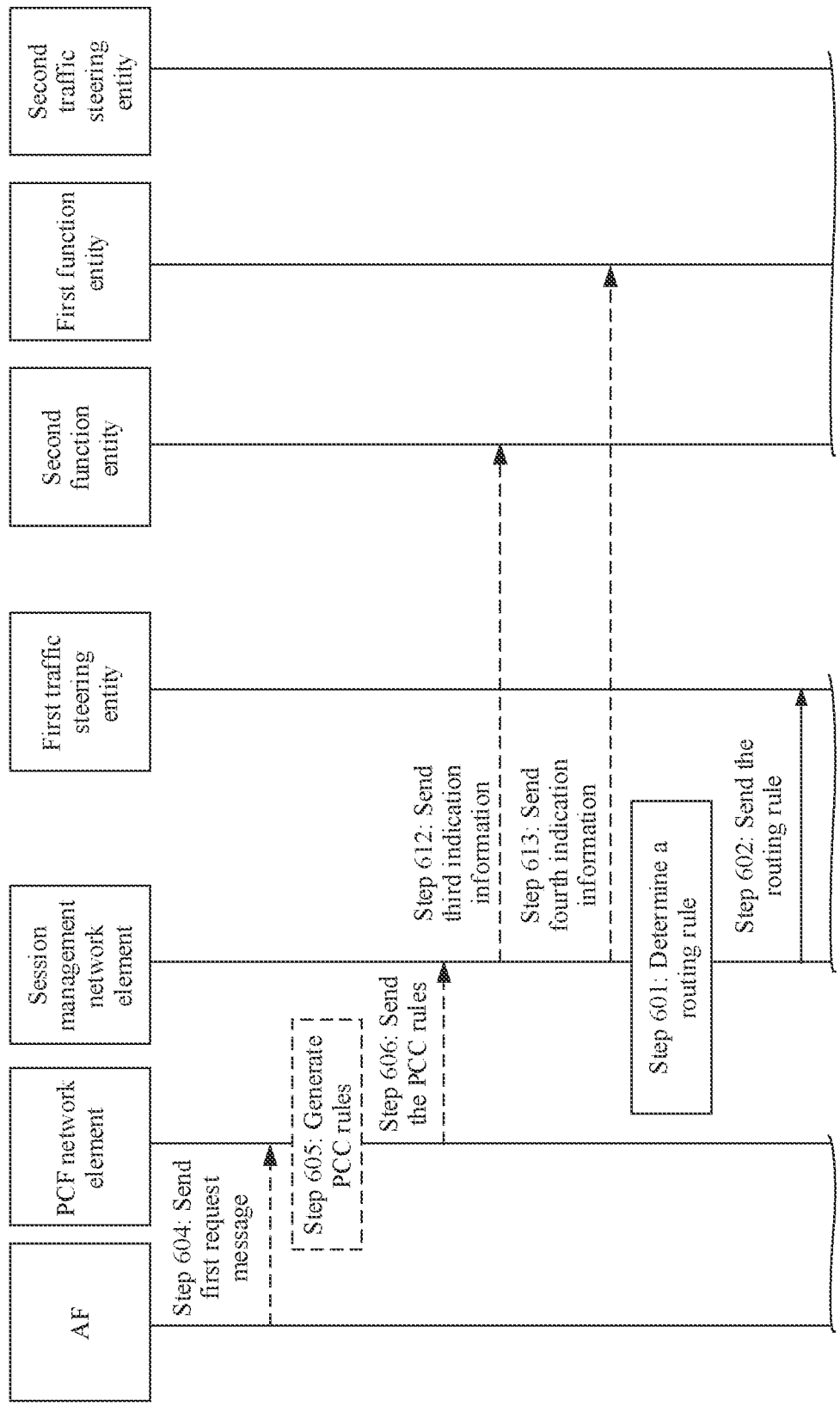

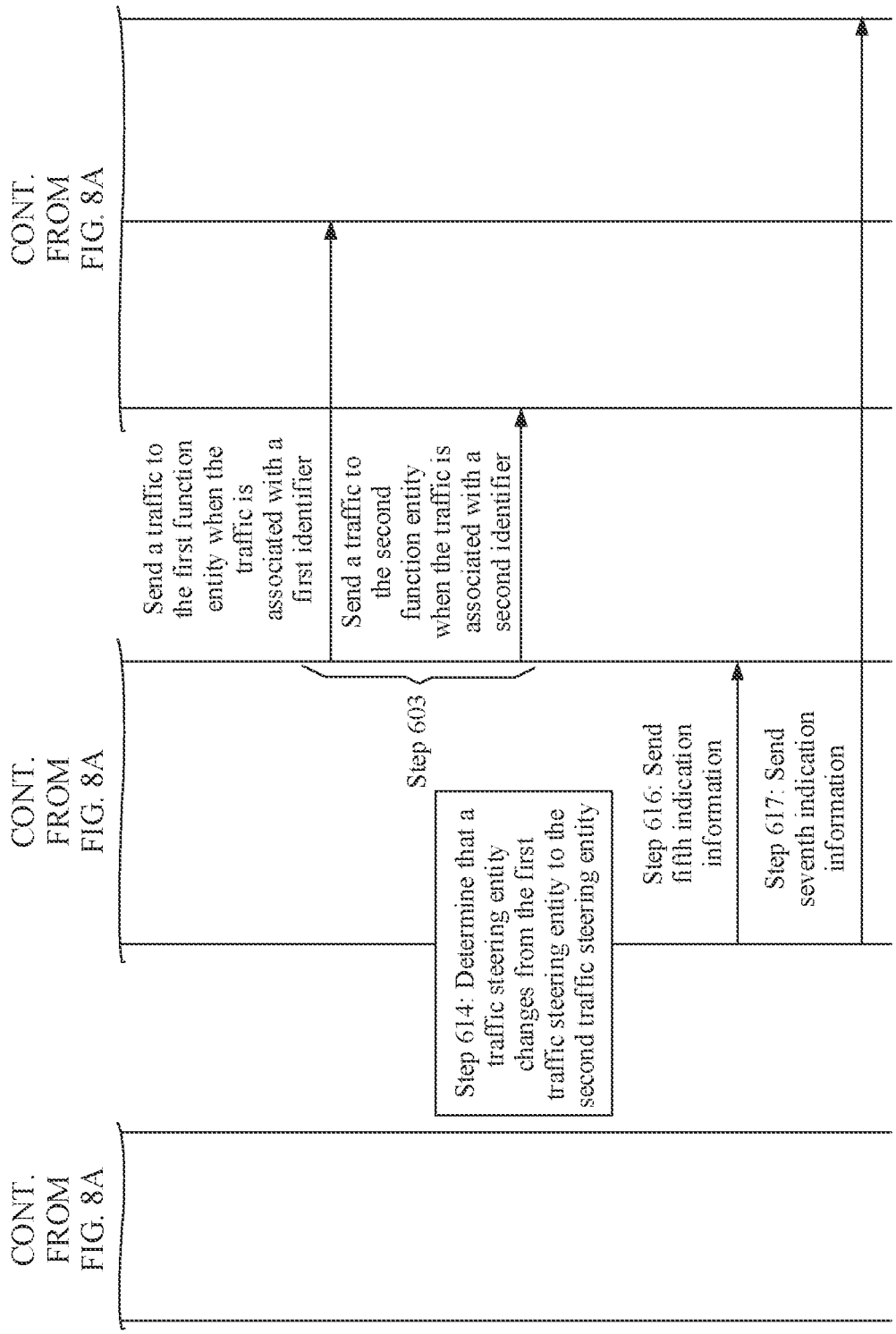

TRAFFIC ROUTING METHOD, APPARATUS, AND SYSTEM

CROSS-REFERENCE TO RELATED APPLICATIONS

This application is a continuation of International Application No. PCT/CN2019/116803, filed on Nov. 8, 2019. The disclosure of the aforementioned application is hereby incorporated by reference in its entirety.

TECHNICAL FIELD

Embodiments of this application relate to the field of communication technologies, and in particular, to a traffic routing method, an apparatus, and a system.

BACKGROUND

Rapid development of mobile communication promotes continuous emergence of various new services. In addition to a conventional mobile broadband and an internet of things, the mobile communication spawns a plurality of new application fields (for example, augmented reality (AR)/virtual reality (VR), an internet of vehicles, industrial control, and the interact of things (IoT)). In addition, higher requirements on performance such as network bandwidth and a latency are also posed, and network load is further increased.

To provide a better value-added service for a user, traffic steering control is introduced. The traffic steering control means that a traffic flow is enhanced by a series of ordered service function (SF) network elements. These SFs are located in a data network (DN). The SF may be a function network element deployed by an operator, or may be a function network element deployed by a third party.

As shown in FIG. 1, in a 4G network, a packet data network gateway (PGW) may perform traffic steering control on a received traffic according to a traffic steering policy. A specific process includes the following steps:

Step 1: A policy and charging rules function (PCRF) unit determines to activate traffic steering control for a traffic.

Step 2: The PCRF sends policy and charging control (PCC) rules to a policy and charging enforcement function (PCEF). The PCC rules include an identifier of the traffic and an identifier of the traffic steering policy. The PCEF is located in the PGW. An interface between the PGW and the PCRF is a Gx interface.

Step 3: The PGW sends, according to the traffic steering policy, the traffic determined based on the identifier of the traffic to each SF in a central DN, to perform traffic steering control.

In the 4G network, the traffic steering control is located between the PGW and the central DN. However, the PGW may be far away from a terminal. If the PGW sends the traffic to each SF to perform traffic steering control, a large latency may be caused.

SUMMARY

Embodiments of this application provide a traffic transmission method, an apparatus, and a system, to locally perform traffic steering control on a traffic and send the traffic to a central DN.

To achieve the foregoing objective, embodiments of this application provide the following technical solutions.

According to a first aspect, an embodiment of this application provides a traffic routing method, including: A session management network element determines a routing rule, where the routing rule is used to indicate a first traffic steering entity to send a first traffic to a first function entity, and/or send a second traffic to a second function entity or an access device, where the first traffic is a traffic on which first traffic steering control is to be performed, and the second traffic is a traffic on which the first traffic steering control has been performed. The session management network element sends the routing rule to the first traffic steering entity in a session management process.

This embodiment of this application provides the traffic routing method. In this method, the session management network element determines the routing rule, and sends the routing rule to the first traffic steering entity. In this way, the first traffic steering entity may perform, according to the routing rule, a corresponding forwarding action on a traffic that complies with the routing rule. For example, the first traffic steering entity may forward, to the first function entity, the first traffic recorded in the routing rule. Because the first traffic is usually a traffic on which the first traffic steering control is to be performed, an SF on a MEC platform corresponding to the first function entity may perform first traffic steering control on the first traffic. In addition, because the first function entity is usually deployed at a location close to a terminal, the first traffic steering control, such as video acceleration, firewall, and load balancing functions, may be performed on the first traffic as early as possible, so that the first traffic is processed as early as possible. For example, the firewall function may filter out an invalid traffic as early as possible. In addition, in this embodiment of this application, the first traffic steering entity may further send, to the second function entity or the access device, the second traffic recorded in the routing rule. This is because the second traffic is a traffic on which the first traffic steering control has been performed. In this way, after the first traffic steering control is performed on the traffic, the traffic may be sent back to the second function entity.

In a possible implementation, the routing rule includes: description information of the first traffic and information about the first function entity associated with the description information of the first traffic, and/or description information of the second traffic and information about the second function entity or access device associated with the description information of the second traffic. The description information includes source information of the first traffic or of the second traffic. The description information of the first traffic sent to the first function entity is indicated to the first traffic steering entity, so that the first traffic steering entity sends a received traffic to the first function entity when determining that description information of the received traffic is the same as the description information of the first traffic. The description information of the second traffic sent to the second function entity is indicated to the first traffic steering entity, so that the first traffic steering entity sends a received traffic to the second function entity or the access device when determining that description information of the received traffic is the same as the description information of the second traffic.

In a possible implementation, the routing rule includes one or both of the following information: when the description information of the first traffic indicates that the first traffic is from the access device or the second function entity, the first traffic steering entity sends the first traffic to the first function entity; or when the description information of the second traffic indicates that the second traffic is from the first function entity, the first traffic steering entity sends the second traffic to the access device or the second function entity.

In a possible implementation, the routing rule is used to indicate the first traffic steering entity to send the first traffic from a second specific tunnel to the first function entity, and/or indicate the first traffic steering entity to send the second traffic from a first specific tunnel to the second function entity. The second specific tunnel is located between the first traffic steering entity and the second function entity. The first specific tunnel is located between the first traffic steering entity and the first function entity. In this way, it is convenient for the first traffic steering entity to determine to send a traffic from a given specific tunnel to a corresponding function entity.

In a possible implementation, the method provided in this embodiment of this application further includes: The session management network element obtains one or both of first specific tunnel information used to establish the first specific tunnel and second specific tunnel information used to establish the second specific tunnel. This facilitates subsequent establishment of one or both of the first specific tunnel and the second specific tunnel.

In a possible implementation, the method provided in this embodiment of this application further includes: The session management network element sends the second specific tunnel information and a first forwarding rule to the second function entity, where the first forwarding rule is used to indicate the second function entity to transmit the first traffic to the first traffic steering entity through the second specific tunnel. The first forwarding rule and the first specific tunnel information are sent, so that the second function entity may subsequently transmit, to the first traffic steering entity through the first specific tunnel, the first traffic on which the traffic steering control is to be performed.

In a possible implementation, the method provided in this embodiment of this application further includes: The session management network element sends the first specific tunnel information and a second forwarding rule to the first function entity, where the second forwarding rule is used to indicate the first function entity to transmit the second traffic to the first traffic steering entity through the first specific tunnel. The second forwarding rule and the first specific tunnel information are sent, so that the first function entity may subsequently transmit, to the first traffic steering entity through the first specific tunnel, the second traffic on which the traffic steering control has been performed.

In a possible implementation, before the session management network element obtains one or both of the first specific tunnel information and the second specific tunnel information, the method provided in this embodiment of this application further includes: The session management network element sends first indication information to the first traffic steering entity, where the first indication information is used to indicate the first traffic steering entity to allocate one or both of the first specific tunnel information and the second specific tunnel information. Correspondingly, that the session management network element obtains one or both of first specific tunnel information and second specific tunnel information includes: The session management network element receives one or both of the first specific tunnel information and the second specific tunnel information from the first traffic steering entity. In other words, in addition to independently allocating one or both of the first specific tunnel information and the second specific tunnel information, the session management network element may alternatively obtain one or both of the first specific tunnel information and the second specific tunnel information from the first traffic steering entity.

In a possible implementation, the first traffic is associated with a first identifier, and the routing rule is used to indicate the first traffic steering entity to send the traffic associated with the first identifier to the first function entity; or the second traffic is associated with a second identifier, and the routing rule is used to indicate the first traffic steering entity to send the traffic associated with the second identifier to the second function entity.

In a possible implementation, the method provided in this embodiment of this application further includes: The session management network element sends, to the second function entity, third indication information used to indicate the second function entity to include the first identifier in a header of the first traffic.

In a possible implementation, the method provided in this embodiment of this application further includes: The session management network element sends, to the first function entity, fourth indication information used to indicate the first function entity to include the second identifier in a header of the second traffic.

In a possible implementation, the method provided in this embodiment of this application further includes: The session management network element determines that a traffic steering entity changes from the first traffic steering entity to a second traffic steering entity. The session management network element sends, to the second traffic steering entity, fifth indication information used to indicate the second traffic steering entity to perform any one or both of the following steps: sending a third traffic from the first traffic steering entity to the access device; or sending a fourth traffic from the second function entity to a third function entity corresponding to the second traffic steering entity. Traffic steering control has been performed on the third traffic, or the third traffic is a traffic on which the first traffic steering control has been performed. The fourth traffic is a traffic on which the first traffic steering control is to be performed. According to the method, when the traffic steering entity changes, the fourth traffic may be sent to the third function entity, to implement traffic steering control on the fourth traffic, and send, by the second traffic steering entity to the access device, the first traffic on which the traffic steering control has been performed.

In a possible implementation, the method provided in this embodiment of this application further includes: The session management network element determines that a traffic steering entity changes from the first traffic steering entity to a second traffic steering entity. The session management network element sends sixth indication information to the first traffic steering entity, where the sixth indication information is used to indicate the first traffic steering entity to send a fifth traffic from the second function entity to the second traffic steering entity. The session management network element sends seventh indication information to the second traffic steering entity, where the seventh indication information is used to indicate the second traffic steering entity to send the fifth traffic received by the second traffic steering entity to a third function entity corresponding to the second traffic steering entity. The fifth traffic is a traffic on which the first traffic steering control is to be performed. According to the method, when the traffic steering entity changes, the fifth traffic may be sent to the third function entity, so that a MEC platform corresponding to the third function entity performs traffic steering control on the fifth traffic.

In a possible implementation, the routing rule is further used to indicate the first traffic steering entity to send a sixth traffic to the access device or the second function entity, where the sixth traffic is a traffic on which the traffic steering control does not need to be performed.

In a possible implementation, the routing rule includes description information of the sixth traffic and information about the second function entity or access device associated with the description information of the sixth traffic.

According to a second aspect, an embodiment of this application provides a traffic transmission method, including: A first traffic steering entity receives a routing rule from a session management network element in a session management process of a session, where the routing rule is used to indicate a first traffic steering entity to send a first traffic to a first function entity, and/or send a second traffic to a second function entity or an access device, where the first traffic is a traffic on which first traffic steering control is to be performed, and the second traffic is a traffic on which the first traffic steering control has been performed. The first traffic steering entity transmits, according to the routing rule, a target traffic received by the first traffic steering entity.

In a possible implementation, the routing rule includes: description information of the first traffic and information about the first function entity associated with the description information of the first traffic, and/or description information of the second traffic and information about the second function entity or access device associated with the description information of the second traffic. The description information includes source information of the first traffic or of the second traffic.

In a possible implementation, that the first traffic steering entity transmits, according to the routing rule, a target traffic received by the first traffic steering entity includes: The first traffic steering entity sends the target traffic to the first function entity when description information of the target traffic is the same as the description information of the first traffic; and/or the first traffic steering entity sends the target traffic to the second function entity or the access device when the description information of the target traffic is the same as the description information of the second traffic.

In a possible implementation, the routing rule is used to indicate the first traffic steering entity to send the first traffic from a second specific tunnel to the first function entity, and/or indicate the first traffic steering entity to send the second traffic from a first specific tunnel to the second function entity, where the second specific tunnel is located between the first traffic steering entity and the second function entity, and the first specific tunnel is located between the first traffic steering entity and the first function entity.

In a possible implementation, that the first traffic steering entity transmits, according to the routing rule, a target traffic received by the first traffic steering entity includes: The first traffic steering entity sends the target traffic to the first function entity when the target traffic is from the second specific tunnel; or the first traffic steering entity sends the target traffic to the second function entity when the target traffic is from the first specific tunnel.

In a possible implementation, the method provided in this embodiment of this application further includes: The first traffic steering entity receives first indication information that is from the session management network element and that is used to indicate the first traffic steering entity to allocate one or both of first specific tunnel information and second specific tunnel information. The first specific tunnel information is used to establish the first specific tunnel. The second specific tunnel information is used to establish the second specific tunnel. The first traffic steering entity sends one or both of the first specific tunnel information and the second specific tunnel information to the session management network element.

In a possible implementation, the first traffic is associated with a first identifier, and the routing rule is used to indicate the first traffic steering entity to send the traffic associated with the first identifier to the first function entity; or the second traffic is associated with a second identifier, and the routing rule is used to indicate the first traffic steering entity to send the traffic associated with the second identifier to the second function entity.

In a possible implementation, that the first traffic steering entity transmits, according to the routing rule, a target traffic received by the first traffic steering entity includes: The first traffic steering entity sends the target traffic to the first function entity when the traffic is associated with the first identifier; or the first traffic steering entity sends the target traffic to the second function entity when the target traffic is associated with the second identifier.

In a possible implementation, the routing rule is further used to indicate the first traffic steering entity to send a third traffic to the access device or the second function entity, where the third traffic is a traffic on which the traffic steering control does not need to be performed in the session.

In a possible implementation, the routing rule includes description information of the third traffic and information about the second function entity or access device associated with the description information of the third traffic.

In a possible implementation, that the first traffic steering entity transmits, according to the routing rule, a target traffic received by the first traffic steering entity includes: The first traffic steering entity sends the target traffic to the second function entity or the access device when description information of the target traffic is the same as the description information of the third traffic.

According to a third aspect, an embodiment of this application provides a traffic transmission method, including: A session management network element obtains one or both of a first routing rule and a second routing rule, where the first routing rule is used to indicate a first function entity to send a second traffic to a second function entity through a specific tunnel between the first function entity and the second function entity. The second routing rule is used to indicate the second function entity to send a first traffic to the first function entity through the specific tunnel, where the first traffic is a traffic on which first traffic steering control is to be performed, and the second traffic is a traffic on which the first traffic steering control has been performed. The session management network element sends the first routing rule to the first function entity; and/or the session management network element sends the second routing rule to the second function entity.

In a possible implementation, the method provided in this embodiment of this application further includes: The session management network element obtains information used to establish the specific tunnel. The session management network element sends specific tunnel information to the first function entity or the second function entity.

In a possible implementation, before the session management network element obtains the information about the specific tunnel, the method provided in this embodiment of this application further includes: The session management network element sends, to the first function entity, first indication information used to indicate the first function entity to allocate the information used to establish the specific tunnel. Alternatively, the session management network element sends, to the second function entity, second indication information used to indicate the second function entity to allocate the information used to establish the specific tunnel.

According to a fourth aspect, an embodiment of this application provides a communication apparatus. The communication apparatus may implement the traffic routing method according to any one of the first aspect or the possible implementations of the first aspect, and therefore may also achieve beneficial effects of any one of the first aspect or the possible implementations of the first aspect. The communication apparatus may be a session management network element, or may be an apparatus that can support the session management network element in implementing any one of the first aspect or the possible implementations of the first aspect, for example, a chip used in the session management network element. The communication apparatus may implement the foregoing method by using software or hardware, or by executing corresponding software by using hardware.

In an example, the communication apparatus provided in this embodiment of this application includes: a processing unit, configured to determine a routing rule, where the routing rule is used to indicate a first traffic steering entity to send a first traffic to a first function entity, and/or send a second traffic to a second function entity or an access device, where the first traffic is a traffic on which first traffic steering control is to be performed, and the second traffic is a traffic on which the first traffic steering control has been performed; and a communication unit, configured to send the routing rule to the first traffic steering entity in a session management process of a session.

In a possible implementation, the routing rule includes: description information of the first traffic and information about the first function entity associated with the description information of the first traffic, and/or description information of the second traffic and information about the second function entity or access device associated with the description information of the second traffic. The description information includes source information of the first traffic or of the second traffic.

In a possible implementation, the routing rule includes one or both of the following information: when the description information of the first traffic indicates that the first traffic is from the access device or the second function entity, the first traffic steering entity sends the first traffic to the first function entity; or when the description information of the second traffic indicates that the second traffic is from the first function entity, the first traffic steering entity sends the second traffic to the access device or the second function entity.

In a possible embodiment, the routing rule is used to indicate the first traffic steering entity to send the first traffic from a second specific tunnel to the first function entity, and/or indicate the first traffic steering entity to send the second traffic from a first specific tunnel to the second function entity. The second specific tunnel is located between the first traffic steering entity and the second function entity, and the first specific tunnel is located between the first traffic steering entity and the first function entity.

In a possible implementation, the processing unit is further configured to obtain one or both of first specific tunnel information used to establish the first specific tunnel and second specific tunnel information used to establish the second specific tunnel.

In a possible implementation, the communication unit is further configured to send the second specific tunnel information and a first forwarding rule to the second function entity. The first forwarding rule is used to indicate the second function entity to transmit the first traffic to the first traffic steering entity through the second specific tunnel.

In a possible implementation, the communication unit is further configured to send the first specific tunnel information and a second forwarding rule to the first function entity. The second forwarding rule is used to indicate the first function entity to transmit the second traffic to the first traffic steering entity through the first specific tunnel.

In a possible implementation, before the processing unit is configured to obtain one or both of the first specific tunnel information and the second specific tunnel information, the communication unit is further configured to send first indication information to the first traffic steering entity, where the first indication information is used to indicate the first traffic steering entity to allocate one or both of the first specific tunnel information and the second specific tunnel information. The processing unit is specifically configured to receive one or both of the first specific tunnel information and the second specific tunnel information from the first traffic steering entity by using the communication unit.

In a possible implementation, the first traffic is associated with a first identifier, and the routing rule is used to indicate the first traffic steering entity to send the traffic associated with the first identifier to the first function entity; or the second traffic is associated with a second identifier, and the routing rule is used to indicate the first traffic steering entity to send the traffic associated with the second identifier to the second function entity.

In a possible implementation, the communication unit is further configured to send third indication information to the second function entity, where the third indication information is used to indicate the second function entity to include the first identifier in a header of the first traffic.

In a possible implementation, the communication unit is further configured to send fourth indication information to the first function entity, where the fourth indication information is used to indicate the first function entity to include the second identifier in a header of the second traffic.

In a possible implementation, the processing unit is further configured to determine that a traffic steering entity changes from the first traffic steering entity to a second traffic steering entity. The communication unit is further configured to send fifth indication information to the second traffic steering entity, where the fifth indication information is used to indicate the second traffic steering entity to perform any one or both of the following steps: sending a third traffic from the first traffic steering entity to the access device; or sending a fourth traffic from the second function entity to a third function entity corresponding to the second traffic steering entity. Traffic steering control has been performed on the third traffic, or the third traffic is a traffic on which the first traffic steering control has been performed. The fourth traffic is a traffic on which the first traffic steering control is to be performed.

In a possible implementation, the processing unit is further configured to determine that a traffic steering entity changes from the first traffic steering entity to a second traffic steering entity. The communication unit is further configured to send sixth indication information to the first traffic steering, entity. The sixth indication information is used to indicate the first traffic steering entity to send a fifth traffic from the second function entity to the second traffic steering entity. The session management network element sends seventh indication information to the second traffic steering entity, where the seventh indication information is used to indicate the second traffic steering entity to send the fifth traffic received by the second traffic steering entity to a third function entity corresponding to the second traffic steering entity. The fifth traffic is a traffic on which the first traffic steering control is to be performed.

In a possible implementation, the routing rule is further used to indicate the first traffic steering entity to send a sixth traffic to the access device or the second function entity. The sixth traffic is a traffic on which the traffic steering control does not need to be performed.

In another example, an embodiment of this application provides a communication apparatus. The communication apparatus may be a session management network element, or may be a chip in the session management network element. The communication apparatus may include a communication unit and a processing unit. When the communication apparatus is the session management network element, the communication unit may be a communication interface. The communication apparatus may further include a storage unit. The storage unit may be a memory. The storage unit is configured to store computer program code. The computer program code includes instructions. The processing unit may be a processor. The processing unit executes the instructions stored in the storage unit, so that the session management network element implements the traffic routing method according to any one of the first aspect or the possible implementations of the first aspect. When the communication apparatus is the chip in the session management network element, the processing unit may be a processor, and the communication unit may be collectively referred to as a communication interface. For example, the communication interface may be an input/output interface, a pin, a circuit, or the like. The processing unit executes computer program code stored in a storage unit, so that the session management network element implements the traffic routing method according to any one of the first aspect or the possible implementations of the first aspect. The storage unit may be a storage unit (for example, a register or a cache) in the chip, or may be a storage unit (for example, a read-only memory or a random access memory) that is in the session management network element and that is located outside the chip.

Optionally, the processor, the communication interface, and the memory are coupled to each other.

According to a fifth aspect, an embodiment of this application provides a communication apparatus. The apparatus may implement the traffic routing method according to any one of the second aspect or the possible implementations of the second aspect, and therefore may also achieve beneficial effects of any one of the second aspect or the possible implementations of the second aspect. The communication apparatus may be a first traffic steering entity, or may be an apparatus that can support the first traffic steering entity in implementing any one of the second aspect or the possible implementations of the second aspect, for example, a chip used in the first traffic steering entity. The communication apparatus may implement the foregoing method by using software or hardware, or by executing corresponding software by using hardware.

In an example, an embodiment of this application provides a communication apparatus, including: a communication unit, configured to receive a routing rule from a session management network element in a session management process of a session, where the routing rule is used to indicate to send a first traffic to a first function entity, and/or send a second traffic to a second function entity or an access device, where the first traffic is a traffic on which first traffic steering control is to be performed, and the second traffic is a traffic on which the first traffic steering control has been performed. The communication unit is further configured to transmit, according to the routing rule, a target traffic received by a first traffic steering entity.

In a possible implementation, the routing rule includes: description information of the first traffic and information about the first function entity associated with the description information of the first traffic, and/or description information of the second traffic and information about the second function entity or access device associated with the description information of the second traffic. The description information of the second traffic includes source information of the second traffic. The description information of the first traffic includes a source of the first traffic.

In a possible implementation, the communication unit is specifically configured to send the target traffic to the first function entity when description information of the target traffic is the same as the description information of the first traffic; and/or the communication unit is specifically configured to send the target traffic to the second function entity or the access device when description information of the target traffic is the same as the description information of the second traffic.

In a possible implementation, the routing rule is used to indicate to send the first traffic from a second specific tunnel to the first function entity, and/or indicate to send the second traffic from a first specific tunnel to the second function entity. The second specific tunnel is located between the apparatus and the second function entity. The first specific tunnel is located between the apparatus and the first function entity.

In a possible implementation, the communication unit is specifically configured to send the target traffic to the first function entity when the target traffic is from the second specific tunnel; or the communication unit is specifically configured to send the target traffic to the second function entity when the target traffic is from the first specific tunnel.

In a possible implementation, the communication unit is further configured to receive first indication information that is from the session management network element and that is used to indicate the first traffic steering entity to allocate one or both of first specific tunnel information used and second specific tunnel information. The first specific tunnel information is used to establish the first specific tunnel. The second specific tunnel information is used to establish the second specific tunnel. The communication unit is further configured to send one or both of the first specific tunnel information and the second specific tunnel information to the session management network element.

In a possible implementation, the first traffic is associated with a first identifier, and the routing rule is used to indicate to send the traffic associated with the first identifier to the first function entity; or the second traffic is associated with a second identifier, and the routing rule is used to indicate to send the traffic associated with the second identifier to the second function entity.

In a possible implementation, the communication unit is specifically configured to send the target traffic to the first function entity when the target traffic is associated with the first identifier; or the communication unit is specifically configured to send the target traffic to the second function entity when the target traffic is associated with the second identifier.

In another example, an embodiment of this application provides a communication apparatus. The apparatus may be a first traffic steering entity, or may be a chip in the first traffic steering entity. The communication apparatus may include a communication unit and a processing unit. When the communication apparatus is the first traffic steering entity, the communication unit may be a communication interface. The communication apparatus may further include a storage unit. The storage unit may be a memory. The storage unit is configured to store computer program code. The computer program code includes instructions. The processing unit may be a processor. The processing unit executes the instructions stored in the storage unit, so that the first traffic steering entity implements the traffic routing method according to any one of the second aspect or the possible implementations of the second aspect. When the communication apparatus is the chip in the first traffic steering entity, the processing unit may be a processor, and the communication unit may be collectively referred to as a communication interface. For example, the communication interface may be an input/output interface, a pin, a circuit, or the like. The processing unit executes computer program code stored in a storage unit, so that the first traffic steering entity implements the traffic routing method according to any one of the second aspect or the possible implementations of the second aspect. The storage unit may be a storage unit (for example, a register or a cache) in the chip, or may be a storage unit (for example, a read-only memory or a random access memory) that is in the first traffic steering entity and that is located outside the chip.

Optionally, the processor, the communication interface, and the memory are coupled to each other.

According to a sixth aspect, an embodiment of this application provides a communication apparatus. The apparatus may implement the traffic routing method according to any one of the third aspect or the possible implementations of the third aspect, and therefore may also achieve beneficial effects of any one of the third aspect or the possible implementations of the third aspect. The communication apparatus may be a session management network element, or may be an apparatus that can support the session management network element in implementing any one of the third aspect or the possible implementations of the third aspect, for example, a chip used in the session management network element. The communication apparatus may implement the foregoing method by using software or hardware, or by executing corresponding software by using hardware.

In an example, an embodiment of this application provides a communication apparatus, including: a processing unit, configured to obtain one or both of a first routing rule and a second routing rule, where the first routing rule is used to indicate a first function entity to send a second traffic to a second function entity through a specific tunnel between the first function entity and the second function entity, and the second routing rule is used to indicate the second function entity to send a first traffic to the first function entity through the specific tunnel, where the first traffic is a traffic on which first traffic steering control is to be performed, and the second traffic is a traffic on which the first traffic steering control has been performed; and a communication unit, configured to: send the first routing rule to the first function entity; and/or send the second routing rule to the second function entity.

In a possible implementation, the processing unit is further configured to obtain information used to establish the specific tunnel. The communication unit is further configured to send specific tunnel information to the first function entity or the second function entity.

In a possible implementation, before the processing unit is further configured to obtain the information used to establish the specific tunnel, the communication unit is further configured to send, to the first function entity, first indication information used to indicate the first function entity to allocate the information used to establish the specific tunnel. Alternatively, the session management network element sends, to the second function entity, second indication information used to indicate the second function entity to allocate the information used to establish the specific tunnel.

In another example, an embodiment of this application provides a communication apparatus. The communication apparatus may be a session management network element, or may be a chip in the session management network element. The communication apparatus may include a communication unit and a processing unit. When the communication apparatus is the session management network element, the communication unit may be a communication interface. The communication apparatus may further include a storage unit. The storage unit may be a memory. The storage unit is configured to store computer program code. The computer program code includes instructions. The processing unit may be a processor. The processing unit executes the instructions stored in the storage unit, so that the session management network element implements the traffic routing method according to any one of the third aspect or the possible implementations of the third aspect. When the communication apparatus is the chip in the session management network element, the processing unit may be a processor, and the communication unit may be collectively referred to as a communication interface. For example, the communication interface may be an input/output interface, a pin, a circuit, or the like. The processing unit executes computer program code stored in a storage unit, so that the session management network element implements the traffic routing method according to any one of the third aspect or the possible implementations of the third aspect. The storage unit may be a storage unit (for example, a register or a cache) in the chip, or may be a storage unit (for example, a read-only memory or a random access memory) that is in the session management network element and that is located outside the chip.

Optionally, the processor, the communication interface, and the memory are coupled to each other.

According to a seventh aspect, an embodiment of this application provides a computer-readable storage medium. The computer-readable storage medium stores a computer program or instructions. When the computer program or the instructions are run on a computer, the computer is enabled to perform the method according to any one of the first aspect or the possible implementations of the first aspect.

According to an eighth aspect, an embodiment of this application provides a computer-readable storage medium. The computer-readable storage medium stores a computer program or instructions. When the computer program or the instructions are run on a computer, the computer is enabled to perform the method according to any one of the second aspect or the possible implementations of the second aspect.

According to a ninth aspect, an embodiment of this application provides a computer-readable storage medium. The computer-readable storage medium stores a computer program or instructions. When the computer program or the instructions are run on a computer, the computer is enabled to perform the method according to any one of the third aspect or the possible implementations of the third aspect.

According to a tenth aspect, an embodiment of this application provides a computer program product including instructions. When the instructions are run on a computer, the computer is enabled to perform the method according to any one of the first aspect or the possible implementations of the first aspect.

According to an eleventh aspect, an embodiment of this application provides a computer program product including instructions. When the instructions are run on a computer, the computer is enabled to perform the method according to any one of the second aspect or the possible implementations of the second aspect.

According to a twelfth aspect, an embodiment of this application provides a computer program product including instructions. When the instructions are run on a computer, the computer is enabled to perform the method according to any one of the third aspect or the possible implementations of the third aspect.

According to a thirteenth aspect, an embodiment of this application provides a communication apparatus. The communication apparatus includes a processor and a storage medium. The storage medium stores instructions. When the instructions are run by the processor, the method according to any one of the first aspect or the possible implementations of the first aspect is implemented.

According to a fourteenth aspect, an embodiment of this application provides a communication apparatus. The communication apparatus includes a processor and a storage medium. The storage medium stores instructions. When the instructions are run by the processor, the method according to any one of the second aspect or the possible implementations of the second aspect is implemented.

According to a fifteenth aspect, an embodiment of this application provides a communication apparatus. The communication apparatus includes a processor and a storage medium. The storage medium stores instructions. When the instructions are run by the processor, the method according to any one of the third aspect or the possible implementations of the third aspect is implemented.

According to a sixteenth aspect, an embodiment of this application provides a communication apparatus, including at least one processor and a communication interface. The at least one processor and the communication interface are interconnected by using a line, the at least one processor is coupled to a memory, the memory is configured to store a computer program or instructions, and the at least one processor is configured to execute the computer program or the instructions in the memory, so that the communication apparatus performs the method according to any one of the first aspect or the possible implementations of the first aspect.

According to a seventeenth aspect, an embodiment of this application provides a communication apparatus, including at least one processor and a communication interface. The at least one processor and the communication interface are interconnected by using a line, the at least one processor is coupled to a memory, the memory is configured to store a computer program or instructions, and the at least one processor is configured to execute the computer program or the instructions in the memory, so that the communication apparatus performs the method according to any one of the second aspect or the possible implementations of the second aspect.

According to an eighteenth aspect, an embodiment of this application provides a communication apparatus, including at least one processor and a communication interface. The at least one processor and the communication interface are interconnected by using a line, the at least one processor is coupled to a memory, the memory is configured to store a computer program or instructions, and the at least one processor is configured to execute the computer program or the instructions in the memory, so that the communication apparatus performs the method according to any one of the third aspect or the possible implementations of the third aspect.

In a possible implementation, the apparatus according to any one of the sixteenth aspect, the seventeenth aspect, or the eighteenth aspect may further include the memory.

According to a nineteenth aspect, an embodiment of this application provides a chip. The chip includes at least one processor and a communication interface. The communication interface is coupled to the at least one processor, and the at least one processor is configured to run a computer program or instructions, to implement the method according to any one of the first aspect or the possible implementations of the first aspect. The communication interface is configured to communicate with another module other than the chip.

According to a twentieth aspect, an embodiment of this application provides a chip. The chip includes at least one processor and a communication interface. The communication interface is coupled to the at least one processor, and the at least one processor is configured to run a computer program or instructions, to implement the method according to any one of the second aspect or the possible implementations of the second aspect. The communication interface is configured to communicate with another module other than the chip.

According to a twenty-first aspect, an embodiment of this application provides a chip. The chip includes at least one processor and a communication interface. The communication interface is coupled to the at least one processor, and the at least one processor is configured to run a computer program or instructions, to implement the method according to any one of the third aspect or the possible implementations of the third aspect. The communication interface is configured to communicate with another module other than the chip.

The chip provided in this embodiment of this application may further include a memory, and the memory is configured to store the computer program or the instructions.

According to a twenty-second aspect, an embodiment of this application provides a communication apparatus. The communication apparatus includes one or more modules, configured to implement the methods according to the first aspect, the second aspect, and the third aspect, and the one or more modules may correspond to the steps in the methods according to the first aspect, the second aspect, and the third aspect.

According to a twenty-third aspect, an embodiment of this application provides a communication apparatus, including at least one processor. The at least one processor is coupled to a memory, the memory is configured to store a computer program or instructions, and the at least one processor is configured to execute the computer program or the instructions in the memory, so that the communication apparatus performs the method according to any one of the first aspect or the possible implementations of the first aspect.

According to a twenty-fourth aspect, an embodiment of this application provides a communication apparatus, including at least one processor. The at least one processor is coupled to a memory, the memory is configured to store a computer program or instructions, and the at least one processor is configured to execute the computer program or the instructions in the memory, so that the communication apparatus performs the method according to any one of the second aspect or the possible implementations of the second aspect.

According to a twenty-fifth aspect, an embodiment of this application provides a communication apparatus, including at least one processor. The at least one processor is coupled to a memory, the memory is configured to store a computer program or instructions, and the at least one processor is configured to execute the computer program or the instructions in the memory, so that the communication apparatus performs the method according to any one of the third aspect or the possible implementations of the third aspect.

According to a twenty-sixth aspect, an embodiment of this application provides a communication system. The communication system includes the communication apparatus according to any one of the fourth aspect or the possible implementations of the fourth aspect, and the communication apparatus according to any one of the fifth aspect or the possible implementations of the fifth aspect.

In an optional implementation, the communication system may further include a first function entity, a second function entity, and an access device.

Specifically, for specific steps performed by each communication apparatus in the communication system, refer to the corresponding descriptions. Details are not described herein again.

According to a twenty-seventh aspect, an embodiment of this application provides a communication system. The communication system includes the communication apparatus according to any one of the sixth aspect or the possible implementations of the sixth aspect.

In an optional implementation, the communication system may further include a first function entity, a second function entity, and an access device.

Specifically, for specific steps performed by each communication apparatus in the communication system, refer to the corresponding descriptions. Details are not described herein again.

For beneficial effects of the second aspect to the twenty-seventh aspect and the implementations thereof in this application, refer to analysis of beneficial effects of the first aspect and the implementations thereof. Details are not described herein again.

BRIEF DESCRIPTION OF DRAWINGS

FIG. 8A and FIG. 8B are a schematic flowchart 3 of a traffic routing method according to an embodiment of this application;

FIG. 11A and FIG. 11B to FIG. 17 are each a specific schematic flowchart of a traffic routing method according to an embodiment of this application;

DESCRIPTION OF EMBODIMENTS

Figure 1:
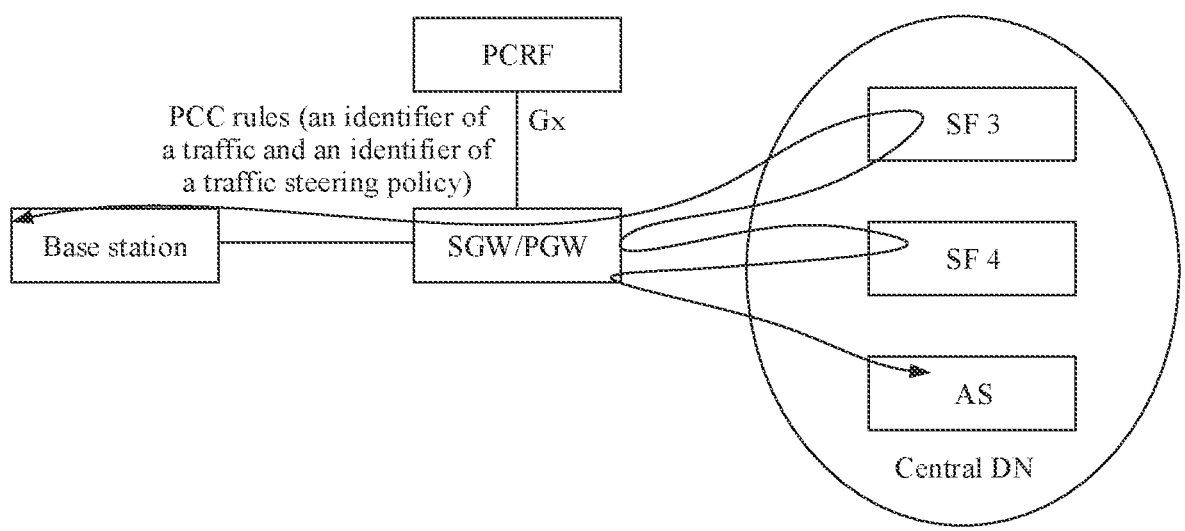
FIG. 1 is a schematic diagram of a system architecture for performing traffic steering control on a traffic in a conventional technology according to an embodiment of this application.

In this application, "of", "relevant", and "corresponding" may be used interchangeably in some cases. It should be noted that meanings expressed by "of", "relevant", and "corresponding" are consistent when a difference between the terms is not emphasized.

To clearly describe the technical solutions in embodiments of this application, terms such as "first" and "second" are used in embodiments of this application to distinguish between same items or similar items that provide basically same functions and purposes. For example, a first function entity and a second function entity are merely intended to distinguish between different function entities, and do not limit a sequence of the first function entity and the second function entity. A person skilled in the art may understand that the terms such as "first" and "second" do not limit a quantity and an execution sequence, and the terms such as "first" and "second" do not indicate a definite difference either.

It should be noted that in this application, the word such as "example" or "for example" is used to indicate giving an example, an illustration, or a description. Any embodiment or design solution described by using "example" or "for example" in this application shall not be construed as being more preferred or more advantageous than another embodiment or design solution. Exactly, use of the term such as "example" or "for example" is intended to present a related concept in a specific manner.

A system architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of a new service scenario, the technical solutions provided in embodiments of this application are also applicable to similar technical problems.

In this application, "at least one" means one or more, and "a plurality of" means two or more. The term "and/or" describes an association relationship between associated objects and indicates that three relationships may exist. For example, A and/or B may represent the following cases: Only A exists, both A and B exist, and only B exists, where A and B may be singular or plural. The character "/" usually indicates an or relationship between the associated objects.

"At least one item (piece) of the following" or a similar expression thereof means any combination of these items, including a singular item (piece) or any combination of plural items (pieces). For example, at least one of a, b, or c may indicate: a; b; c; a and b; a and c; b and c; or a, b, and c; where a, b, and c may be singular or plural.

A system architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of a new service scenario, the technical solutions provided in embodiments of this application are also applicable to similar technical problems. In embodiments of this application, an example in which a provided method is applied to an NR system or a 5G network is used for description.

Before embodiments of this application are described, related terms used in this application are first explained.

(1) Traffic steering control means that an SF performs corresponding processing on a traffic on a MEC platform or in a DN, for example, performs one or more of the following processing: a firewall function, a video acceleration processing function, or a load balancing function.

(2) Local traffic steering control means that a MEC platform corresponding to an L-PSA (corresponding to a first function entity) performs traffic steering control on a traffic.

(3) A traffic on which first traffic steering control is to be performed may mean that the traffic has not been processed by the SF on the MEC platform, or a traffic on which the local traffic steering control has not been performed. However, the traffic may have been processed by an SF in a DN corresponding to a PSA (corresponding to a second function entity), or may not be processed by the SF in the DN corresponding to the PSA (corresponding to the second function entity).

(4) A traffic on which the first traffic steering control has been performed may mean that the traffic has been processed by the SF on the MEC platform.

(5) An uplink traffic is a traffic that is from a terminal or an access device 50 and whose destination address is a central DN. It should be noted that, that the destination address is the central DN means that the destination address is an address of an application server in the central DN. The application server corresponds to the traffic, and provides a corresponding application service for the terminal.

(6) A downlink traffic is a traffic that is from the central DN and whose destination address is the terminal.

To effectively meet high bandwidth and low latency requirements required by rapid development of a mobile internet and an internet of things and reduce network load, the European Telecommunications Standards Institute (ETSI) proposed a mobile edge computing (MEC) technology in 2014. MEC is based on a 5G evolved architecture and is a technology that deeply integrates a base station and an interact service. The 3rd Generation Partnership Project (3rd Generation Partnership Project, 3GPP) initiated MEC-related projects in both a radio access network (RAN) 3 workgroup and a service and architecture (SA) 2 workgroup.

Figure 2A:
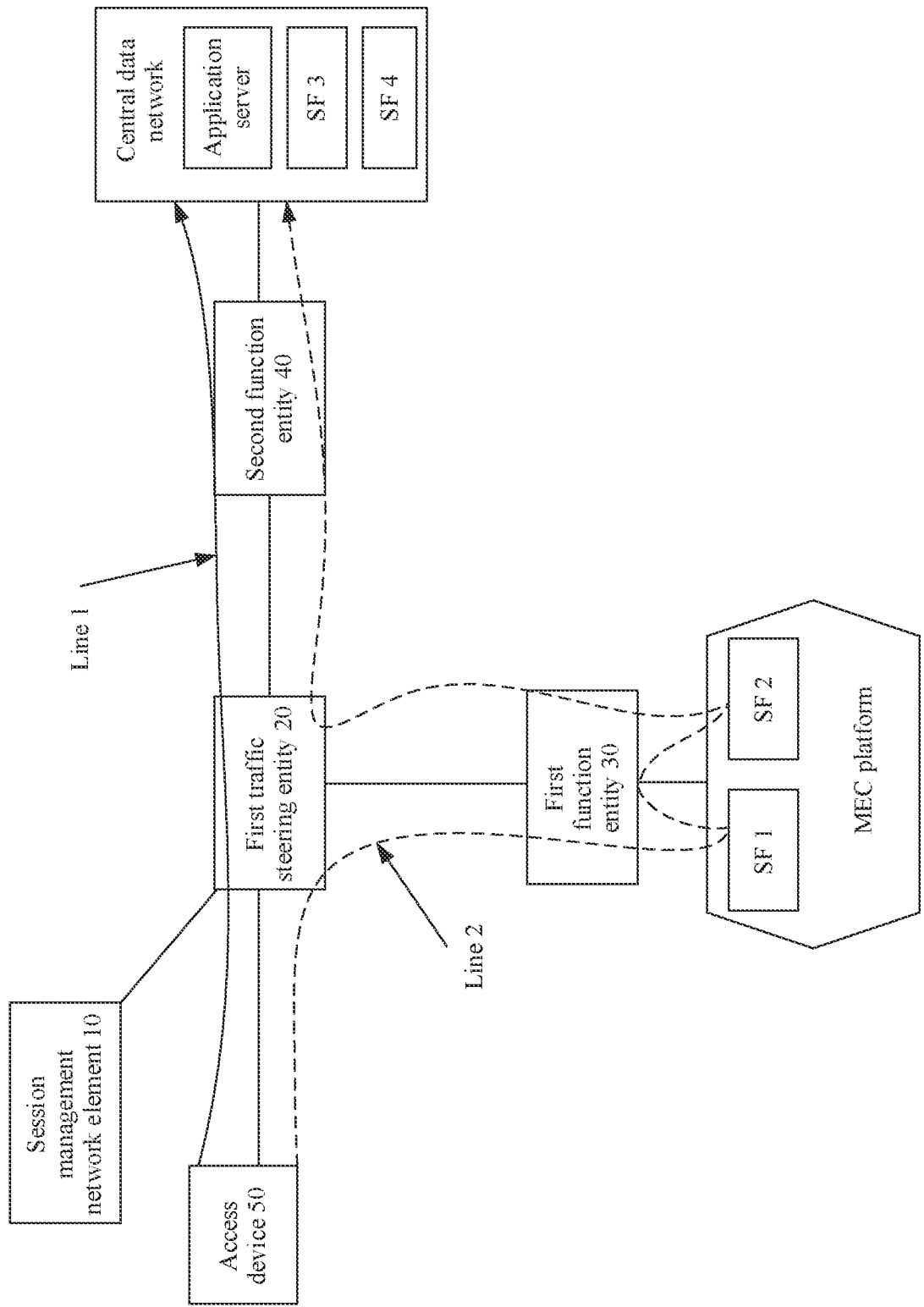
FIG. 2*a* to FIG. 2*f* are each a schematic diagram of an architecture of a communication system according to an embodiment of this application.

Based on the foregoing descriptions, FIG. 2a shows a communication system to which a traffic routing method according to an embodiment of this application is applicable. The communication system includes a session management network element 10, a first traffic steering entity 20, a first function entity 30, a second function entity 40, and an access device 50.

The access device 50 may communicate with the session management network element 10 via a mobility management network element. The session management network element 10 communicates with the first traffic steering entity 20, the first function entity 30, and the second function entity 40.

In this embodiment of this application, the first traffic steering entity 20 may steer some traffics to a local route, or determine to steer a traffic to a remote route.

The local route means that the first traffic steering entity 20 steers the traffics to the first function entity 30, and the first function entity 30 transmits the traffics to a MEC platform that communicates with the first function entity 30.

The remote route means that the first traffic steering entity 20 steers the traffic to the second function entity 40, and the second function entity 40 transmits the traffic to a data network (for example, a central data network (central DN)) that communicates with the second function entity 40.

To steer the traffics, the session management network element 10 may insert the first traffic steering entity 20 on a user plane path of a session as a traffic steering point. In other words, a network element or an entity corresponding to the first traffic steering entity 20 may be a network element capable of steering traffics of the session. For example, the first traffic steering entity 20 may be an uplink classifier (UL CL) or a branching point (BP) network element.

In an optional communication system, the communication system may further include a MEC platform communicating with the first function entity 30 and a central DN communicating with the second function entity 40. The MEC platform includes one or more SFs (for example, an SF 1 and an SF 2). The one or more SFs may be function network elements deployed by an operator, or may be function network elements deployed by a third party. The SF may perform enhanced processing or filtering processing on a traffic. For example, the SF may be a network element having a firewall function, a network element having a video acceleration processing function, a network element having a load balancing function, or the like. The central DN includes an application server (AS) and one or more SFs (for example, an SF 3 and an SF 4).

For example, the one or more SFs deployed in the central DN each may be a network element having a load balancing function or a charging function. Different SFs may have a same function or different functions. This is not limited in this embodiment of this application.

As shown by a line 1 (representing an uplink traffic 1) and a line 2 (representing an uplink traffic 2) in FIG. 2a, the uplink traffic 1 is a traffic on which local traffic steering control does not need to be performed. The uplink traffic 2 is a traffic on which the local traffic steering control is to be performed.

For example, processing performed by the first traffic steering entity 20 on the uplink traffic 1 may be described as follows: The first traffic steering entity 20 sends the uplink traffic 1 to the second function entity 40. The first traffic steering entity 20 sends the uplink traffic 2 to the first function entity 30. It is assumed that the local traffic steering control does not need to be performed on a downlink traffic 1, and the local traffic steering control has been performed on a downlink traffic 2. Processing performed by the first traffic steering entity 20 on the downlink traffics may be described as follows: The first traffic steering entity 20 aggregates the downlink traffic 1 and the downlink traffic 2 to an N3 tunnel (namely, a tunnel between the first traffic steering entity 20 and the access device 50), and sends the downlink traffics to the access device 50. Then, the access device 50 sends the downlink traffics to a terminal.

As shown in FIG. 2a, it is assumed that the uplink traffic 2 (identified by the line 2) is processed by the SF 1 and the SF 2 on the MEC platform. A specific processing process is described as follows: The first function entity 30 sends the uplink traffic 2 to the SF 1; the SF 1 sends the uplink traffic 2 back to the first function entity 30 after processing the uplink traffic 2; the first function entity 30 sends the uplink traffic 2 processed by the SF 1 to the SF 2; and the SF 2 sends the uplink traffic 2 to the first function entity 30 after processing the uplink traffic 2. Alternatively, the SF 1 sends the uplink traffic 2 to SF 2 after processing the uplink traffic 2, the SF 2 sends the uplink traffic 2 back to the first function entity 30 after processing the uplink traffic 2, and the first function entity 30 sends, to the first traffic steering entity 20, the uplink traffic 2 on which traffic steering control has been performed. The first traffic steering entity 20 sends the uplink traffic 2 to the second function entity 40. Alternatively, after being processed by the SF 1 and the SF 2, the uplink traffic 2 is sent to the second function entity 40.

Further, remote traffic steering control is to be performed on the uplink traffic 2 after the uplink traffic 2 is transmitted to the second function entity 40. In this case, the uplink traffic 2 is processed by the SF 3 and the SF 4 in the central DN. A processing process of the second function entity 40 for the uplink traffic 2 is similar to a processing process of the first function entity 30 for the uplink traffic 2. For example, the second function entity 40 sends the uplink traffic 2 to the SF 3, and the SF 3 sends the uplink traffic 2 back to the second function entity 40 after processing the uplink traffic 2. The second function entity 40 sends the uplink traffic 2 to the SF 4, and the SF 4 sends the uplink traffic 2 back to the second function entity 40 after processing the uplink traffic 2. The second function entity 40 then sends the uplink traffic 2 to the AS. Another possible processing process is not described in this embodiment.

It should be noted that FIG. 2a is merely an example, and a specific sending manner of the traffic steering control is not limited. For example, another implementation of the traffic steering control is as follows: The second function entity 40 sends an uplink traffic to the SF 3, the SF 3 sends the uplink traffic to the SF 4 after processing the uplink traffic, and the SF 4 sends the uplink traffic to the AS after processing the uplink traffic.

In a possible implementation, the terminal accesses the communication system via the access device 50.

In embodiments of this application, terminals may be distributed in an entire wireless network, and each terminal may be static or mobile.

Figure 2B:
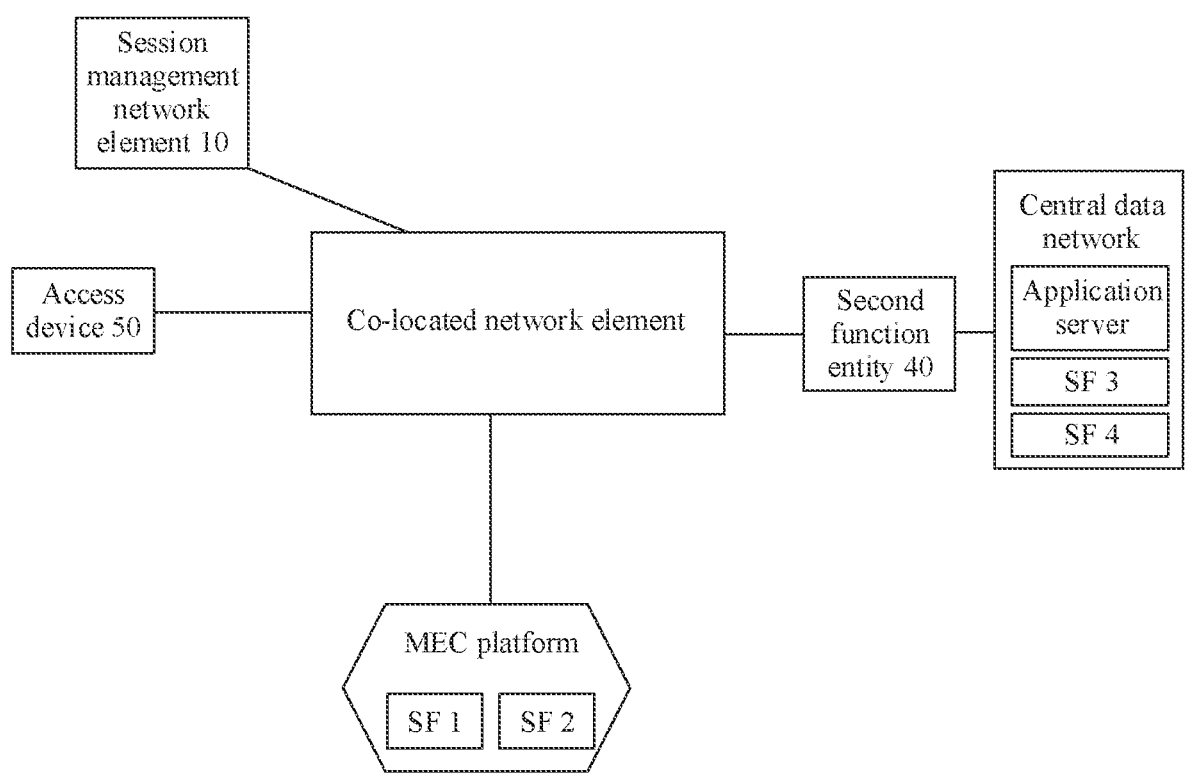

FIG. 2b shows another communication system according to an embodiment of this application. A difference between the communication system and the communication system shown in FIG. 2a lies in that: In FIG. 2a, the first traffic steering entity 20 and the first function entity 30 are independently deployed; but in FIG. 2b, a first traffic steering entity 20 and a first function entity 30 are deployed in a same device, and the device may be referred to as a co-located network element. That is, the co-located network element has both a traffic steering function and a function of sending, to a MEC platform, a traffic on which first traffic steering control is to be performed. When the first traffic steering entity 20 and the first function entity 30 are located in the same device, the first traffic steering entity 20 and the first function entity 30 may be independent modules or units in the co-located network element. Alternatively, the first traffic steering entity 20 is integrated with the function of sending, to the MEC platform, the traffic on which the first traffic steering control is to be performed, that is, the first function entity 30 is integrated into the first traffic steering entity 20.

Specifically, the co-located network element has the following functions: sending a traffic that complies with a rule 1 to the second function entity 40, and sending a traffic that complies with a rule 2 to the MEC platform. For specific content of the rule 1 and the rule 2, refer to the routing rules configured for the first traffic steering entity in the following embodiments.

Figure 2C:
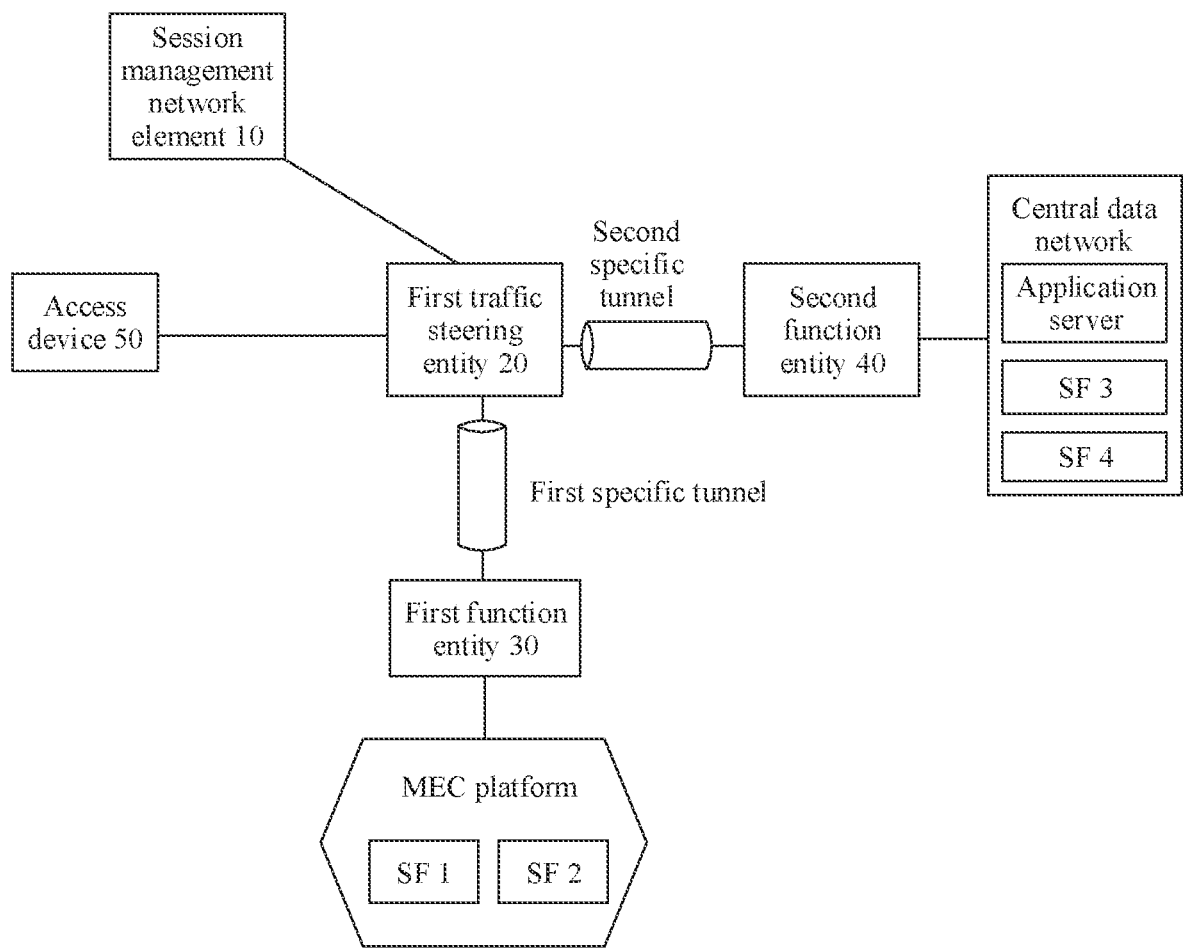

In a possible embodiment, with reference to FIG. 2a, as shown in FIG. 2c, there is a second specific tunnel between the first traffic steering entity 20 and the second function entity 40 in this embodiment of this application. There is a first specific tunnel between the first traffic steering entity 20 and the first function entity 30. The second specific tunnel is used to transmit a traffic on which first traffic steering control is to be performed. The first specific tunnel is used to transmit a traffic on which the first traffic steering control has been performed. It should be noted that, in this embodiment of this application, only the first specific tunnel may be established, only the second specific tunnel may be established, or both the first specific tunnel and the second specific tunnel may be established. Optionally, the first specific tunnel is used to transmit an uplink traffic, and the second specific tunnel is used to transmit a downlink traffic.

The specific tunnel in this embodiment of this application may also be referred to as a specific connection. The specific tunnel may be used to transmit a traffic on which the first traffic steering control has been performed or a traffic on which the first traffic steering control is to be performed. In the communication systems shown in FIG. 2a to FIG. 2f, in addition to the foregoing specific tunnels, there may be other tunnels or connections between network elements.

Figure 2D:
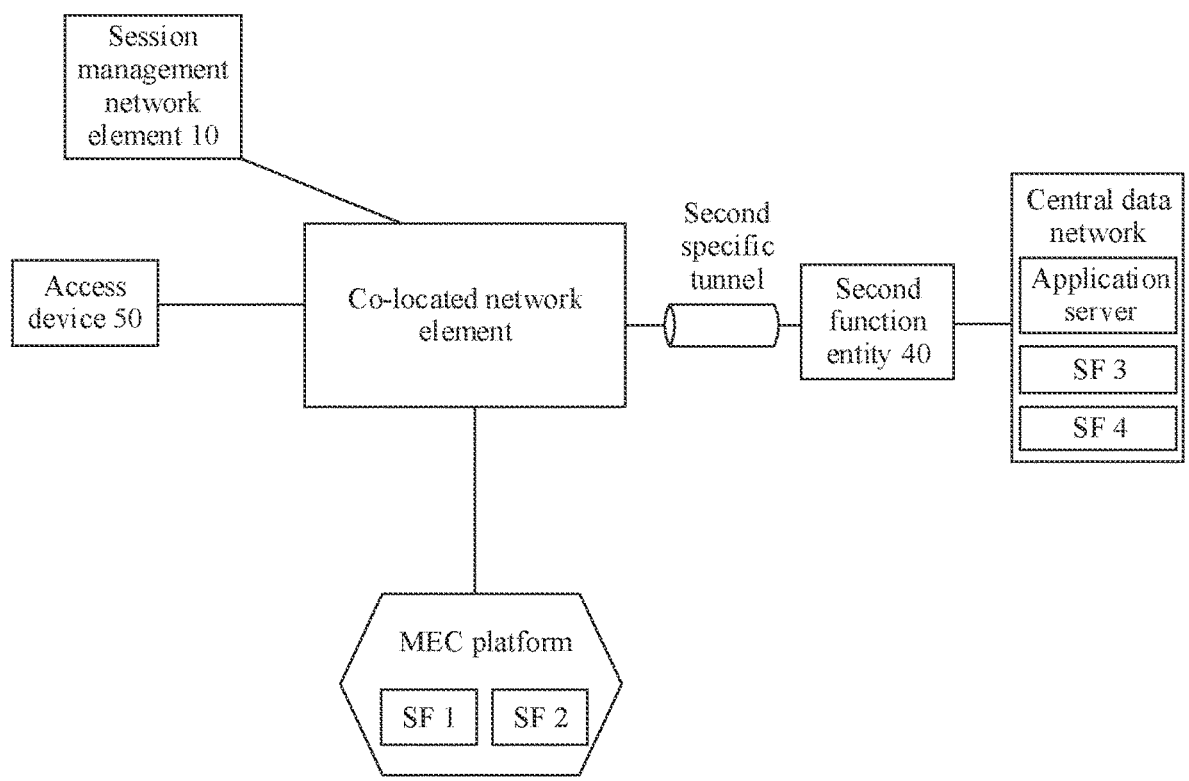

In a possible embodiment, with reference to FIG. 2b, as shown in FIG. 2d, there is a second specific tunnel between the co-located network element and the second function entity 40 in this embodiment of this application.

Figure 2E:
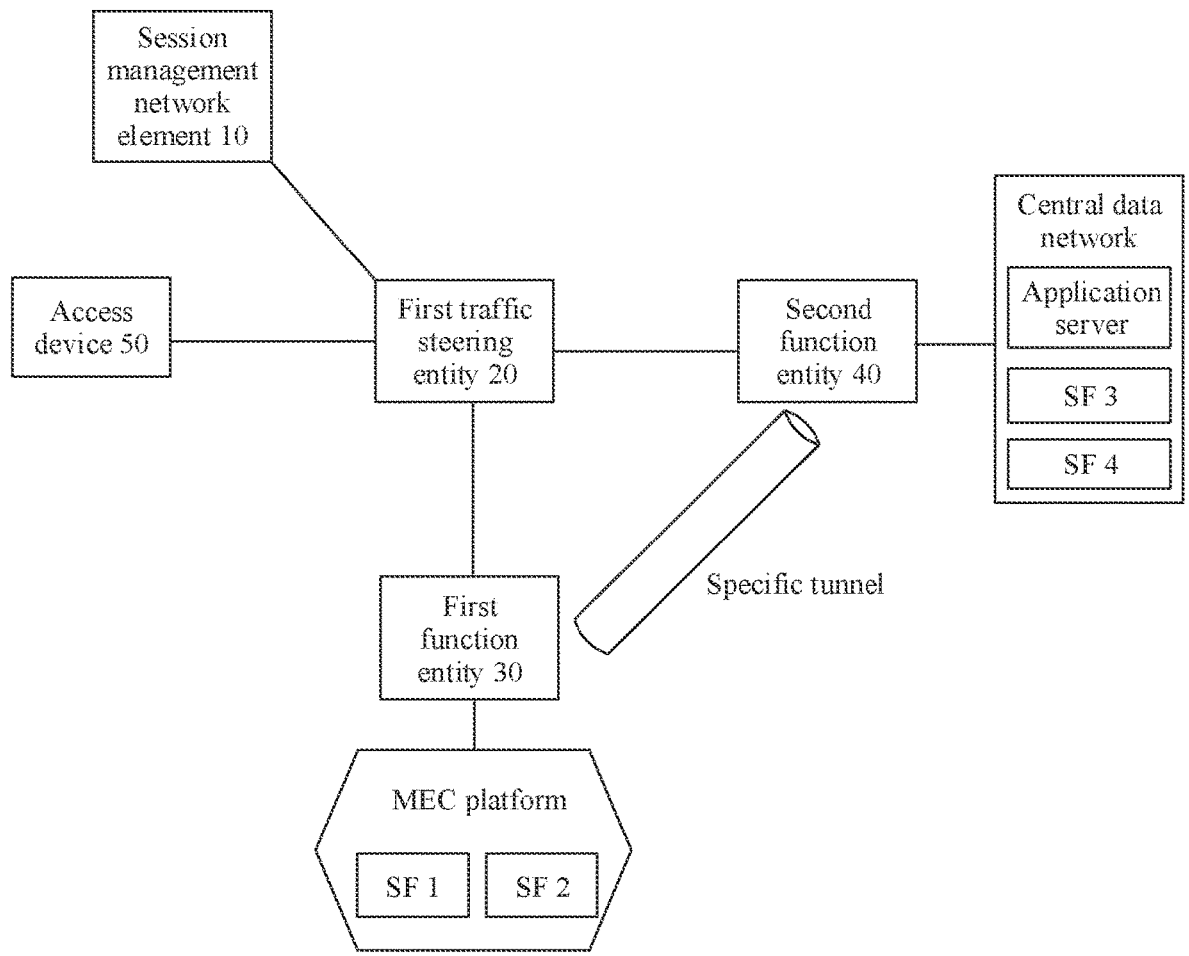
Figure 2F:
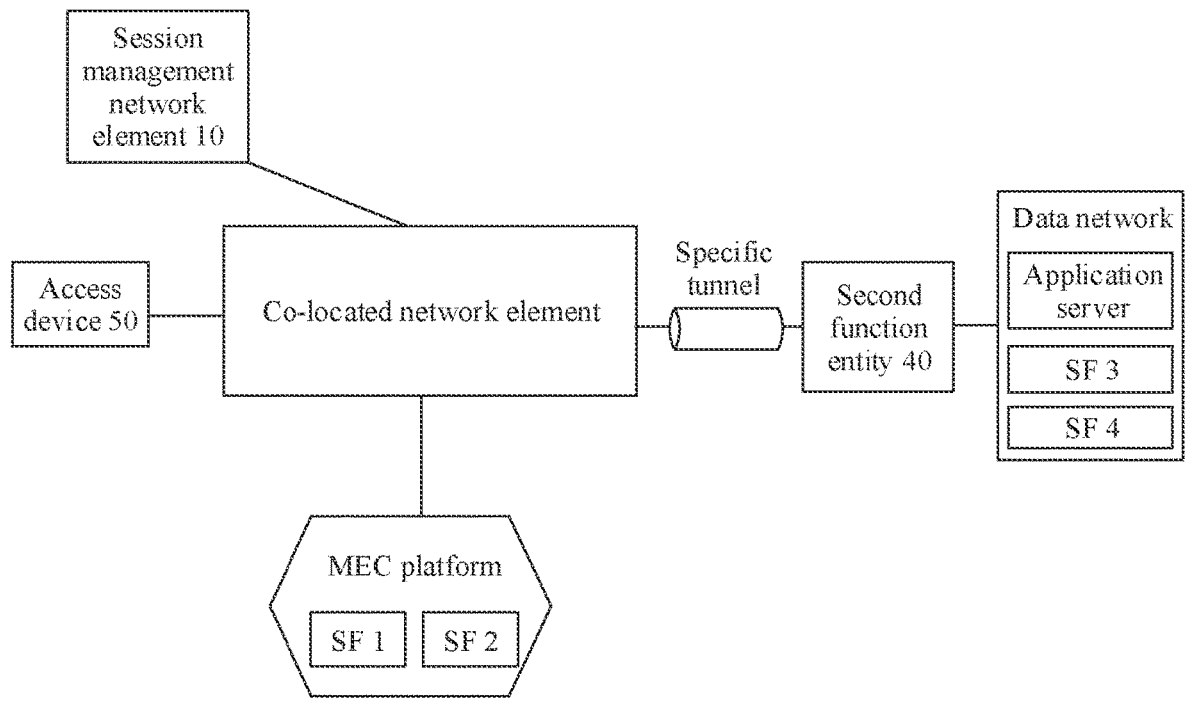

FIG. 2e or FIG. 2f shows another communication system according to an embodiment of this application. A difference between the communication system and the communication systems in FIG. 2a to FIG. 2d lies in that, in FIG. 2e, there is a specific tunnel between a second function entity 40 and a first function entity 30. The first function entity 30 may send, to the second function entity 40 through the specific tunnel, a traffic on which first traffic steering control has been performed. The second function entity 40 may send, to the first function entity 30 through the specific tunnel, a traffic on which the first traffic steering control is to be performed. The specific tunnel in FIG. 2f is located between a co-located network element and the second function entity 40.

It should be noted that, when the first traffic steering entity 20 and the first function entity 30 in embodiments of this application are located on the same device, because the first specific tunnel between the first traffic steering entity 20 and the first function entity 30 may be omitted, the second specific tunnel between the co-located network element and the second function entity 40 may be considered as the specific tunnel. In this case, the second specific tunnel may be used by the second function entity 40 to send the traffic on which the first traffic steering control is to be performed, and may also be used by the co-located network element to send, to the second function entity 40, the traffic on which the first traffic steering control has been performed.

It should be noted that, when there is the specific tunnel between the second function entity 40 and the first function entity 30, the first specific tunnel and the second specific tunnel may not exist, or may not exist. This is not limited in embodiments of this application.

In addition, in embodiments of this application, in the communication systems shown in FIG. 2*a* to FIG. 2*f*, there may also be a third specific tunnel and/or a fourth specific tunnel between the first traffic steering entity 20 and the access device 50. The access device 50 may send, to the first traffic steering entity 20 through the third specific tunnel or an existing tunnel between the access device 50 and the first traffic steering entity 20, the uplink traffic on which the traffic steering control is to be performed. The access device 50 may receive, through the fourth specific tunnel or the existing tunnel between the access device 50 and the first traffic steering entity 20, the downlink traffic that is sent by the first traffic steering entity 20 and on which the traffic steering control has been performed.

Certainly, when there is no third specific tunnel between the access device 50 and the first traffic steering entity 20, the access device 50 may send, to the first traffic steering entity 20 through the existing tunnel between the access device 50 and the first traffic steering entity 20, the traffic on which the first traffic steering control is to be performed. When there is no fourth specific tunnel between the access device 50 and the first traffic steering entity 20, the first traffic steering entity 20 may send, to the first traffic steering entity 20 through the existing tunnel between the access device 50 and the first traffic steering entity 20, the traffic on which the first traffic steering control has been performed.

Figure 3A:
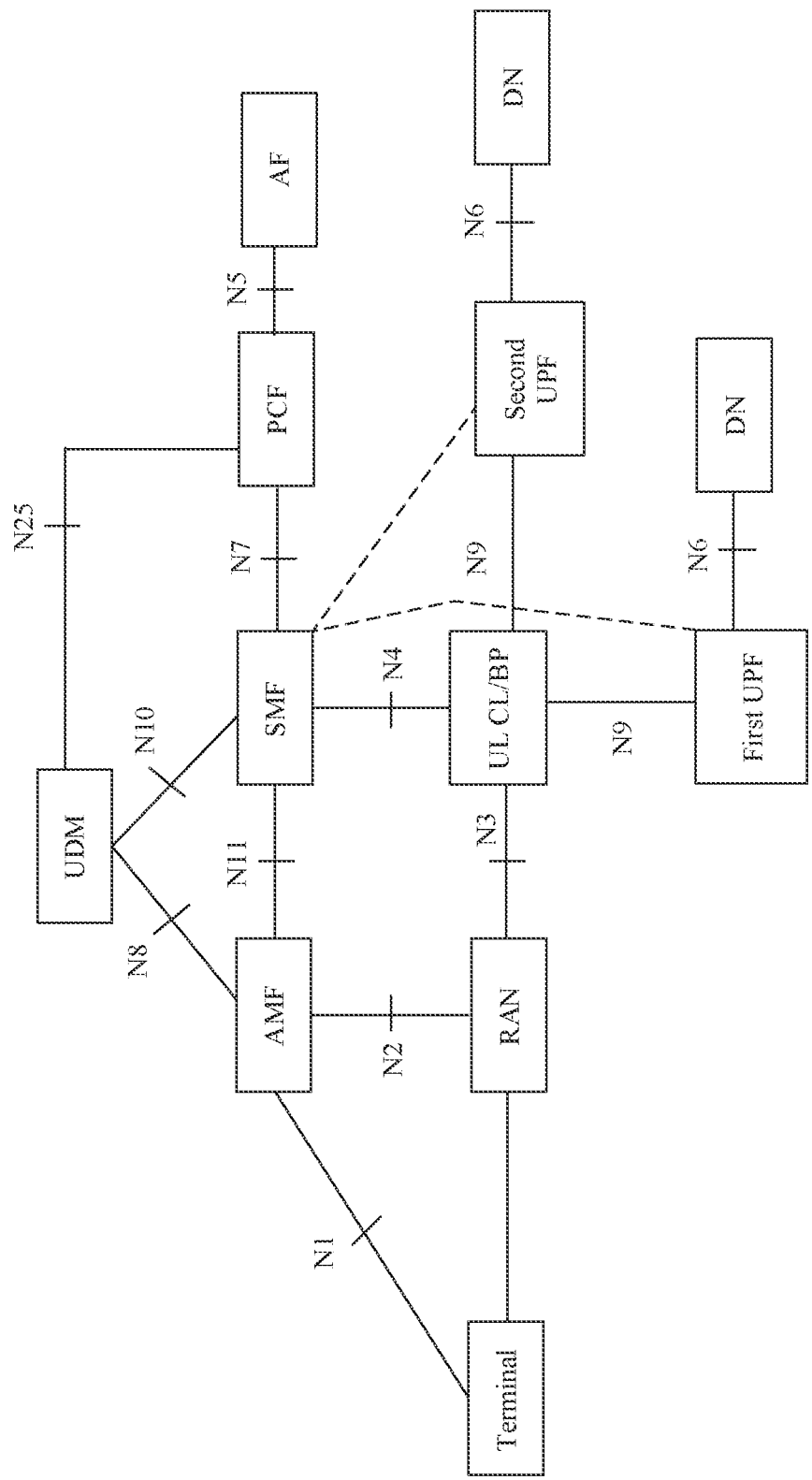
FIG. 3*a* and FIG. 3*b* are each a schematic diagram of a 5G architecture according to an embodiment of this application.
Figure 3B:
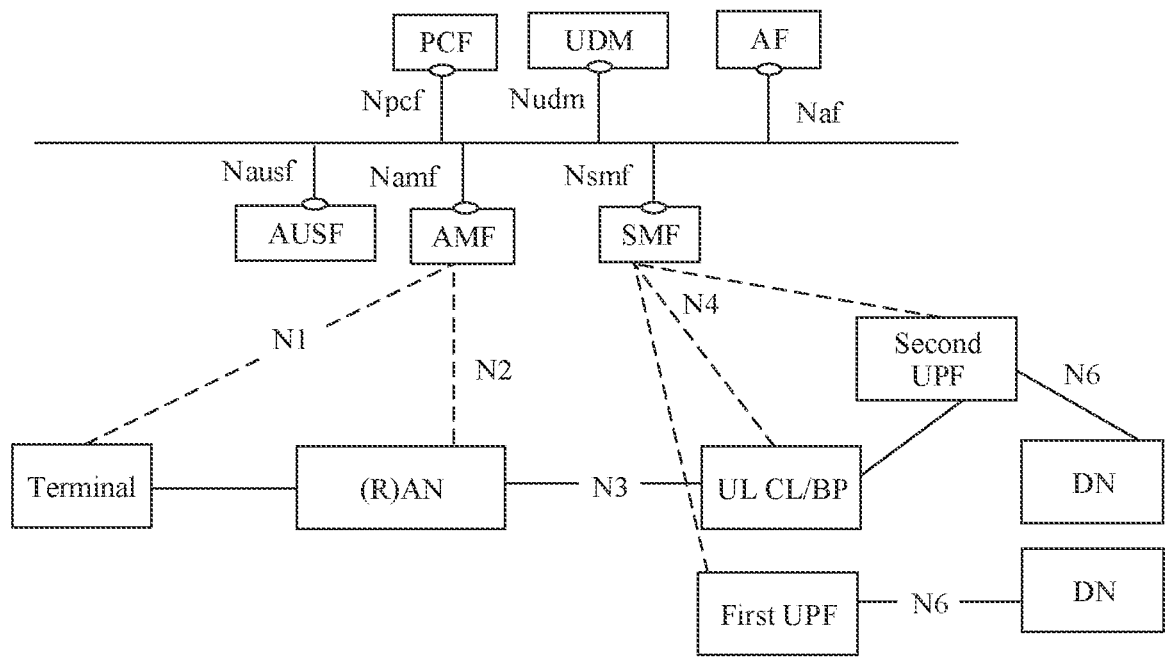

For example, if the communication system is applied to a 5G network, as shown in FIG. 3*a* or FIG. 3*b*, a network element or an entity corresponding to the first traffic steering entity 20 may be an uplink classifier (UL CL) or a branching point (BP). A network element or an entity corresponding to the session management network element 10 may be a session function management (SMF). A network element or an entity corresponding to the first function entity 30 may be a first user plane function (UPF) anchor, or may be referred to as a local session anchor (Local PDU session anchor, L-PSA). A network element or an entity corresponding to the second function entity 40 may be a second user plane function (UPF) anchor, or may be referred to as a remote session anchor (remote PDU session anchor, PSA for short). The access device 50 may be an access network (access network, AN) device or a radio access network (RAN) device.

In addition, as shown in FIG. 3*a* or FIG. 3*b*, a 5G network architecture may further include an access and mobility management function (AMF) network element, a policy control function (PCF) network element, an application function (AF) network element, a data network (DN), an authentication server function (AUSF) network element, a unified data repository (UDR) (not shown in FIG. 3*a* or FIG. 3*b*), a unified data management (UDM) network element, and the like. This is not specifically limited in embodiments of this application.

As shown in FIG. 3*a*, a terminal communicates with the AMF network element through a next generation (N1) network interface (N1 for short). The access device communicates with the AMF network element through an N2 interface (N2 for short). The access device communicates with the UL CL/BP through an N3 interface (N3 for short). The UL CL/BP communicates with the second UPF network element and the first UPF network element through an N9 interface. The first UPF network element communicates with a MEC platform through an N6 interface (N6 for short). The second UPF network element communicates with the DN through an N6 interface (N6 for short). Any two UPF network elements communicate with each other through an N9 interface (N9 for short). The UL CL/BP communicates with the SMF network element through an N4 interface (N4 for short). The AMF network element communicates with the SMF network element through an N11 interface (N11 for short). The AMF network element communicates with the UDM network element through an N8 interface (N8 for short). The SMF network element communicates with the PCF network element through an N7 interface (N7 for short). The SMF network element communicates with the UDM network element through an N10 interface (N10 for short). The AMF network element communicates with the AUSF network element through an N12 interface (N12 for short). The AMF network element communicates with the NSSF network element through an N22 interface (N22 for short). The AUSF network element communicates with the UDM network element through an N13 interface (N13 for short). The UDM network element communicates with the UDR network element. The PCF network element communicates with the UDR network element. The UL CL/BP can be implemented by using the UP.

FIG. 3*b* shows an architecture based on a service-based interface in a 5G network architecture. A difference between the architecture and that in FIG. 3*a* lies in that control plane network elements in a 5GC in FIG. 3*b* may also interact with each other through service-based interfaces. For example, the AMF network element, the AUSF network element, the SMF network element, the UDM network element, the UDR network element, and the PCF network element interact with each other through service-based interfaces. For example, an external service-based interface provided by the AMF network element may be Namf. An external service-based interface provided by the SMF network element may be Nsmf. An external service-based interface provided by the UDM network element may be Nudm. An external service-based interface provided by the UDR network element may be Nudr. An external service-based interface provided by the PCF network element may be Npcf. It should be understood that, for related descriptions of names of various service-based interfaces in FIG. 3*b*, refer to a diagram of a 5G system architecture in the standard 23.501. Details are not described herein.

It should be noted that names of interfaces between the network elements in FIG. 3*a* or FIG. 3*b* are merely examples, and the interfaces may have other names during specific implementation. This is not specifically limited in embodiments of this application.

It should be noted that the access device, the AF network element, the AMF network element, the SMF network element, the AUSF network element, the UDM network element, the UPF network element, the PCF network element, and the like in FIG. 3*a* or FIG. 3*b* are merely names, and the names do not constitute any limitation on the devices. In the 5G network and another future network, network elements corresponding to the access device, the AF network element, the AMF network element, the SMF network element, the AUSF network element, the UDM network element, the UPF network element, and the PCF network element may have other names. This is not specifically limited in embodiments of this application. For example, the UDM network element may alternatively be replaced with a home subscriber server (HSS), a user subscription database (USD), a database entity, or the like. A general description is provided herein, and details are not described again below.

The terminal, the (R)AN, the UPF, and the DN in FIG. 3a or FIG. 3b are usually referred to as network function entities at a user layer. Data traffic of the terminal may be transmitted by using a protocol data unit (PDU) session established between the terminal and the DN, and transmitted through two network functions (entities): the (R)AN and the UPF. The other parts are referred to as network functions and entities at a control layer, and are mainly responsible for functions such as authentication and authorization, registration management, session management, mobility management, and policy control. Therefore, the traffic at the user plane is transmitted reliably and stably. The PDU session in embodiments of this application refers to an association between the terminal and a data network that provides a PDU connectivity service (association between the UE and a Data. Network that provides a PDU connectivity service).

FIG. 3a and FIG. 3b show network architectures applied to embodiments of this application. The following separately describes functions of each part or network element in the network architectures in the 5G network by using examples.

As shown in FIG. 3a, a session of the terminal has a plurality of anchors (PDU session anchors), for example, a first UPF network element and a second UPF network element. For an uplink traffic (UL data/traffic), the BP/UL CL sends the received uplink traffic to different anchors according to a forwarding rule. For a downlink traffic (DL data/traffic), the BP/UL CL sends the downlink traffic to the terminal according to the forwarding rule.

(1) A terminal may include any type of handheld device, vehicle-mounted device, wearable device, or computing device that has a wireless communication function, or another processing device connected to a wireless modem; may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, relay user equipment, or the like. The relay user equipment may be, for example, a 5G residential gateway (RG). For ease of description, in this application, the devices mentioned above are collectively referred to as terminals.

It should be understood that the terminal in embodiments of this application may be a terminal device in the interact of things or a terminal in a plurality of vertical industry application fields such as a port, an intelligent factory, railway transportation, logistics, an unmanned aerial vehicle, and a driverless car, for example, a mobile robot, an automated guided vehicle (AGV), a driverless car, a control device and a sensor on a train, or a control device and a sensor deployed in a factory.

For example, in embodiments of this application, the terminal may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn by a user or integrated into clothes or an accessory of the user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs. The terminal may alternatively be a sensor device used in the factory.

(2) An access device is configured to provide a network access function for an authorized terminal in a specific area, and can use transmission tunnels with different quality based on a terminal level, a service requirement, and the like. The access device can manage a radio resource and provide an access service for the terminal device, to forward a control signal and terminal device data between the terminal device and a core network. The access device max also be understood as a base station in a conventional network. For example, the access device may be responsible for functions such as radio resource management, quality of service (QoS) management, and data compression and encryption on an air interface side.

The access device may be a device in a wireless network. The access device may also be referred to as a wireless access device or a network device. For example, the terminal is connected to a radio access network (RAN) node in the wireless network. Currently, some examples of the access device are: a next generation NodeB (gNB) in a 5th generation (5G) system, a transmission reception point (TRP), an evolved NodeB (eNB) in an LTE system, a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In a network structure, the network device may include a centralized unit (CU) node, a distributed unit (DU) node, or a RAN device including the CU node and the DU node. The access device may alternatively be a wireless backhaul device, a vehicle-mounted device, a wearable device, a network device in a future 5G network, a network device in a future evolved PLMN, or the like. In a 3rd generation (3G) system, the access device is referred to as a NodeB, or the like.

(3) A mobility management network element is a core network element, and is mainly responsible for signaling processing, for example, functions such as access control, mobility management, attachment and detachment, and gateway selection. When serving a session of the terminal, the mobility management network element provides control plane storage resources for the session, to store a session identifier, an SMF network element identifier associated with the session identifier, and the like.

In a 5G communication system, the mobility management network element may be an AMF network element. In a future communication system, the mobility management network element may still be an AMF network element, or may have another name. This is not limited in this application.

(4) A session management network element is responsible for user plane network element selection, user plane network element redirection, internet protocol (IP) address allocation, QoS control, and bearer establishment, modification, and release. The session management network element is configured to: manage a session, allocate and manage an interact protocol (IP) address of a terminal, select a termination point that can manage a user plane function and a policy control and charging function interface, notify downlink data, and the like.

In a 5G communication system, the session management network element may be an SMF network element. In a future communication system, the session management network element may still be an SMF network element, or may have another name. This is not limited in this application.

(5) A user plane network element is responsible for forwarding and receiving user data (for example, a traffic) in the terminal. The user plane network element may receive the user data from a data network, and transmit the user data to the terminal via the access device. Alternatively, the user plane network element may receive the user data from the terminal via the access device, and forward the user data to the data network. A transmission resource and a scheduling function in the user plane network element that provide a service for the terminal are managed and controlled by the session management network element.

In a 5G communication system, the user plane network element may be a UPF network element or a UPF module. In a future communication system, the user plane network element may still be a UPF network element or a UPF module, or may have another name. This is not limited in this application.

(6) An authentication server function network element mainly provides an authentication function, and supports authentication of 3GPP access and non-3GPP access. For details, refer to 3GPP TS 33.501.

In a future communication system, the authentication server function network element may still be an AUSF network element, or may have another name. This is not limited in this application.

(7) An NEF network element mainly supports secure interaction between a 3GPP network and a third-party application. The NEF network element can securely expose a network capability and an event to a third party, to enhance or improve application quality of service. The 3GPP network can also securely obtain related data from the third party, to enhance intelligent decision-making of the network. In addition, the network element supports restoring structured data from a unified data repository or storing structured data in a unified data repository.

(8) A UDR network element is mainly responsible for storing structured data Stored content includes subscription data and policy data, externally exposed structured data, and application-related data.

(9) An AF network element mainly supports interaction with a 3GPP core network to provide a service, for example, affect a data routing decision, provide a policy control function, or provide some third-party services for a network side.

(10) A network repository network element is configured to maintain real-time information of all network function services in a network. The NRF stores information about a deployed network function (NF) component, for example, an identifier and a network address of the NF component, an identifier of a supported network slice, or information about a data plane instance. The NRF provides services such as registration and discovery of the NF component for another NF component.

In a future communication system, the network repository network element may still be an NRF network element, or may have another name. This is not limited in this application.

It may be understood that the network elements or the functions may be network elements in a hardware device, software functions running on dedicated hardware, or virtualized functions instantiated on a platform (for example, a cloud platform).

(11) A data network (DN) is an operator network that provides a data transmission service for a terminal, for example, an IMS (IP Multi-media Service) or the Internet.

The terminal accesses the data network by establishing a session (PDU session) that is between the terminal and the DN and that passes through the RAN and the UPF.

Figure 4:
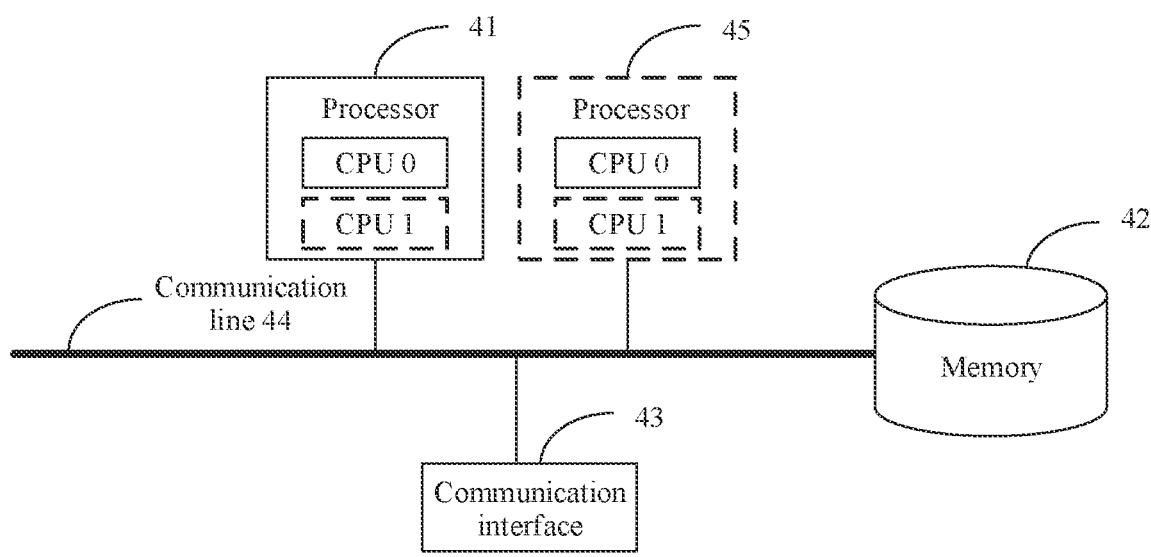
FIG. 4 is a schematic diagram of a structure of a communication device according to an embodiment of this application.

FIG. 4 is a schematic diagram of a hardware structure of a communication device according to an embodiment of this application. For structures of a session management network element 10, a first traffic steering entity 20, a first function entity 30, and a second function entity 40, refer to the structure shown in FIG. 4. The communication device includes a processor 41, a communication line 44, and at least one communication interface (where descriptions are provided merely by using an example in which the communication device includes a communication interface 43 in FIG. 4).

Optionally, the communication device may further include a memory 42.

The processor 41 may be a general-purpose central processing unit (CPU), a microprocessor, an application-specific integrated circuit (ASIC), or one or more integrated circuits configured to control program execution of the solutions of this application.

The communication line 44 may include a path for transferring information between the foregoing components.

The communication interface 43 is an apparatus using any transceiver, and is configured to communicate with another device or a communication network such as an Ethernet, a radio access network (RAN), or a wireless local area network (WLAN).

The memory 42 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory may exist independently, and is connected to the processor through the communication line 44. Alternatively, the memory may be integrated with the processor.

The memory 42 is configured to store computer-executable instructions for executing the solutions of this application, and the processor 41 controls the execution. The processor 41 is configured to execute the computer-executable instructions stored in the memory 42, to implement the traffic routing method provided in the following embodiments of this application.

Optionally, the computer-executable instructions in embodiments of this application may also be referred to as application program code. This is not specifically limited in embodiments of this application.

During specific implementation, in an embodiment, the processor 41 may include one or more CPUs, for example, a CPU 0 and a CPU 1 in FIG. 4.

During specific implementation, in an embodiment, the communication device may include a plurality of processors, such as the processor 41 and a processor 45 in FIG. 4. Each of the processors may be a single-core (single-CPU) processor, or a multi-core (multi-CPU) processor. The processor herein may be one or more devices, circuits, and/or processing cores configured to process data (for example, computer program instructions).

Figure 5:
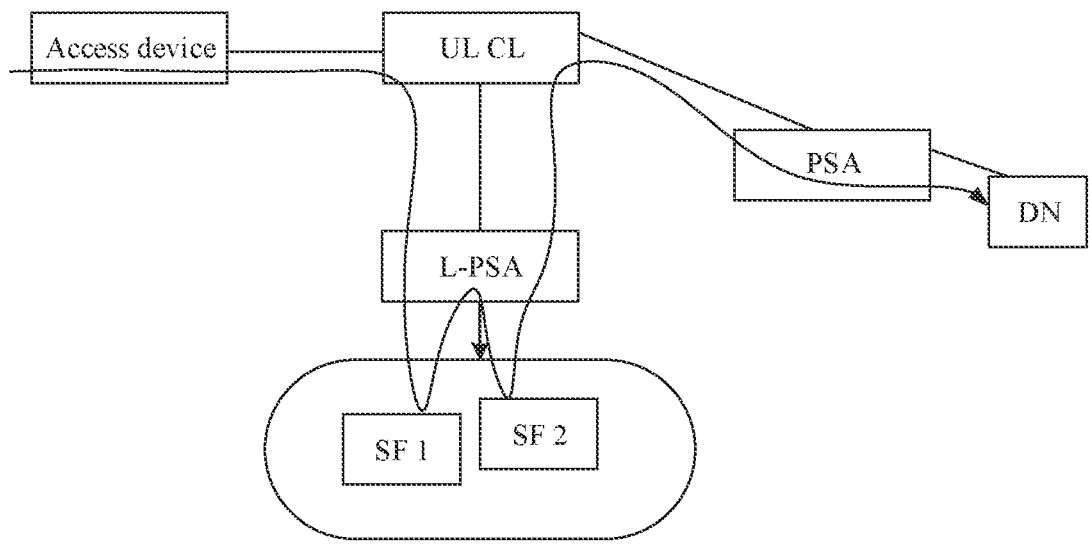
FIG. 5 is a schematic diagram of a traffic steering scenario according to an embodiment of this application.

As shown in FIG. 5, after a MEC platform is introduced, a UL CL/HP may steer a traffic to an L-PSA, the L-PSA sends the traffic to the MEC platform, and an SF on the MEC platform performs traffic steering control. However, after the SF on the MEC platform performs traffic steering control on the traffic, how to send the processed traffic to a central DN is a technical problem that urgently is to be resolved. In view of the technical problem in the method described by using the communication system shown in FIG. 5, the session management network element 10 in embodiments of this application may configure a routing rule for the UL CL/BP. In this way, the UL CL/BP may send, to a PSA according to the routing rule, a traffic that is described in the routing rule and that is from an L-PSA and points to the PSA. Similarly, for a downlink traffic, the UL CL/BP sends, to the L-PSA according to the routing rule, a traffic that is from an access device or the PSA and points to the L-PSA.

In embodiments of this application, a specific structure of a body for performing the traffic routing method is not specially limited in embodiments of this application, provided that the body can run a program recording code of the traffic routing method in embodiments of this application to perform communication according to the traffic routing method in embodiments of this application. For example, the traffic routing method provided in embodiments of this application may be performed by a function module that is in a session management network element and that can invoke and execute a program, or may be a communication apparatus, for example, a chip, used in the session management network element. The traffic routing method provided in embodiments of this application may be performed by a function module that is in a first traffic steering entity and that can invoke and execute a program, or may be a communication apparatus, for example, a chip, used in the first traffic steering entity. This is not limited in this application. The traffic routing method provided in embodiments of this application may be performed by a function module that is in a first function entity and that can invoke and execute a program, or may be a communication apparatus, for example, a chip, used in the first function entity. The traffic routing method provided in embodiments of this application may be performed by a function module that is in a second function entity and that can invoke and execute a program, or may be a communication apparatus, for example, a chip, used in the second function entity. The following embodiments are described by using an example in which the traffic routing method is performed by the session management network element, the first function entity, the first traffic steering entity, or the second function entity.

It should be noted that mutual reference may be made between embodiments of this application. For example, for same or similar steps, mutual reference may be made between method embodiments, apparatus embodiments, or system embodiments. This is not limited.

Figure 6:
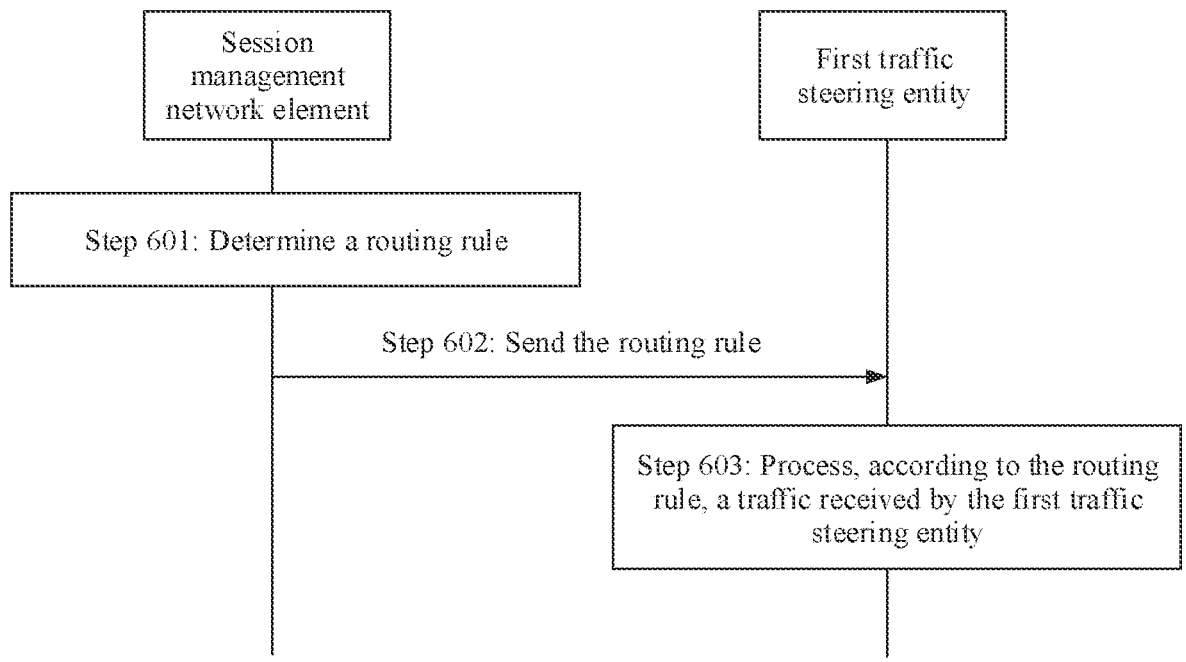
FIG. 6 is a schematic flowchart 1 of a traffic routing method according to an embodiment of this application.

With reference to FIG. 2a to FIG. 2d, as shown in FIG. 6, an embodiment of this application provides a traffic routing method. The method includes the following steps.

Step 601: The session management network element 10 determines a routing rule. The routing rule is used to indicate the first traffic steering entity 20 to send a first traffic to the first function entity 30, and/or send a second traffic to the second function entity 40 or the access device 50. The first traffic is a traffic on which first traffic steering control is to be performed, and the second traffic is a traffic on which the first traffic steering control has been performed. The first traffic steering control may correspond to the foregoing local traffic steering control.

It should be understood that the first traffic may represent one or more traffics that are in a session and on which the first traffic steering control is to be performed, and the second traffic may represent one or more traffics that are in a session and on which the first traffic steering control has been performed. The first traffic and the second traffic do not have an indicative meaning. The first traffic and the second traffic may be a same traffic, or may be different traffics. For example, after the traffic steering control is performed on the first traffic, the first traffic is a traffic on which the first traffic steering control has been performed. The first traffic and the second traffic may be traffics in a same session, or may be traffics in different sessions.

For example, the first traffic may represent a traffic 1 and a traffic 2 in the session. Both the traffic 1 and the traffic 2 are traffics on which the first traffic steering control is to be performed. The second traffic may represent the traffic 1 and a traffic 3 in the session. Both the traffic 1 and the traffic 3 are traffics on which the first traffic steering control has been performed.

It should be noted that, the first traffic steering entity 20 in this embodiment of this application has a function of steering a traffic, and the first traffic steering entity 20 may not need to determine whether the traffic steering control has been performed on the traffic, or determine that the traffic is a traffic on which the first traffic steering control is to be performed. Once a traffic received by the first traffic steering entity 20 complies with the routing rule, the first traffic steering entity 20 may forward the traffic according to the routing rule.

The first traffic in this embodiment of this application may be an uplink traffic that is in a session and that is from the terminal, and a destination address of the uplink traffic is the central DN corresponding to the second function entity 40. Alternatively, the first traffic may be a downlink traffic that is in a session and that is from the central DN corresponding to the second function entity 40. In this case, a destination address of the downlink traffic may be the terminal. When the first traffic is the downlink traffic that is in the session and that is from the central DN corresponding to the second function entity 40, an SF in the central DN corresponding to the second function entity 40 may have performed traffic steering control on the downlink traffic, but an SF on the MEC platform corresponding to the first function entity 30 still performs traffic steering control on the downlink traffic. Alternatively, the SF corresponding to the second function entity 40 may not perform traffic steering control on the downlink traffic, and only the SF on the MEC platform corresponding to the first function entity 30 performs traffic steering control on the downlink traffic. The SF in the central DN may be the same as or different from the SF on the MEC platform. This is not limited in this embodiment of this application.

The second traffic in this embodiment of this application may be an uplink traffic in a session, or may be a downlink traffic in the session. If the second traffic is a downlink traffic, the downlink traffic may be from the second function entity 40, or may be from the first function entity 30. In this case, the routing rule is used to indicate the first traffic steering entity 20 to send the second traffic to the access device 50. If the second traffic is an uplink traffic, the uplink traffic may be from the access device 50, or may be from the first function entity 30. In this case, the routing rule is used to indicate the first traffic steering entity 20 to send the second traffic to the second function entity 40. Whether the traffic is an uplink traffic or a downlink traffic may be identified with reference to a source address/destination address or a source port number/destination port number of the traffic. This is not limited in this embodiment of this application.

Step 602: The session management network element 10 sends the routing rule to the first traffic steering entity 20 in a session management process of the session, so that the first traffic steering entity 20 receives the routing rule from the session management network element 10 in the session management process of the session.

For example, the session management process may be a session establishment process, a session update (modification) process, or a session deletion process.

In a possible implementation, for example, the session management process is the session establishment process. In this case, step 602 may be specifically implemented in the following manner: The session management network element 10 sends an N4 session establishment request to the first traffic steering entity 20, where the session establishment request carries the routing rule.

In another possible implementation, for example, the session management process is the session establishment process or the session modification process. In this case, step 602 may be specifically implemented in the following manner: The session management network element 10 sends an N4 session modification request to the first traffic steering entity 20, where the session modification request carries the routing rule.

Certainly, the routing rule may alternatively be carried in a request message newly established in the session management process. Alternatively, the routing rule may be sent by the session management network element 10 to the first traffic steering entity 20 in any process before the first traffic steering entity 20 steers the first traffic or the second traffic. This is not limited in this embodiment of this application. Alternatively, the session management network element 10 may send the routing rule to the first traffic steering entity 20 in another process in which the session management network element 10 interacts with the first traffic steering entity 20.

Step 603: The first traffic steering entity 20 processes, according to the routing rule, a target traffic received by the first traffic steering entity 20.

This embodiment of this application provides the traffic routing method. In this method, the session management network element determines the routing rule, and sends the routing rule to the first traffic steering entity. In this way, the first traffic steering entity may perform, according to the routing rule, a corresponding forwarding action on a traffic that complies with the routing rule. For example, the first traffic steering entity may forward, to the first function entity, the first traffic recorded in the routing rule. Because the first traffic is usually a traffic on which the first traffic steering control is to be performed, an SF on a MEC platform corresponding to the first function entity may perform first traffic steering control on the first traffic. In addition, because the first function entity is usually deployed at a location close to a terminal, the first traffic steering control, such as video acceleration, firewall, and load balancing functions, may be performed on the first traffic as early as possible, so that the first traffic is processed as early as possible. For example, the firewall function may filter out an invalid traffic as early as possible. In addition, in this embodiment of this application, the first traffic steering entity may further send, to the second function entity or the access device, the second traffic recorded in the routing rule. This is because the second traffic is a traffic on which the first traffic steering control has been performed. In this way, after the first traffic steering control is performed on the traffic, the traffic may be sent back to the second function entity.

In a possible specific implementation, step 601 in this embodiment of this application may be implemented in the following manner: The session management network element 10 determines the routing rule based on policy information.

The policy information includes description information of the traffic on which the first traffic steering control is to be performed, and description information of the traffic on which the first traffic steering control has been performed.

In another possible embodiment of this application, before step 601, the method provided in this embodiment of this application may further include the following step: The session management network element 10 obtains the policy information (for example, PCC rules).

In an implementation, the policy information may be locally configured in the session management network element 10.

In another implementation, the session management network element 10 obtains the policy information from a PCF network element. This is not limited in this embodiment of this application.

For a specific manner of obtaining, by the session management network element 10, the policy information from the PCF network element, refer to the descriptions in step 604 to step 606.

Figure 7A:
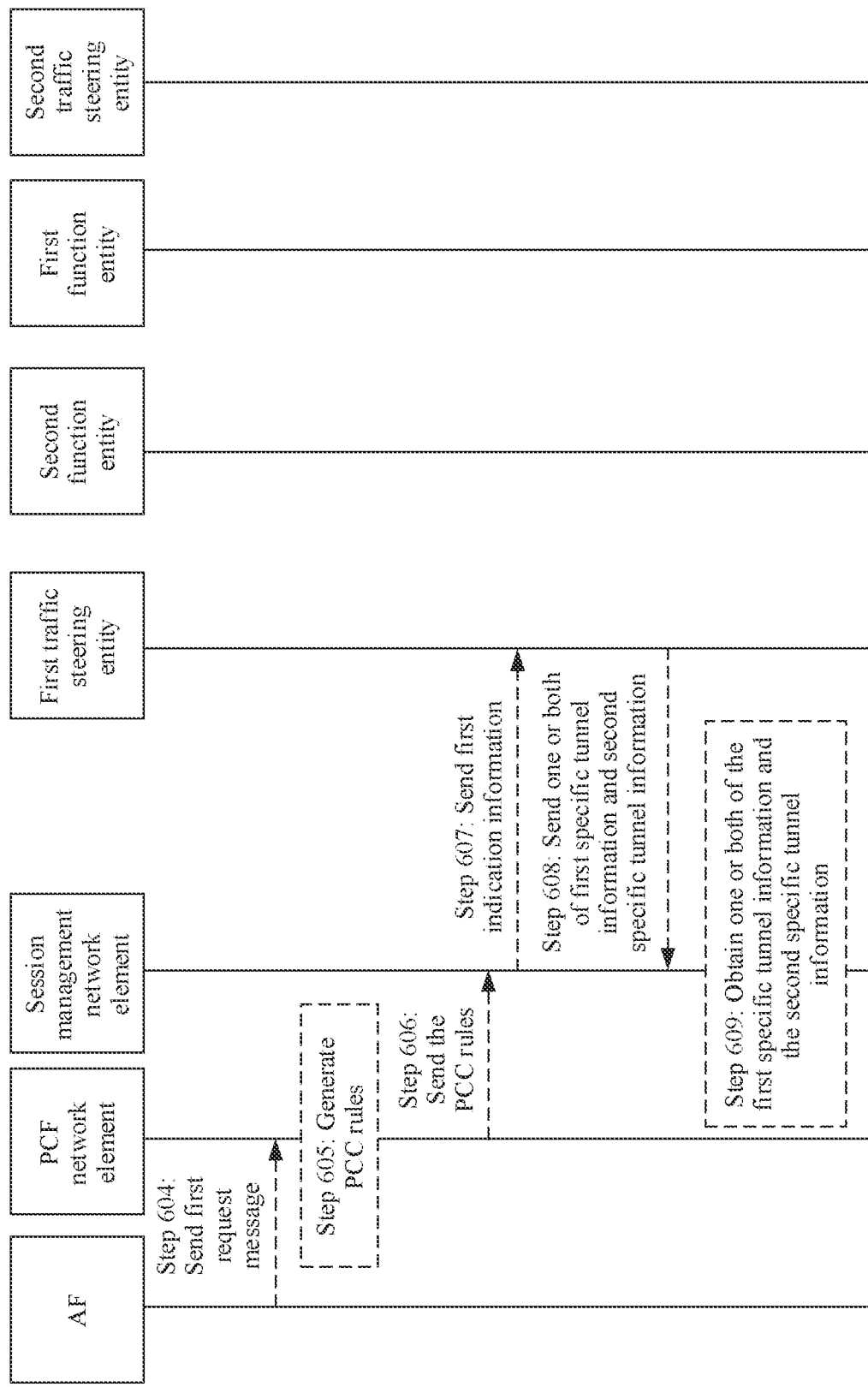
FIG. 7A and FIG. 7B are a schematic flowchart 2 of a traffic routing method according to an embodiment of this application.
Figure 7B:
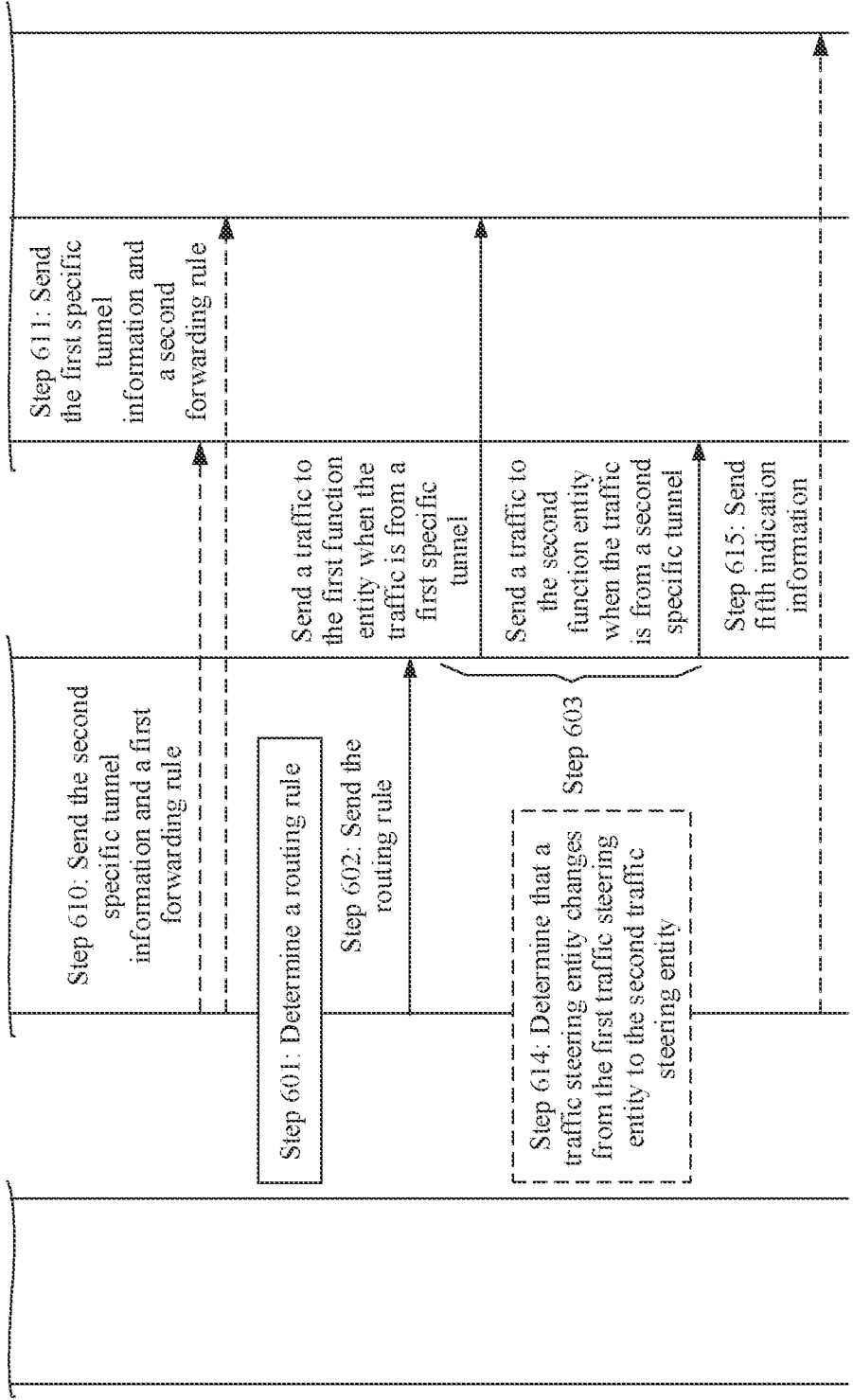

In another possible embodiment of this application, as shown in FIG. 7A and FIG. 7B, before step 601, the method provided in this embodiment of this application may further include the following steps.

Step 604: An AF network element sends a first request message to a PCF network element, so that the PCF network element receives the first request message.

The first request message carries one or more of the following information corresponding to one or more traffics: description information, an identifier of a terminal, and a traffic steering requirement.

The traffic steering requirement is used to indicate that the one or more traffics are traffics on which first traffic steering control is to be performed. That is, local traffic steering control is to be performed on the traffics. Alternatively, the traffic steering requirement may be used to indicate that the first traffic steering control is not to be performed on the one or more traffics.

In a specific implementation, the first request message may be an AF request.

Step 605: The PCF network element generates PCC rules based on the AF request. The PCC rules contain traffic steering information.

The traffic steering information may be a traffic steering policy identifier, and the traffic steering policy identifier is an identifier preconfigured on the session management network element 10 and/or a PCF network element. Specifically, the session management network element may obtain, based on the identifier, a traffic steering policy corresponding to the identifier, for example, one or more SFs that perform first traffic steering control on the traffics, and an execution sequence of the one or more SFs.

Step 606: The PCF network element sends the PCC rules to the session management network element 10, so that the session management network element 10 receives the PCC rules. In this way, it is convenient for the session management network element 10 to determine the routing rule based on the PCC rules.

The routing rule in this embodiment of this application may be used to indicate, in a plurality of forms, the first traffic steering entity 20 to send a first traffic to a first function entity 30, and/or send a second traffic to a second function entity 40 or an access device 50. Descriptions are separately provided below.

Example 1

The routing rule includes: description information of the first traffic and information about the first function entity 30 associated with the description information of the first traffic, and/or description information of the second traffic and information about the second function entity 40 or access device 50 associated with the description information of the second traffic. The description information includes source information of the first traffic or of the second traffic.

In this embodiment of this application, the description information may be referred to as a detection rule, and forwarding the traffic corresponding to the description information to the function entity is referred to as a forwarding action. The forwarding action is used to indicate processing logic for a traffic that complies with the detection rule. To be specific, the traffic is forwarded to the access device 50, the first function entity 30, or the second function entity 40.

It should be noted that the detection rule may alternatively be any one or more of the following: tunnel information, a network instance, a quality of service flow identifier (QoS Flow identifier, QFI), an application identifier, or the like. The network instance may be specifically a virtual local area network (VLAN) identifier. In this embodiment of this application, an example in which traffic description information is recorded as an SDF (service data flow) is used for description.

For example, the description information may include one or more of an identifier of the terminal, 5-tuple information (for example, an IP 5-tuple), triplet information (for example, an IP triplet), the tunnel information, the application identifier, a data network name (DNN), or a single network slice selection assistance information (S-NSSAI). For example, the IP 5-tuple includes a source IP address, a source port number, a destination IP address, a destination port number, and a transport layer protocol.

For example, the information about the second function entity 40 may be a combination of one or more of an address of the second function entity 40, an identifier of the second function entity 40, or a port number of the second function entity 40.

For example, the information about the access device 50 may be a combination of one or more of an address of the access device 50, an identifier of the access device 50, or a port number of the access device 50.

For example, the information about the first function entity 30 may be a combination of one or more of an address of the first function entity 30, an identifier of the first function entity 30, or a port number of the first function entity 30.

Correspondingly, step 603 in this embodiment of this application may be implemented in the following manner:

The first traffic steering entity 20 sends the target traffic to the first function entity 30 when description information of the target traffic is the same as the description information of the first traffic; and/or the first traffic steering entity 20 sends the target traffic to the second function entity 40 or the access device 50 when the description information of the target traffic is the same as the description information of the second traffic.

Considering a direction of a traffic, an uplink direction and a downlink direction of the traffic correspond to different description information. For example, for specific content of an IP 5-tuple corresponding to an uplink direction of a traffic A and an IP 5-tuple corresponding to a downlink direction of the traffic A, refer to the descriptions in Table 1.

For example, it is assumed that description information of an uplink traffic includes an IP 5-tuple 1, a corresponding source IP address of IP1, a source port number of port1, a destination IP address of IP2, a destination port number of port2, and a transport layer protocol of UDP; and description information of a downlink traffic includes an IP 5-tuple 2, a corresponding source IP address of IP2, a source port number of port2, a destination IP address of IP1, a destination port number of port1, and a transport layer protocol of UDP. Specific content of the routing rule in this embodiment of this application is shown in a form of a table, as shown in Table 1.

TABLE 1

| Specific content of the routing rate | | |
|---|---|---|
| Detection rule | | |
| Traffic | Description information of the traffic | Forwarding action |
| Traffic A | From the access device 50; and IP 5-tuple 1 | Forwarded to the first function entity 30 |
| | From the second function entity 40; and IP 5-tuple 2 | Forwarded to the first function entity 30 |
| Traffic B | From the first function entity 30; and IP 5-tuple 1 | Forwarded to the second function entity 40 |
| | From the first function entity 30; and IP 5-tuple 2 | Forwarded to the access device 50 |

For example, if the target traffic is a traffic C, description information of the traffic C includes the IP 5-tuple 1, and a header of the traffic C includes the information about the access device 50, that is, the traffic C is from the access device 50, the first traffic steering entity 20 forwards the traffic C to the first function entity 30. If description information of a traffic C received by the first traffic steering entity 20 includes the IP 5-tuple 2, and a header of the traffic C includes information about the second function entity 40, that is, the traffic C is from the second function entity 40, the first traffic steering entity 20 forwards the traffic C to the first function entity 30. The information about the access device 50 is tunnel information of the first traffic steering entity 20 corresponding to the information about the access device 50, and the information about the second function entity 40 is tunnel information of the first traffic steering entity 20 corresponding to the information about the second function entity 40.

If description information of a traffic C includes the IP 5-tuple 1, and a header of the traffic C includes information about the first function entity 30, that is, the traffic C is from the first function entity 30, the first function entity 30 sends the traffic C to the second function entity 40. The information about the first function entity 30 is tunnel information of the first traffic steering entity 20 corresponding to the first function entity 30.

If description information of a traffic C includes the IP 5-tuple 2, and a header of the traffic C includes information about the first function entity 30, that is, the traffic C is from the first function entity 30, the first function entity 30 sends the traffic C to the access device 50. The information about the first function entity 30 is tunnel information of the first traffic steering entity corresponding to the first function entity 30.

In this embodiment of this application, the first traffic steering entity 20 may determine a source of a traffic in the following manner: The first traffic steering entity 20 may determine the source of the traffic based on tunnel information in a header of the traffic. For example, a header of the second traffic carries the tunnel information of the first traffic steering entity 20 corresponding to the first function entity 30: I-UPF tunnel information for L-PSA. In this case, the first traffic steering entity 20 may determine that the second traffic is from the first function entity 30. If a header of the first traffic carries the tunnel information of the first traffic steering entity 20 corresponding to the second function entity 40: I-UPF tunnel information for PSA, the first traffic steering entity 20 may determine that the first traffic is from the second function entity 40. Similarly, if the header of the first traffic carries the tunnel information of the first traffic steering entity 20 corresponding to the access device 50: I-UPF tunnel information for RAN, the first traffic steering entity 20 may determine that the first traffic is from the access device 50.

In a possible implementation, the routing rule includes one or both of the following information: when the description information of the first traffic indicates that the first traffic is from the access device 50 or the second function entity 40, the first traffic steering entity 20 sends the first traffic to the first function entity 30; or when the description information of the second traffic indicates that the second traffic is from the first function entity 30, the first traffic steering entity 20 sends the second traffic to the access device 50 or the second function entity 40.

It should be noted that, in the foregoing examples, the description information includes the 5-tuple information. Certainly, in an actual process, content of the description information may be decoupled or combined. For example, the description information may not include the 5-tuple information or the triplet information. If the description information in the routing rule includes the QFI and the forwarding action, the first traffic steering entity 20 may send a traffic carrying a specified QFI to a network element indicated by the forwarding action. To be specific, for an uplink traffic X and a downlink traffic Y of a terminal, if the uplink traffic X corresponds to the specified QFI and is from the access device 50, the first traffic steering entity 20 sends the uplink traffic X to the second function entity 40. If the downlink traffic Y corresponds to the specified QFI and is from the second function entity 40, the first traffic steering entity 20 sends the downlink traffic Y to the first function entity 30. If the uplink traffic X corresponds to the specified QFI and is from the first function entity 30, the first traffic steering entity 20 sends the uplink traffic X to the second function entity 40. If the downlink traffic Y corresponds to the specified QFI and is from the first function entity 30, the first traffic steering entity 20 sends the downlink traffic Y to the access device 50. It may be understood that, if the description information is the specified QFI, it indicates that the traffic steering control needs to be performed on both a downlink traffic and an uplink traffic that correspond to the specified QFI.

For a specific implementation in which the description information is another description manner, for example, the network instance, the tunnel information, or the application identifier, refer to the example in which the description information is the identifier of the terminal. Details are not described herein.

It should be noted that Example 1 is applicable to the communication system shown in any one of FIG. 2*a* to FIG. 2*d*. To be specific, when there is neither first specific tunnel nor second specific tunnel, for example, in the scenario shown in FIG. 2*a* or FIG. 2*b*, the session management network element 10 may configure, for the first traffic steering entity 20, description information of one or more first traffics forwarded to the first function entity 30; and/or the session management network element 10 may configure, for the first traffic steering entity 20, description information of one or more second traffics forwarded to the second function entity 40 or the access device 50. In this case, the first traffic steering entity 20 may send the first traffics to the first function entity 30 through another tunnel between the first traffic steering entity 20 and the first function entity 30 other than the first specific tunnel. The first traffic steering entity 20 may send the second traffics to the second function entity 40 through another tunnel between the first traffic steering entity 20 and the second function entity 40 other than the second specific tunnel.

Certainly, when there is the first specific tunnel and the second specific tunnel, for example, in the scenario shown in FIG. 2*c* or FIG. 2*d*, the session management network element 10 may still configure, for the first traffic steering entity 20, description information of one or more first traffics forwarded to the first function entity 30; and/or the session management network element 10 may configure, for the first traffic steering entity 20, description information of one or more second traffics forwarded to the second function entity 40 or the access device 50.

Example 2

With reference to FIG. 2*c* or FIG. 2*d*, the routing rule is used to indicate the first traffic steering entity 20 to send the first traffic from the second specific tunnel to the first function entity 30, and/or indicate the first traffic steering entity 20 to send the second traffic from the first specific tunnel to the second function entity 40. The second specific tunnel is located between the first traffic steering entity 20 and the second function entity 40. The first specific tunnel is located between the first traffic steering entity 20 and the first function entity 30. The first specific tunnel is used to transmit a traffic on which the first traffic steering control has been performed. The second specific tunnel is used to transmit a traffic on which the first traffic steering control is to be performed.

Correspondingly, step 603 in this embodiment of this application may be implemented in the following manner: The first traffic steering entity 20 sends the target traffic to the first function entity 30 when the target traffic is from the first specific tunnel; or the first traffic steering entity 20 sends the target traffic to the second function entity 40 when the target traffic is from the second specific tunnel.

In a specific implementation, the first traffic steering entity 20 may determine, based on tunnel information carried in a header of the target traffic, whether the target traffic is from the first specific tunnel or the second specific tunnel.

For example, if the header of the target traffic carries first specific tunnel information, the target traffic is from the first specific tunnel. If the header of the target traffic carries second specific tunnel information, the target traffic is from the second specific tunnel.

It should be noted that, in this embodiment of this application, the first specific tunnel and the second specific tunnel may coexist, or one of the first specific tunnel and the second specific tunnel exists. For example, for the scenario shown in FIG. 2c, there may be the first specific tunnel and the second specific tunnel. Alternatively, there may be the first specific tunnel, but there is no second specific tunnel. Alternatively, there may be the second specific tunnel, but there is no first specific tunnel.

It should be understood that Example 2 is applicable to a scenario in which there is the second specific tunnel and/or the first specific tunnel. One or both of the first specific tunnel information and the second specific tunnel information in this embodiment of this application may be allocated by the session management network element 10. Certainly, the first specific tunnel information may alternatively be allocated by the UPF network element, that is, allocated by the first traffic steering entity 20 to the first function entity 30; and the second specific tunnel information may alternatively be allocated by the UPF network element, that is, allocated by the first traffic steering entity 20 to the second function entity 40. This is not limited in this embodiment of this application.

When the first traffic steering entity 20 allocates the first specific tunnel information and/or the second specific tunnel information, as shown in FIG. 7A and FIG. 7B, before step 601, the method provided in this embodiment of this application may further include the following step: The session management network element 10 obtains one or both of the first specific tunnel information and the second specific tunnel information.

In an implementation, the session management network element 10 may independently obtain one or both of first specific tunnel information and second specific tunnel information.

In a possible implementation, the session management network element 10 may obtain one or both of first specific tunnel information and second specific tunnel information according to PCC rules. For example, in addition to traffic description information, the PCC rules further include indication information. The indication information is used to indicate to perform first traffic steering control on a traffic in an uplink direction. Alternatively, the indication information is used to indicate to perform first traffic steering control on a traffic in a downlink direction. Alternatively, the indication information is used to indicate to perform first traffic steering control on a traffic in an uplink direction, and also perform traffic steering control on the traffic in a downlink direction.

Optionally, the indication information in the PCC rule is from step 604. To be specific, the first request message sent by the AF to the PCF further includes the indication information. Then, the session management network element 10 obtains one or both of the first specific tunnel information and the second specific tunnel information based on the indication information.

In another manner, the session management network element 10 may obtain one or both of the first specific tunnel information and the second specific tunnel information from the first traffic steering entity 20. For an implementation in which the session management network element 10 obtains one or both of the first specific tunnel information and the second specific tunnel information from the first traffic steering entity 20, refer to the descriptions in step 607 to step 609.

Step 607: The session management network element 10 sends first indication information to the first traffic steering entity 20, so that the first traffic steering entity 20 receives the first indication information from the session management network element 10. The first indication information is used to indicate the first traffic steering entity 20 to allocate one or both of the first specific tunnel information and the second specific tunnel information. Alternatively, the first indication information is used to indicate the first traffic steering entity 20 to establish one or both of the first specific tunnel and the second specific tunnel. In this way, the first traffic steering entity 20 may determine to allocate one or both of the first specific tunnel information and the second specific tunnel information.

In the scenario shown in FIG. 2d, the first indication information is used to indicate the first traffic steering entity 20 to allocate the second specific tunnel information, or the first indication information is used to indicate the first traffic steering entity 20 to establish the second specific tunnel.

In the scenario shown in FIG. 2c, the first indication information may be used to indicate the first traffic steering entity 20 to allocate the second specific tunnel information, or the first indication information is used to indicate the first traffic steering entity 20 to establish the second specific tunnel.

In the scenario shown in FIG. 2c, the first indication information may be used to indicate the first traffic steering entity 20 to allocate the first specific tunnel information, or the first indication information is used to indicate the first traffic steering entity 20 to establish the first specific tunnel.

In the scenario shown in FIG. 2c, the first indication information may be used to indicate the first traffic steering entity 20 to allocate the first specific tunnel information and the second specific tunnel information, or the first indication information is used to indicate the first traffic steering entity 20 to establish the first specific tunnel and the second specific tunnel.

For example, the session management network element 10 may send the first indication information to the first traffic steering entity 20 in the session management process. Alternatively, the session management network element 10 may send the first indication information to the first traffic steering entity 20 in another process in which the session management network element 10 interacts with the first traffic steering entity 20 other than the session management process. For example, the session management process is a session establishment process. Step 607 may be implemented in the following manner: The session management network element 10 sends an N4 session establishment request to the first traffic steering entity 20. The N4 session establishment request carries the first indication information. Certainly, the N4 session establishment request may alternatively be replaced with an N4 session modification request.

Step 608: The first traffic steering entity 20 sends one or both of the first specific tunnel information and the second specific tunnel information to the session management network element 10.

For example, the first traffic steering entity 20 may send one or both of the first specific tunnel information and the second specific tunnel information to the session management network element 10 in a session management response process or another process in which the first traffic steering entity 20 interacts with the session management network element 10.

For example, the first traffic steering entity 20 may send an N4 session establishment response message to the session management network element 10, where the session establishment response message includes one or both of the first specific tunnel information and the second specific tunnel information.

Therefore, in a possible embodiment, as shown in FIG. 7A and FIG. 7B, after step 608, the method provided in this embodiment of this application further includes the following step.

Step 609: The session management network element 10 receives one or both of the first specific tunnel information and the second specific tunnel information from the first traffic steering entity 20.

The first specific tunnel information is used to establish the first specific tunnel, and may be specifically tunnel information of the first traffic steering entity 20 corresponding to the first function entity 30. The second specific tunnel information is used to establish the second specific tunnel, and may be specifically tunnel information of the first traffic steering entity 20 corresponding to the second function entity 40.

In an implementation, the first specific tunnel and the second specific tunnel are each a unidirectional tunnel. The first specific tunnel is a downlink tunnel between the first function entity 30 and the first traffic steering entity 20. To be specific, when the first function entity 30 sends a traffic to the first traffic steering entity 20 through the first specific tunnel, a header of the traffic carries the first specific tunnel information. The second specific tunnel is a downlink tunnel between the second function entity 40 and the first traffic steering entity 20. To be specific, when the second function entity 40 sends a traffic to the first traffic steering entity 20 through the second specific tunnel, a header of the traffic carries the second specific tunnel information.

It should be noted that, when the session management network element 10 allocates the second specific tunnel and/or the first specific tunnel, step 607 and step 608 may be replaced with the following: The session management network element 10 sends one or both of the first specific tunnel information and the second specific tunnel information to the first traffic steering entity 20. The first traffic steering entity 20 returns a response to the session management network element 10. In this case, step 609 may be omitted.

When there are/is the second specific tunnel and/or the first specific tunnel, the session management network element 10 may further indicate the second function entity 40 or the first function entity 30 to send a traffic through the specific tunnel. For a specific implementation in which the session management network element 10 indicates the second function entity 40 or the first function entity 30 to send the traffic through the specific tunnel, refer to step 610 and step 611.

In a possible embodiment, as shown in FIG. 7A and FIG. 7B, the method provided in this embodiment of this application further includes the following steps.

Step 610: The session management network element 10 sends the second specific tunnel information and a first forwarding rule to the second function entity 40, so that the second function entity 40 receives the second specific tunnel information and the first forwarding rule.

The first forwarding rule is used to indicate the second function entity 40 to transmit the first traffic to the first traffic steering entity 20 through the second specific tunnel.

By performing step 610, the second function entity 40 includes the second specific tunnel information in a header of the traffic on which the first traffic steering control is to be performed. In a subsequent traffic transmission process, the first traffic steering entity 20 may send, to the first function entity 30, the traffic whose header carries the second specific tunnel information.

For example, the session management network element 10 may send the second specific tunnel information and the first forwarding rule to the second function entity 40 in the session management process.

Step 611: The session management network element 10 sends the first specific tunnel information and a second forwarding rule to the first function entity 30, so that the first function entity 30 receives the first specific tunnel information and the second forwarding rule. The second forwarding rule is used to indicate the first function entity to transmit the second traffic to the first traffic steering entity through the first specific tunnel.

For example, the session management network element 10 may send the first specific tunnel information and the second forwarding rule to the second function entity 40 in the session management process.

By performing step 611, the first function entity 30 includes the first specific tunnel information in a header of the traffic on which the first traffic steering control has been performed. In a subsequent traffic transmission process, the first traffic steering entity 20 may send, to the second function entity 40, the traffic whose header carries the first specific tunnel information.

It should be noted that, in Example 2, when the first function entity 30 and the first traffic steering entity 20 are co-located, step 611 may be omitted. In this case, the routing rule is used to indicate the co-located network element to send, to the second function entity 40, a received uplink traffic on which the traffic steering control has been performed, and/or indicate the co-located network element to send, to a MEC platform, a downlink traffic received from the second specific tunnel, namely, a downlink traffic whose header carries the second specific tunnel information, so that an SF on the MEC platform performs traffic steering control.

Example 3

The first traffic is associated with a first identifier, and the routing rule is used to indicate the first traffic steering entity 20 to send the traffic associated with the first identifier to the first function entity 30; or the second traffic is associated with a second identifier, and the routing rule is used to indicate the first traffic steering entity 20 to send the traffic associated with the second identifier to the second function entity 40 or the access device 50.

For example, the first identifier is used to indicate that the traffic is from the second function entity 40 or the access device 50. To be specific, the first identifier may indicate that the first traffic from the second function entity 40 or the access device 50 is sent to the first function entity 30 via the first traffic steering entity 20.

For example, the second identifier is used to indicate that the traffic is from the first function entity 30. To be specific, the second identifier may indicate that the second traffic from the first function entity 30 is sent to the second function entity 40 via the first traffic steering entity 20.

Specifically, whether the traffic carrying the second identifier is sent to the second function entity 40 or the access device 50 may be determined with reference to whether the traffic is an uplink traffic or a downlink traffic or description information of the traffic, for example, a destination address or a destination port. For example, if a traffic D carries the second identifier, and the traffic D is an uplink traffic or a destination address of the traffic D points to the second function entity 40, the first traffic steering entity 20 may send the traffic D to the second function entity 40. If the traffic D carries the second identifier, and the traffic D is a downlink traffic or a destination address of the traffic D points to the terminal, the first traffic steering entity 20 may send the traffic D to the access device 50.

In a possible implementation, the second traffic is associated with the second identifier, and the routing rule is used to indicate the first traffic steering entity 20 to send the traffic associated with the second identifier to the second function entity 40.

Correspondingly, as shown in FIG. 8A and FIG. 8B, step 603 in this embodiment of this application may be implemented in the following manner: The first traffic steering entity 20 sends the target traffic to the first function entity 30 if the target traffic is associated with the first identifier; or the first traffic steering entity 20 sends the target traffic to the second function entity 40 if the target traffic is associated with the second identifier.

That is, in Example 3, the session management network element 10 may indicate, according to the routing rule, the first traffic steering entity 20 to send the traffic carrying the first identifier to the first function entity 30, and send the traffic carrying the second identifier to the second function entity 40. That is, the first traffic steering entity 20 may consider the traffic carrying the first identifier as the first traffic, and consider the traffic carrying the second identifier as the second traffic.

When the first traffic steering entity 20 determines, based on the first identifier or the second identifier carried in the traffic, to forward the traffic to the first function entity 30 or the second function entity 40, the method provided in this embodiment of this application may further include: The first function entity 30 includes the first identifier in the header of the traffic on which the first traffic steering control has been performed. The second function entity 40 includes the second identifier in the header of the traffic on which the first traffic steering control is to be performed.

In an implementation, the first function entity 30 or the second function entity 40 may independently determine to include an identifier in a header of a traffic.

In another implementation, the session management network element 10 may indicate to include the identifier in the header of the traffic. For a specific process in which the first function entity 30 or the second function entity 40 includes the identifier in the header of the traffic, refer to the descriptions in step 612 and step 613.

In a possible embodiment, as shown in FIG. 8A and FIG. 8B, before step 603, the method provided in this embodiment of this application may further include the following steps.

Step 612: The session management network element 10 sends third indication information to the second function entity 40, so that the second function entity 40 receives the third indication information from the session management network element 10. The third indication information is used to indicate the second function entity 40 to include the first identifier in the header of the first traffic.

In a possible implementation, the third indication information may be implemented by using a forwarding rule. For example, the session management network element 10 sends the forwarding rule to the second function entity 40, where the forwarding rule is used to indicate the second function entity 40 to perform the following processing on a packet of the first traffic: adding the first identifier to the header.

For example, the session management network element 10 may send the third indication information to the second function entity 40 in the session management process, or send the third indication information to the second function entity 40 in another process in which the session management network element 10 interacts with the second function entity 40 other than the session management process.

Specifically, after the second function entity 40 receives the third indication information, when the traffic steering control does not need to be performed on the first traffic in the central DN, the second function entity 40 includes the first identifier in the header of the first traffic on which the first traffic steering control is to be performed, and sends the first traffic to the first traffic steering entity 20. When an SF in the central DN needs to perform traffic steering control on the first traffic, the second function entity 40 includes the first identifier in the header of the first traffic on which the SF in the central DN has performed traffic steering control but still needs to perform first traffic steering control, and sends the first traffic to the first traffic steering entity 20. In other words, the second function entity performs, based on the third indication information in step 612, the following processing on the packet of the first traffic on which the first traffic steering control is to be performed: adding the first identifier in the header.

For example, the header of the traffic may be a general packet radio service tunneling protocol-user plane header ((General Packet Radio Service. GPRS) tunneling protocol-user plane. GTP-U header).

The traffic C on which the first traffic steering control is to be performed is used as an example for description. Assuming that an uplink traffic of the traffic C is represented by an SDF (service data flow) 1, and a downlink traffic is represented by an SDF 2, processing logic of the second function entity 40 for the traffic C is shown in Table 2 or Table 3:

TABLE 2

| Description information of the traffic | Processing action |
| --- | --- |
| SDF 1 | Send the SDF 1 to the central DN |
| SDF 2 | Include the first identifier in a GTP-U header of the SDF 2 |

The SF in the central DN does not need to perform traffic steering control on the SDF 1 and the SDF 2

TABLE 3

| Description information of the traffic | Processing action |
| --- | --- |
| SDF 1 | The SF in the central DN performs traffic steering control |
| SDF 2 | Include the first identifier in a GTP-U header of the SDF 2 |

The SF in the central DN needs to perform traffic steering control on the SDF 1 and the SDF 2

Step 613: The session management network element 10 sends fourth indication information to the first function entity 30, so that the first function entity 30 receives the fourth indication information from the session management network element 10. The fourth indication information is used to indicate the first function entity 30 to include the second identifier in the header of the second traffic.

In a possible implementation, the fourth indication information may be implemented by using the forwarding rule. For example, the session management network element 10 sends the forwarding rule to the first function entity 30, where the forwarding rule is used to indicate the first function entity 30 to perform the following processing on a packet of the second traffic: adding the second identifier to the header.

The traffic C is still used as an example. In this case, processing logic of the first function entity 30 for the traffic C is shown in Table 4:

TABLE 4

| Description information of the traffic | Processing action |
|---|---|
| The SDF 1 is from the first traffic steering entity 20 | The SF on the MEC platform performs first traffic steering control |
| After the SF on the MEC platform performs first traffic steering control on the SDF 1 | Include the second identifier in the GTP-U header of the SDF 1, and send the SDF 1 to the first traffic steering entity 20 |
| The SDF 2 is from the first traffic steering entity 20 | The SF on the MEC platform performs first traffic steering control |
| After the SF on the MEC platform performs first traffic steering control on the SDF 2 | Send the SDF 2 to the first traffic steering entity 20 |

It should be noted that, in Example 3, when the first function entity 30 and the first traffic steering entity 20 are co-located, the first function entity 30 in step 613 may be replaced by the co-located network element. In this case, the routing rule may be used to indicate the co-located network element to send the traffic associated with the first identifier to the MEC platform, so that the SF on the MEC platform performs first traffic steering control; and/or the routing rule is used to indicate the co-located network element to send, to the second function entity 40, the traffic on which the first traffic steering control has been performed. How to mark a traffic on which the SF on the MEC platform has performed first traffic steering control is not limited in this embodiment of this application, for example, may be implemented in the following manner: The second function entity 40 records description information of the traffic; and when the second function entity receives the description information of the traffic from the MEC platform again, the second function entity 40 considers that the traffic is a traffic on which the first traffic steering control has been performed.

Figure 9A:
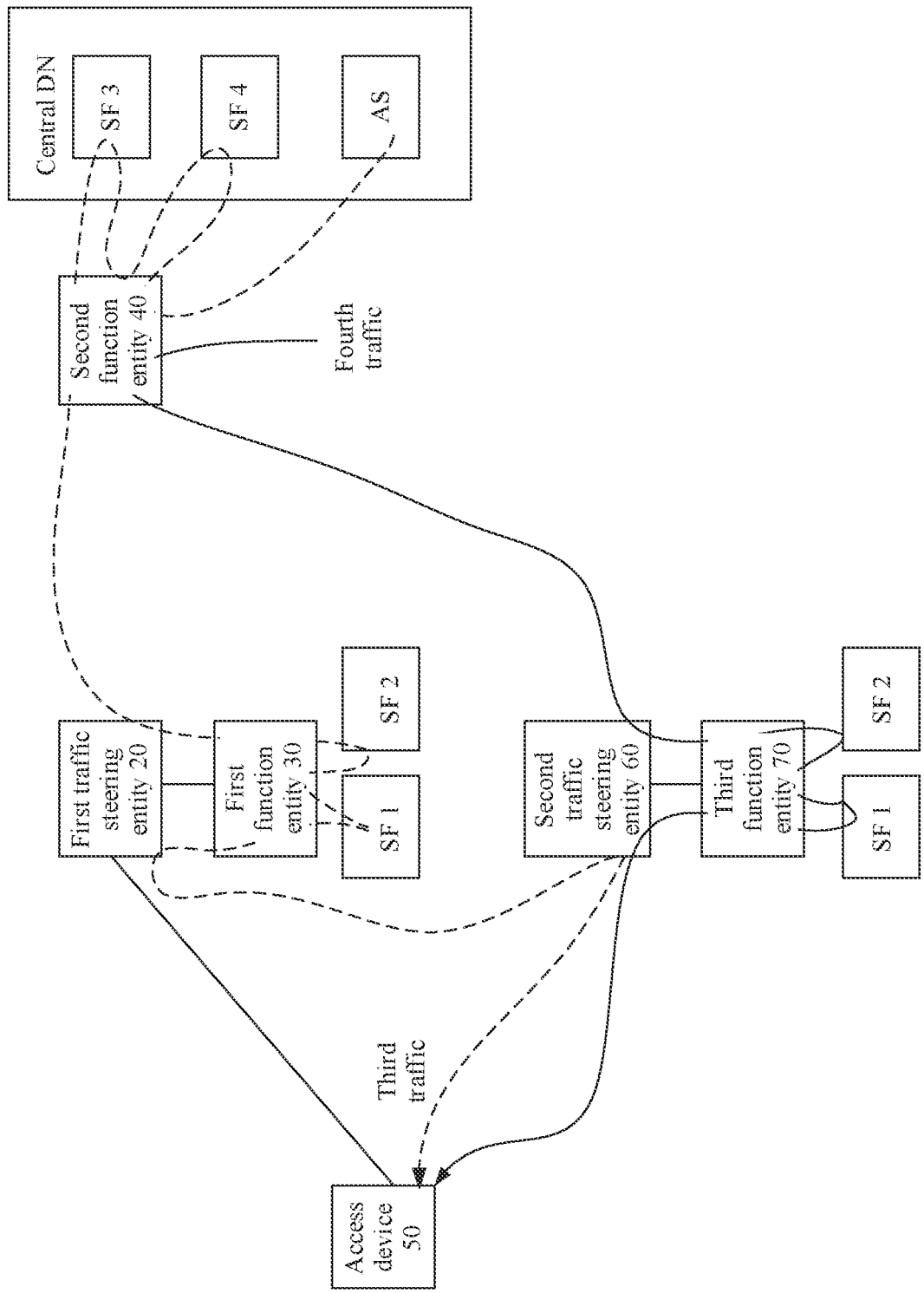
FIG. 9*a* and FIG. 9*b* are each a diagram of an architecture in which a traffic steering entity changes according to an embodiment of this application.
Figure 9B:
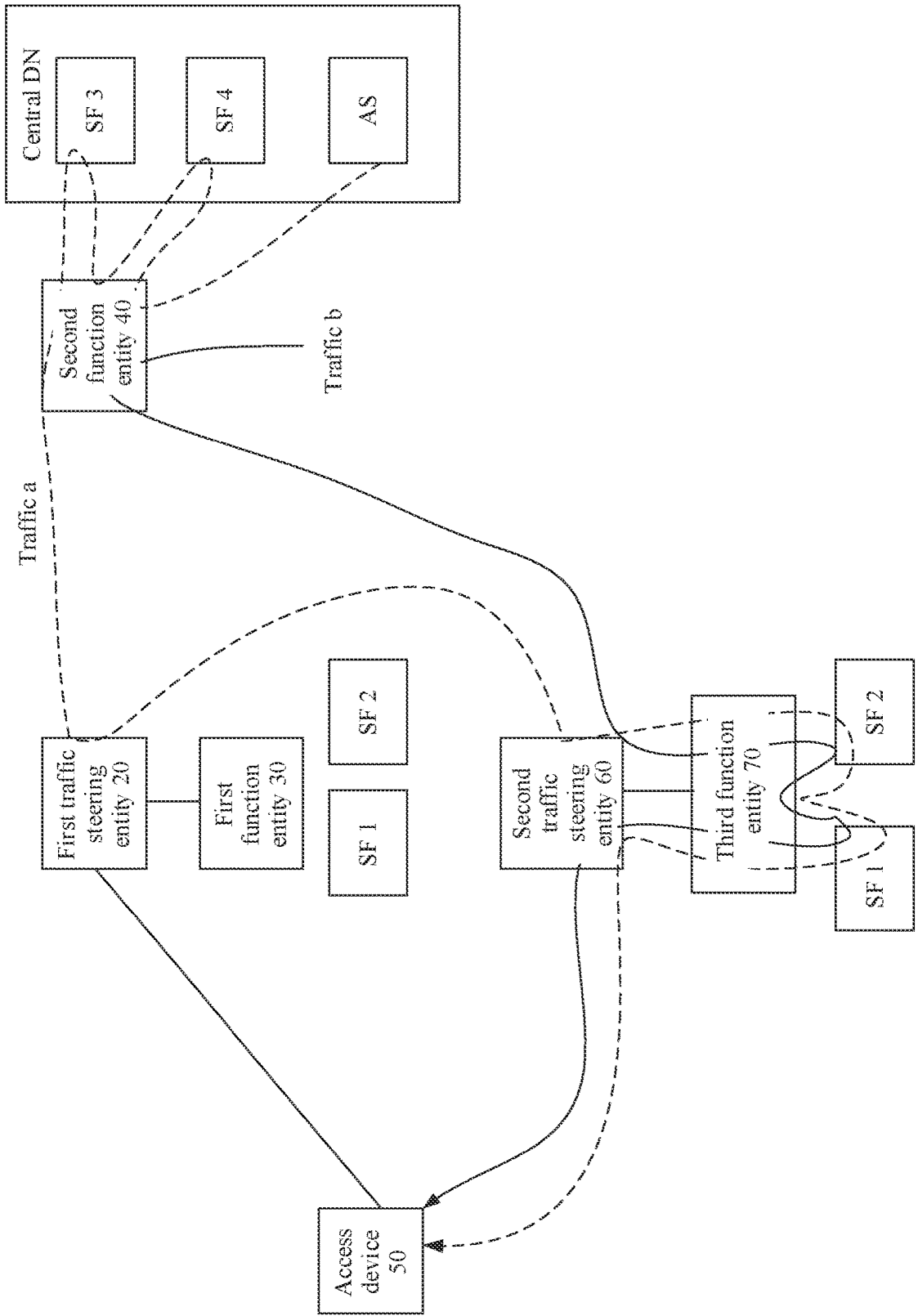

In an actual process, there may be a scenario in which the first traffic steering entity 20 and the first function entity 30 change. For example, the terminal moves and moves out of a service area of the first traffic steering entity 20. As shown in FIG. 9a or FIG. 9b, the session management network element 10 determines that a traffic steering entity changes from the first traffic steering entity 20 to a second traffic steering entity 60. The second traffic steering entity 60 corresponds to a third function entity 70. The third function entity 70 corresponds to a MEC platform. Therefore, in this scenario, the first traffic steering control may be performed on a downlink traffic by performing step 614 and step 615, or performing step 614, step 616, and step 617.

With reference to FIG. 9a, as shown in FIG. 7A and FIG. 7B or FIG. SA and FIG. 8B, in still another possible embodiment of this application, the method provided in this embodiment of this application may further include the following steps.

Step 614: The session management network element 10 determines that the traffic steering entity changes from the first traffic steering entity 20 to the second traffic steering entity 60.

For example, the session management network element 10 determines, based on a location of the terminal, that the traffic steering entity changes from the first traffic steering entity 20 to the second traffic steering entity 60. In other words, the session management network element 10 determines that the terminal moves out of the service area of the first traffic steering entity 20.

Step 615: The session management network element 10 sends fifth indication information to the second traffic steering entity 60, so that the second traffic steering entity 60 receives the fifth indication information. The fifth indication information is used to indicate the second traffic steering entity 60 to perform any one or both of the following steps:

sending a third traffic from the first traffic steering entity 20 to the access device 50; or sending a fourth traffic from the second function entity 40 to the third function entity 70 corresponding to the second traffic steering entity 60, where the third traffic is a traffic on which the first traffic steering control has been performed; and the fourth traffic is a traffic on which the first traffic steering control is to be performed.

The fifth indication information is further used to indicate the second traffic steering entity 60 not to send the third traffic from the first traffic steering entity 20 to the third function entity 70.

In a possible implementation, the fifth indication information may be specifically a forwarding rule. To be specific, the session management network element 10 sends the forwarding rule to the second traffic steering entity 60, where the forwarding rule is used to indicate the second traffic steering entity 60 to send the third traffic from the first traffic steering entity 20 to the access device 50, and/or send the fourth traffic from the second function entity 40 to the third function entity 70.

Correspondingly, after receiving the fifth indication information, the second traffic steering entity 60 may determine to send the third traffic to the access device 50; or send the fourth traffic to the third function entity 70 corresponding to the second traffic steering entity 60.

Specifically, the fifth indication information may be implemented by using the forwarding rule. For example, the session management network element 10 sends the forwarding rule to the second traffic steering entity 6, where the forwarding rule includes description information of the third traffic and information about the access device 50 corresponding to the description information of the third traffic, and/or includes description information of the fourth traffic and information about the third function entity 70 corresponding to the description information of the fourth traffic.

It should be noted that in step 614 and step 615, an SF on the MEC platform corresponding to the first function entity 30 performs first traffic steering control on the third traffic. Then, the first function entity 30 sends, to the first traffic steering entity 20, the third traffic on which the first traffic steering control has been performed, and the first traffic steering entity 20 forwards the third traffic to the second traffic steering entity 60. The second traffic steering entity 60 receives the third traffic from the first traffic steering entity 20, and forwards the third traffic to the access device 50 based on the fifth indication information in step 615 (that is, the second traffic steering entity 60 does not need to send the third traffic to the third function entity 70). For the fourth traffic received by the second traffic steering entity 60 from the second function entity 40, the second traffic steering entity 60 sends, based on the fifth indication information in step 615, the fourth traffic to the third function entity 70 corresponding to the second traffic steering entity 60, and the third function entity 70 sends the fourth traffic to the MEC platform corresponding to the third function entity to perform first traffic steering control.

It should be noted that the method provided in this embodiment of this application may further include: The session management network element 10 sends indication information to the first traffic steering entity 20, where the indication information is used to indicate the first traffic steering entity 20 to send the third traffic from the second function entity 40 to the second traffic steering entity 60.

Further, the session management network element 10 sends, to the second function entity 40, indication information used to indicate the second function entity 40 to send the fourth traffic to the second traffic steering entity 60.

With reference to FIG. 9b, as shown in FIG. 7A and FIG. 7B or FIG. 8A and FIG. 8B, in still another possible embodiment of this application, after step 614, the method provided in this embodiment of this application may further include the following steps.

Step 616: The session management network element 10 sends sixth indication information to the first traffic steering entity 20 or the second function entity 40, so that the first traffic steering entity 20 receives the sixth indication information. The sixth indication information is used to indicate the first traffic steering entity 20 or the second function entity 40 to send a fifth traffic to the second traffic steering entity 60. The fifth traffic is a traffic on which the first traffic steering control is to be performed.

Step 617: The session management network element 10 sends seventh indication information to the second traffic steering entity 60, so that the second traffic steering entity 60 receives the seventh indication information. The seventh indication information is used to indicate the second traffic steering entity 60 to send the fifth traffic to the third function entity 70 corresponding to the second traffic steering entity 60. The fifth traffic is from the second function entity 40 or from the first traffic steering entity 20.

In the scenario shown in FIG. 9a or FIG. 9b, when the traffic steering entity changes from the first traffic steering entity 20 to the second traffic steering entity 60, the session management network element 10 may further send, to the first traffic steering entity 20 and the second function entity 40, information about the second traffic steering entity 60, for example, tunnel information of the second traffic steering entity 60, including a tunnel endpoint identifier and an address of the second traffic steering entity 60. This part belongs to a conventional technology. Details are not described herein in this embodiment of this application.

In conclusion, in FIG. 9a, the second traffic steering entity 60 may send the fourth traffic from the second function entity 40 to the third function entity 70 corresponding to the second traffic steering entity 60, so that the MEC platform corresponding to the third function entity 70 performs traffic steering control on the fourth traffic. After the MEC platform corresponding to the third function entity 70 performs traffic steering control on the fourth traffic, the second traffic steering entity 60 sends the fourth traffic to the access device 50. However, the third traffic from the first traffic steering entity 20 is forwarded by the second traffic steering entity 60 to the access device 50. That is, in FIG. 9a, the second traffic steering entity 60 does not need to forward the third traffic to the third function entity 70. This is because the MEC platform corresponding to the first function entity 30 has performed traffic steering control on the third traffic.

In the scenario shown in FIG. 9b, for example, the fifth traffic is a traffic a from the first traffic steering entity 20 or a traffic b from the second function entity 40. The second traffic steering entity 60 sends the fifth traffic to the third function entity 70, so that the MEC platform corresponding to the third function entity 70 performs traffic steering control on the fifth traffic.

FIG. 9a or FIG. 9b is merely an example of a path on which an SF on a MEC platform or in the central DN performs traffic steering control, and does not have an indicative meaning.

Figure 10:
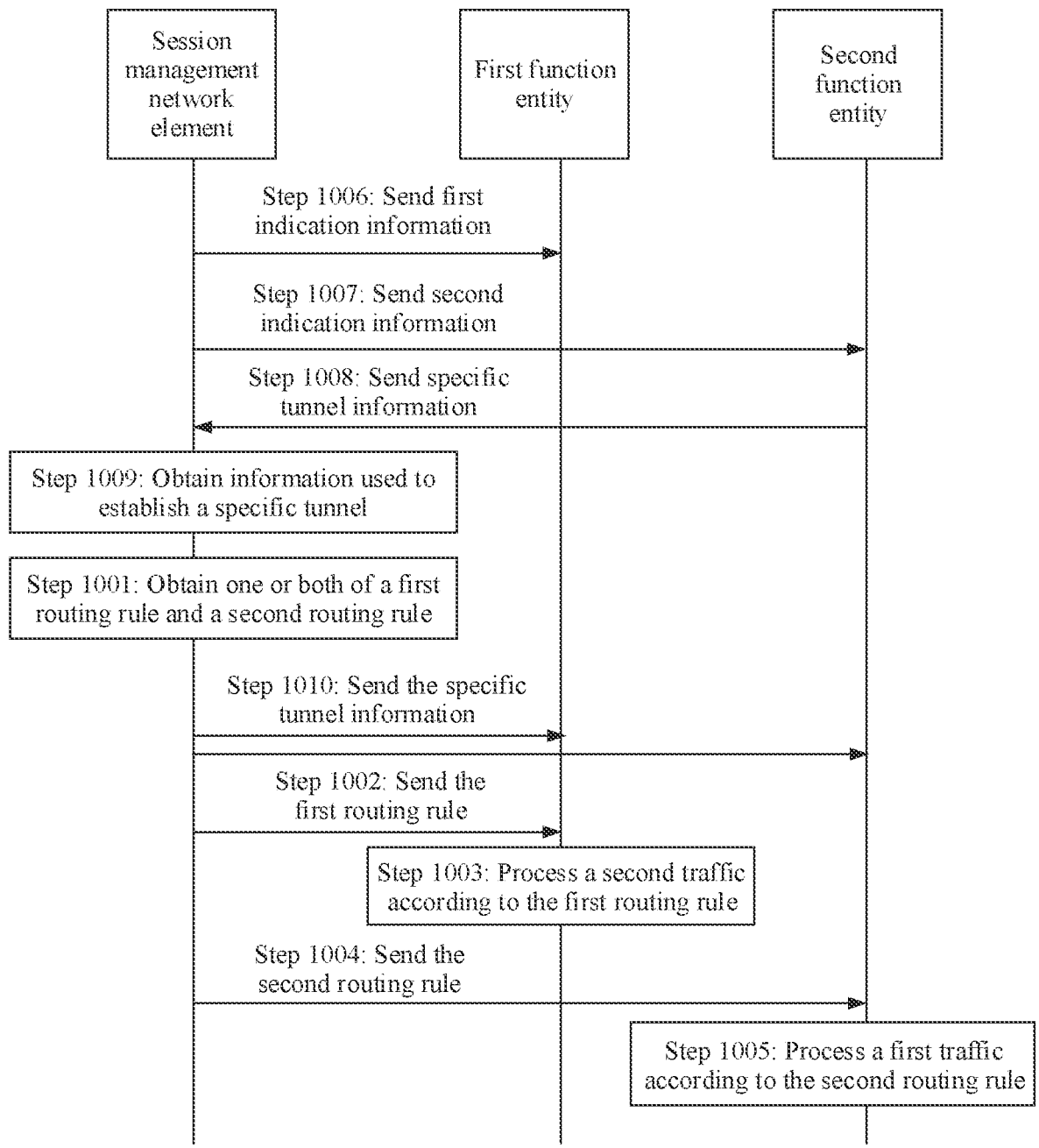
FIG. 10 is a schematic flowchart 4 of a traffic routing method according to an embodiment of this application.

With reference to FIG. 2e or FIG. 2f, as shown in FIG. 10, an embodiment of this application provides a traffic transmission method. The method includes the following steps.

Step 1001: The session management network element 10 determines one or both of a first routing rule and a second routing rule, where the first routing rule is used to indicate the first function entity 30 to send a second traffic to the second function entity 40 through a specific tunnel between the first function entity 30 and the second function entity 40. The second routing rule is used to indicate the second function entity 40 to send a first traffic to the first function entity 30 through the specific tunnel. The first traffic is a traffic on which first traffic steering control is to be performed, and the second traffic is a traffic on which the first traffic steering control has been performed.

In addition, the first routing rule is further used to indicate the first function entity 30 to perform first traffic steering control on the first traffic received from the specific tunnel. That is, the first routing rule is further used to indicate the first function entity 30 to send the first traffic from the specific tunnel to the MEC platform.

Specifically, for a specific implementation of step 1001, refer to the specific implementation of step 601. Details are not described herein again in this embodiment of this application.

Step 1002: The session management network element 10 sends the first routing rule to the first function entity 30, so that the first function entity 30 receives the first routing rule.

For example, the session management network element 10 may send the first routing rule to the first function entity 30 in a session management process.

Step 1003: The first function entity 30 processes the second traffic according to the first routing rule.

For example, in a specific implementation of step 1003, the first function entity 30 includes, according to the first routing rule, specific tunnel information of the second function entity 40 corresponding to the first function entity 30, namely, specific PSA tunnel information for L-PSA, in a header of the second traffic.

A traffic C on which local traffic steering control is to be performed is used as an example for description. Assuming that an uplink traffic of the traffic C is represented by an SDF 1, and a downlink traffic is represented by an SDF 2, specific content of the first routing rule may be shown in Table 5:

TABLE 5

| Description information of the traffic | Processing action |
|---|---|
| The SDF 1 is from the first traffic steering entity 20 | Send the SDF 1 to the MEC platform, and an SF on the MEC platform performs traffic steering control |
| After the MEC platforms traffic steering control on the SDF 1 | Send the SDF 1 to the second function entity 40 through the specific tunnel, where for example, a GTP-U header of the SDF 2 carries the specific PSA tunnel information for L-PSA |

TABLE 5-continued

| Description information of the traffic | Processing action |
|---|---|
| The SDF 2 is from the specific tunnel, that is, a header carries specific L-PSA tunnel information for PSA | Send the SDF 2 to the MEC platform, and the SF on the MEC platform performs traffic steering control |

Step 1004: The session management network element 10 sends the second routing rule to the second function entity 40, so that the second function entity 40 receives the second routing rule.

For example, the session management network element 10 may send the second routing rule to the second function entity 40 in the session management process.

Step 1005: The second function entity 40 processes the first traffic according to the second routing rule.

For example, in a specific implementation of step 1005, the second function entity 40 includes, according to the second routing rule, specific tunnel information of the first function entity 30 corresponding to the second function entity 40, namely, the specific L-PSA tunnel information for PSA, in a header of the first traffic.

The traffic C on which the local traffic steering control is to be performed is used as an example for description. Assuming that the uplink traffic of the traffic C is represented by the SDF 1, and the downlink traffic is represented by the SDF 2.

Scenario 1: The central DN does not need to perform traffic steering control on the traffic C. In this case, specific content of the second routing rule, namely, processing performed by the second function entity 40 on the traffic C according to the second routing rule, may be shown in Table 6.1; and specific content of the first routing rule, namely, processing performed by the first function entity 30 on the traffic C according to the first routing rule, may be shown in Table 6.2.

TABLE 6.1

| Second routing rule | |
|---|---|
| Description information of the traffic | Processing action |
| SDF 1 | Send the SDF 1 to the AS |
| SDF 2 | Send the SDF 2 to the first function entity 30 through the specific tunnel, where for example, a GTP-U header of the SDF 2 carries the specific L-PSA tunnel information for PSA |

TABLE 6.2

| First routing rule | |
|---|---|
| Description information of the traffic | Processing action |
| The SDF 1 is from the first traffic steering entity 20 | Send the SDF 1 to the MEC platform, and an SF on the MEC platform performs first traffic steering control |
| After the MEC platform performs first traffic steering control on the SDF 1 | Send the SDF 1 to the second function entity 40 through the specific tunnel, where for example, a GTP-U header of the SDF 1 carries the specific PSA tunnel information for L-PSA |

TABLE 6.2-continued

| First routing rule | |
|---|---|
| Description information of the traffic | Processing action |
| The SDF 2 is from the specific tunnel, that is, a GTP-U header of the SDF 2 carries the specific L-PSA tunnel information for PSA | Send the SDF 2 to the MEC platform, and the SF on the MEC platform performs first traffic steering control |

Scenario 2: The central DN needs to perform traffic steering control on the traffic C. In this case, specific content of the second routing rule may be shown in Table 7.

TABLE 7

| Description information of the traffic | Processing action |
|---|---|
| SDF 1 | An SF in the central DN performs traffic steering control |
| Before the central DN performs traffic steering control on the SDF 2 | Send the SDF 2 to the central DN, and an SF in the central DN performs traffic steering control |
| After the central DN performs traffic steering control on the SDF 2 | Send the SDF 2 to the first function entity through the specific tunnel, where for example, a GTP-U header of the SDF 2 carries the specific L-PSA tunnel information for PSA |

This embodiment of this application provides the traffic routing method. In this method, the session management network element indicates, according to the first routing rule, the first function entity 30 to send, to the second function entity 40 through the specific tunnel, the traffic (for example, the second traffic) on which the first traffic steering control has been performed; or the session management network element 10 indicates, according to the second routing rule, the second function entity 40 to send, to the first function entity 30 through the specific tunnel, the first traffic on which the traffic steering control is to be performed. Through the specific tunnel established between the first function entity 30 and the second function entity 40, the first function entity 30 may determine that the first traffic is a traffic on which the first traffic steering control is to be performed, and send the first traffic to the MEC platform to perform first traffic steering control. According to this method, the first traffic steering entity 20 may be prevented from forwarding a traffic exchanged between the first function entity 30 and the second function entity 40, to simplify processing logic of the first traffic steering entity 20 for the traffic.

In a possible embodiment, as shown in FIG. 10, before step 1001, the method provided in this embodiment of this application further includes the following steps.

Step 1006: The session management network element 10 sends first indication information to the first function entity 30, so that the first function entity 30 receives the first indication information from the session management network element 10. The first indication information is used to indicate the first function entity 30 to allocate information used to establish a specific tunnel.

For example, the information that is allocated by the first function entity 30 and that is used to establish the specific tunnel is the specific tunnel information of the first function entity 30 corresponding to the second function entity 40. For example, the specific tunnel information of the first function entity 30 corresponding to the second function entity 40 may include a tunnel endpoint identifier and an address of the first function entity 30. For example, the specific tunnel information of the first function entity 30 corresponding to the second function entity 40 may be the specific L-PSA tunnel information for PSA in the following embodiments.

Step 1007: The session management network element 10 sends second indication information to the second function entity 40, where the second indication information is used to indicate the second function entity 40 to allocate the information used to establish the specific tunnel.

It should be noted that either step 1006 or step 1007 may exist, or step 1006 and step 1007 may coexist.

For example, the information that is allocated by the second function entity 40 and that is used to establish the specific tunnel is the specific tunnel information of the second function entity 40 corresponding to the first function entity 30. For example, the specific tunnel information of the second function entity 40 corresponding to the first function entity 30 may include a tunnel endpoint identifier and an address of the second function entity 40. For example, the specific tunnel information of the second function entity 40 corresponding to the first function entity 30 may be the specific PSA tunnel information for L-PSA in the following embodiments.

Step 1008: The second function entity 40 and/or the first function entity 30 send/sends the specific tunnel information to the session management network element 10.

The specific tunnel information includes at least one of the following: the specific tunnel information of the second function entity 40 corresponding to the first function entity 30, and the specific tunnel information of the first function entity 30 corresponding to the second function entity 40. In a possible implementation, the specific tunnel information sent by the second function entity 40 to the session management network element 10 is the specific tunnel information of the second function entity 40 corresponding to the first function entity 30, and the specific tunnel information sent by the first function entity 30 to the session management network element 10 is the specific tunnel information of the first function entity 30 corresponding to the second function entity 40.

It should be noted that there is no execution sequence between step 1007 and step 1008.

Step 1009: The session management network element 10 obtains the information used to establish the specific tunnel.

For example, the information used to establish the specific tunnel may be the specific tunnel information.

Step 1010: The session management network element 10 sends the corresponding specific tunnel information to the first function entity 30 and/or the second function entity 40.

In a possible implementation, the corresponding specific tunnel information sent by the session management network element 10 to the first function entity 30 is the specific tunnel information of the second function entity 40 corresponding to the first function entity 30. The corresponding specific tunnel information sent by the session management network element 10 to the second function entity 40 is the specific tunnel information of the first function entity 30 corresponding to the second function entity 40.

It should be noted that when the session management network element 10 independently obtains the information used to establish the specific tunnel, for example, the session management network element 10 allocates the specific tunnel information, step 1006 to step 1008 in this embodiment of this application may be omitted.

It should be noted that, if there is also a third specific tunnel between the first function entity 30 and the access device 50, the first traffic steering entity 20 may be omitted. The first function entity 30 may send, to the access device 50 through the third specific tunnel, a downlink traffic on which the MEC platform has performed first traffic steering control. The access device 50 may also send, to the first function entity 30 through the third specific tunnel, an uplink traffic that is from the access device 50 and on which the first traffic steering control is to be performed. In addition, when the method shown in FIG. 10 is described with reference to FIG. 2b, the first function entity 30 may be replaced by the co-located network element.

Figure 11A:
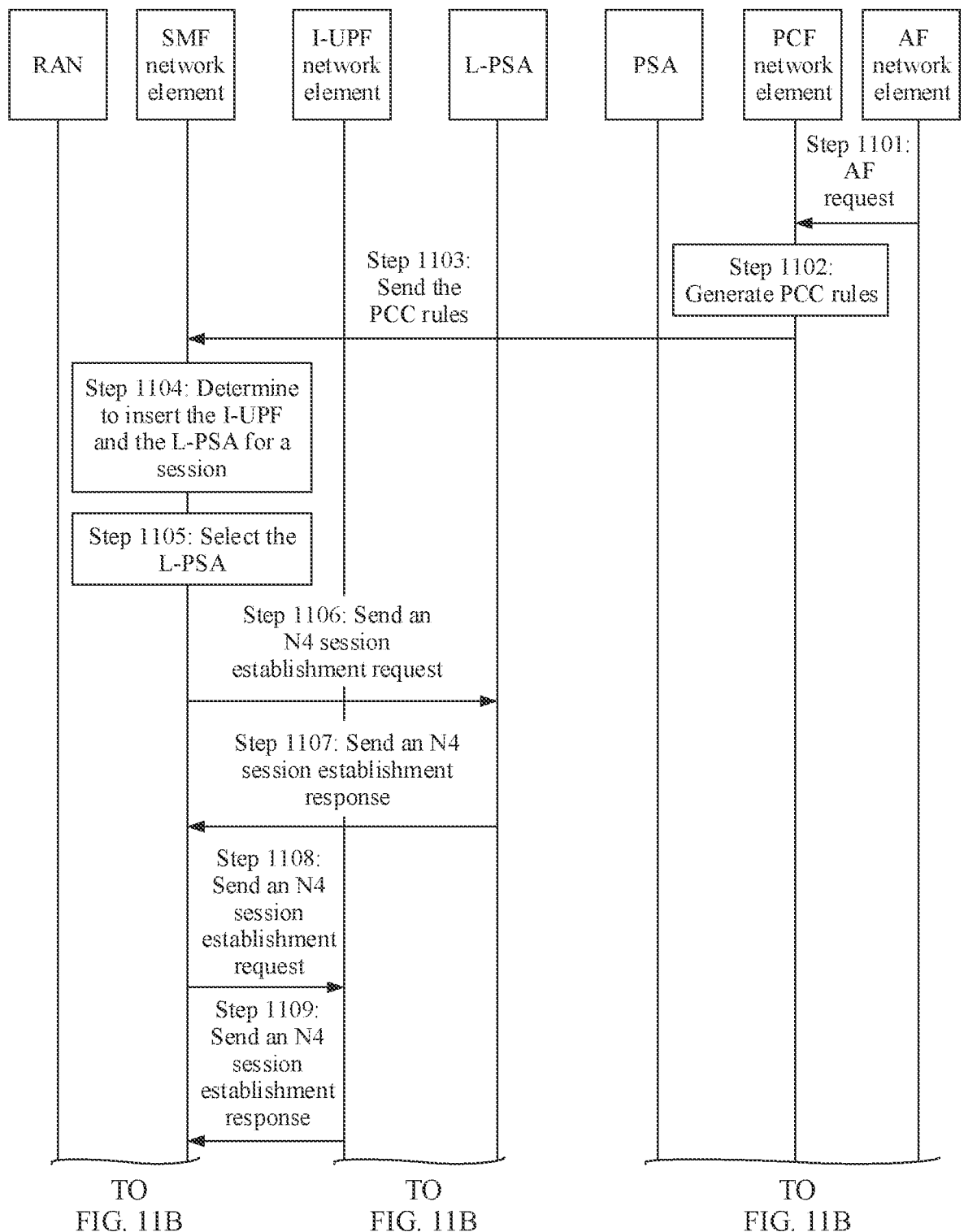
Figure 11B:
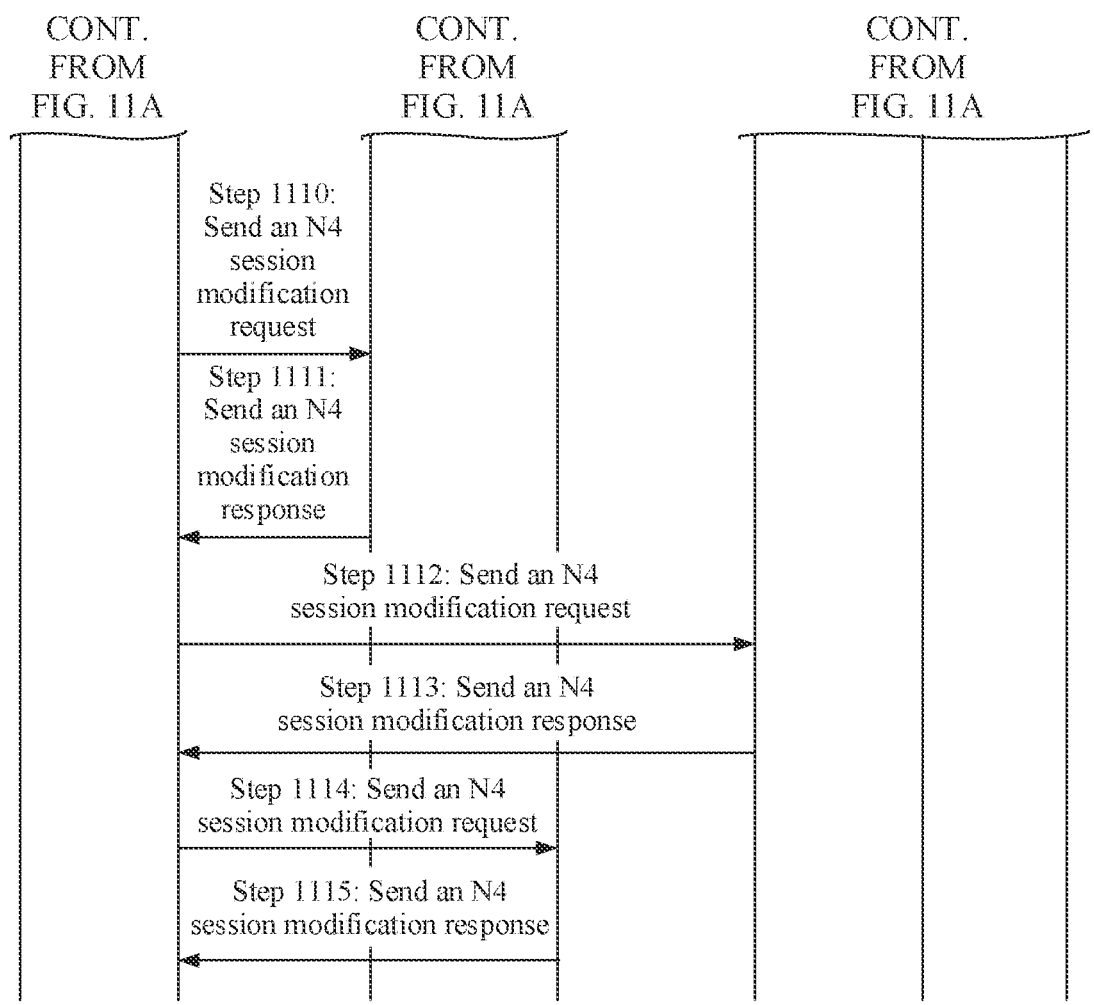

As shown in FIG. 11A and FIG. 11B, a specific procedure of a traffic routing method in an embodiment of this application is described in detail in FIG. 11A and FIG. 11B by using an example in which the session management network element 10 is an SMF network element, the first traffic steering entity 20 is an I-UPF network element, the first function entity 30 is an L-PSA, the second function entity 40 is a PSA, and the access device 50 is a RAN. The method includes the following steps.

Step 1101: An AF network element sends an AF request to a PCF network element, so that the PCF network element receives the AF request. The AF request carries traffic description information, a traffic steering requirement, and an identifier of a terminal.

It may be understood that before step 1101, transmission paths of an uplink traffic and a downlink traffic of the terminal are: Terminal<->RAN<->PSA<->central DN.

The traffic description information is used to indicate a traffic corresponding to the AF request, and may be specifically indicated by an IP 5-tuple, an IP triplet, or the like. The identifier of the terminal may be an IP of the terminal, an SUPI of the terminal, or the like.

The traffic steering requirement is used to indicate whether local traffic steering control is performed on a traffic determined based on the traffic description information, or used to indicate whether an SF on a MEC platform corresponding to the L-PSA performs traffic steering control on the traffic determined based on the traffic description information.

That is, the AF network element provides, for the PCF network element by performing step 1101, description information of a traffic on which the local traffic steering control needs to be performed.

Step 1102: The PCF network element generates PCC rules based on the AF request. The PCC rules contain traffic steering information. The traffic steering information may be a traffic steering policy identifier.

Step 1103: The PCF network element triggers a session policy modification process, and sends the PCC rules to the SMF network element.

In terms of a service-based interface operation, step 1103 may be described as follows: The PCF network element invokes an Npcf_SMPolicyControl_UpdateNotify request service, to notify the SMF network element of the PCC rules.

Step 1104: The SMF network element determines, according to the PCC rules, to insert the I-UPF and the L-PSA for a session.

The I-UPF serves as a traffic steering point, sends some traffics of the terminal to the L-PSA, and sends the other traffics of the terminal to the PSA.

Step 1105: The SMF network element selects the L-PSA.

For a specific implementation of step 1105, refer to a conventional technology. Details are not described herein in this embodiment of this application.

Step 1106: The SMF network element sends an N4 session establishment request to the L-PSA, so that the L-PSA receives the N4 session establishment request.

Step 1107: The L-PSA sends an N4 session establishment response to the SMF network element, so that the SMF network element receives the N4 session establishment response. The N4 session establishment response carries L-PSA tunnel information.

It should be understood that the SMF network element obtains the L-PSA tunnel information through step 1106 and step 1107. Then, the SMF network element sends the L-PSA tunnel information to another user plane network element such as the I-UPF, to establish a tunnel connection between the I-UPF and the L-PSA.

It should be noted that the L-PSA tunnel information may alternatively be allocated by the SMF network element. An example in which the L-PSA allocates the L-PSA tunnel information is used above for description. When the SMF network element allocates the L-PSA tunnel information, the SMF network element sends the L-PSA tunnel information to the L-PSA in the N4 session establishment request. Similarly, when tunnel information is allocated in a subsequent step, the tunnel information may be allocated by the SMF network element, or may be allocated by the L-PSA, the I-UPF, or the PSA.

Step 1108: The SMF network element sends an N4 session establishment request to the I-UPF network element, so that the I-UPF network element receives the N4 session establishment request. The N4 session establishment request carries RAN tunnel information, PSA tunnel information, and the L-PSA tunnel information.

An objective of step 1108 in this embodiment of this application is to establish a user plane connection, that is, transmit tunnel information of two endpoints (namely, network elements) on the user plane connection to peer ends. For example, an endpoint A obtains tunnel information of an endpoint B, and the endpoint B obtains tunnel information of the endpoint A. In this way, a user plane connection between the endpoint A and the endpoint B is successfully established. This establishment process is implemented by using a control plane network element, namely, the SMF network element.

The RAN tunnel information is used to establish a tunnel between the I-UPF network element and the RAN, and a header of a traffic sent by the I-UPF network element to the RAN may carry the RAN tunnel information. That is, when receiving the traffic to be sent to the RAN, the I-UPF may send the traffic to the RAN. In other words, the tunnel between the I-UPF and the RAN is successfully established.

The L-PSA tunnel information is used to establish a tunnel between the I-UPF network element and the L-PSA, and a header of a traffic sent by the I-UPF network element to the L-PSA may carry the L-PSA tunnel information. That is, when receiving the traffic to be sent to the L-PSA, the I-UPF may send the traffic to the L-PSA. In other words, the tunnel between the I-UPF and the L-PSA is successfully established.

The PSA tunnel information is used to establish a tunnel between the I-UPF network element and the PSA, and a header of a traffic sent by the I-UPF network element to the PSA may carry the PSA tunnel information. That is, when receiving the traffic to be sent to the PSA, the I-UPF may send the traffic to the PSA. In other words, the tunnel between the I-UPF and the PSA is successfully established.

Step 1109: The I-UPF network element returns an N4 session establishment response to the SMF network element, so that the SMF network element receives the N4 session establishment response. The N4 session establishment response carries I-UPF tunnel information for PSA and I-UPF tunnel information for L-PSA.

The I-UPF tunnel information for PSA is tunnel information that is allocated by the I-UPF and that corresponds to the PSA. After the SMF network element sends the information to the PSA, that is, after the PSA obtains the I-UPF tunnel information for PSA, the tunnel between the PSA and the I-UPF is successfully established. Then, a header of a traffic sent by the PSA to the I-UPF may carry the I-UPF tunnel information for PSA. That is, the I-UPF may determine, based on the I-UPF tunnel information for PSA carried in the header of the traffic, that the traffic is from the PSA.

The I-UPF tunnel information for L-PSA is tunnel information that is allocated by the I-UPF and that corresponds to the L-PSA. After the SMF network element sends the I-UPF tunnel information for L-PSA to the L-PSA, that is, after the L-PSA obtains the I-UPF tunnel information for L-PSA, the tunnel between the L-PSA and the I-UPF is successfully established. Then, a header of a traffic sent by the L-PSA to the I-UPF may carry the I-UPF tunnel information for L-PSA. That is, the I-UPF may determine, based on the I-UPF tunnel information for L-PSA carried in the header of the traffic, that the traffic is from the L-PSA.

Step 1110: The SMF network element sends an N4 session modification request to the I-UPF, so that the I-UPF receives the N4 session modification request. The N4 session modification request carries a routing rule. The routing rule includes a detection rule and a forwarding rule. The detection rule includes an identifier of a traffic and a source of the traffic. A forwarding action is used to indicate processing logic for a traffic that complies with the detection rule, that is, forwarding the traffic to the RAN, the L-PSA, or the PSA.

For example, it is assumed that the local traffic steering control needs to be performed or has been performed on a traffic, and the routing rule is used to indicate the I-UPF to perform any one or more of the following steps on the traffic, where an uplink direction of the traffic is referred to as an uplink traffic in this embodiment of this application, and a downlink direction is referred to as a downlink traffic in this embodiment of this application:

sending an uplink traffic received from the RAN, namely, a traffic whose header carries the I-UPF tunnel information for RAN, to the L-PSA;

sending an uplink traffic received from the L-PSA, namely, a traffic whose header carries the I-UPF tunnel information for L-PSA, to the PSA;

sending a downlink traffic received from the PSA, namely, a traffic whose header carries the I-UPF tunnel information for PSA, to the L-PSA; or sending a downlink traffic received from the L-PSA, namely, a traffic whose header carries the I-UPF tunnel information for L-PSA, to the RAN.

For example, a traffic C is a traffic on which the local traffic steering control is to be performed or needs to be performed (where an uplink traffic is represented by an SDF 1, and a downlink traffic is represented by an SDF 2). In this case, the routing rule is specifically shown in Table 8.

TABLE 8

| Identifier of the traffic | Source of the traffic | Forwarding action |
|---|---|---|
| | Description information | |
| SDF 1 | From an access device, where for example, a traffic direction is an uplink direction (UL direction) | Send the SDF 1 to the L-PSA |
| SDF 1 | From the L-PSA, where for example, a traffic direction is a UL direction | Send the SDF 1 to the PSA |
| SDF 2 | From the PSA | Send the SDF 2 to the L-PSA |
| SDF 2 | From the L-PSA | Send the SDF 2 to the RAN |

Step 1111: The I-UPF sends an N4 session modification response to the SMF network element, so that the SMF network element receives the N4 session modification response.

It should be noted that an example in which the routing rule is sent to the I-UPF in the N4 session modification request is used in FIG. 11A and FIG. 11B. Certainly, the SMF network element may alternatively send the routing rule in the N4 session establishment request, that is, include the routing rule in step 1110. If the routing rule is carried in the N4 session establishment request, step 1110 and step 1111 may be omitted. That is, step 1110 may be combined with step 1108, and step 1111 may be combined with step 1109.

Step 1112: The SMF network element sends an N4 session modification request to the PSA, so that the PSA receives the N4 session modification request. The session modification request carries the I-UPF tunnel information for PSA and a first forwarding rule.

The first forwarding rule is used to indicate the PSA to send, to the I-UPF, a downlink traffic on which the local traffic steering control is to be performed. Specifically, the PSA includes the I-UPF tunnel information for PSA in a header of the downlink traffic.

It should be noted that when the central DN also needs to perform traffic steering control on a traffic, the first forwarding rule is used to indicate the PSA to send, to the I-UPF, the downlink traffic on which the central DN has performed traffic steering control. In other words, the central DN may have performed or may not perform local traffic steering control on the downlink traffic on which the local traffic steering control is to be performed and that is from the PSA.

Step 1113: The PSA sends an N4 session modification response to the SMF network element, so that the SMF network element receives the N4 session modification response of the PSA. The N4 session modification response is used to indicate that the I-UPF tunnel information for PSA and the first forwarding rule have been successfully received, or the N4 session modification response carries response indication information used to indicate that the I-UPF tunnel information for PSA and the first forwarding rule have been successfully received.

Step 1114: The SMF sends an N4 session modification request to the L-PSA, so that the L-PSA receives the N4 session modification request. The N4 session modification request carries a second forwarding rule and the I-UPF tunnel information for L-PSA.

The second forwarding rule is used to indicate the L-PSA to send, to the I-UPF, an uplink traffic on which the local traffic steering control has been performed or a downlink traffic on which the local traffic steering control has been performed. That is, the L-PSA may include the I-UPF tunnel information for L-PSA in a header of the uplink traffic on which the local traffic steering control has been performed or of the downlink traffic on which the local traffic steering control has been performed.

Step 1115: The L-PSA sends an N4 session modification response to the SMF network element, so that the SMF network element receives the N4 session modification response.

The N4 session modification response is used to indicate that the I-UPF tunnel information for L-PSA and the second forwarding rule have been successfully received, or the N4 session modification response carries response indication information used to indicate that the I-UPF tunnel information for L-PSA and the second forwarding rule have been successfully received.

Figure 12:
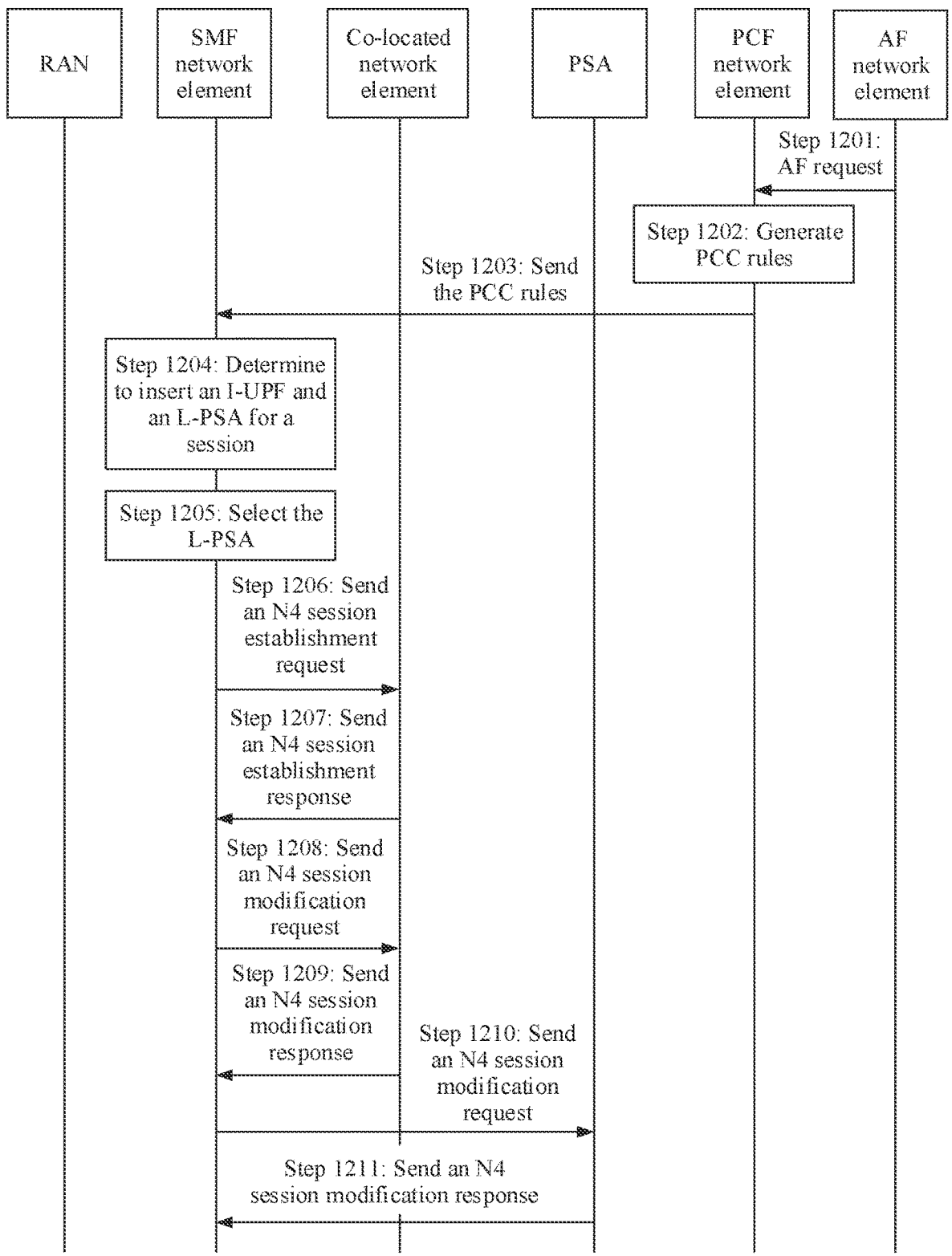

FIG. 12 shows another traffic routing method according to an embodiment of this application. A difference between the embodiment shown in FIG. 12 and the embodiment shown in FIG. 11A and FIG. 11B lies in that an I-UPF and an L-PSA are located in a same network element, that is, the I-UPF and the L-PSA in FIG. 11A and FIG. 11B are replaced by a co-located network element.

Step 1201 to step 1205 are the same as step 1101 to step 1105.

In this embodiment, the I-UPF and the L-PSA selected by the SMF are a same network element, in other words, the I-UPF and the L-PSA are co-located.

Step 1206: The SMF network element sends an N4 session establishment request to the co-located network element, so that the co-located network element receives the N4 session establishment request.

Step 1207: The co-located network element sends an N4 session establishment response to the SMF network element, so that the SMF network element receives the N4 session establishment response of the L-PSA. The N4 session management response carries I-UPF tunnel information for PSA and I-UPF tunnel information for RAN.

Step 1208: The SMF network element sends an N4 session modification request to the co-located network element, so that the co-located network element receives the N4 session modification request. The N4 session modification request carries a routing rule. The routing rule includes a detection rule and a forwarding rule. The detection rule includes an identifier of a traffic and a source of the traffic. A forwarding action is used to indicate processing logic for a traffic that complies with the detection rule, that is, forwarding the traffic to a RAN or a PSA.

The forwarding rule is used to indicate the co-located network element to perform one or more of the following steps for a traffic on which local traffic steering control is to be performed or has been performed:

sending a received uplink traffic on which the local traffic steering control has been performed to the PSA;

performing local traffic steering control on an uplink traffic received from the RAN (namely, a traffic whose header carries the I-UPF tunnel information for RAN);

performing local traffic steering control on a downlink traffic received from the PSA (namely, a traffic whose header carries the I-UPF tunnel information for PSA); or sending a received downlink traffic on which the local traffic steering control has been performed to the RAN.

A traffic C on which the local traffic steering control is to be performed or has been performed is used as an example for description. Assuming that an uplink traffic of the traffic C is represented by an SDF 1, and a downlink traffic is represented by an SDF 2, specific content of the routing rule is shown in Table 9.1:

TABLE 9.1

| | Description information | |
|---|---|---|
| Identifier of the traffic | Source of the traffic | Forwarding action |
| SDF 1 | From the RAN, where for example, a traffic direction is an uplink direction (UL direction) | Send the SDF 1 to the L-PSA, the L-PSA sends the SDF 1 to a MEC platform, and the MEC platform performs local traffic steering control |
| SDF 1 | From the L-PSA, where for example, a traffic direction is a UL direction | Send the SDF 1 to the PSA |
| SDF 2 | From the PSA | Send the SDF 2 to the L-PSA, and the MEC platform performs traffic steering control |
| SDF 2 | From the L-PSA | Send the SDF 2 to the RAN |

It should be noted that, in this embodiment of this application, indicating the co-located network element to perform local traffic steering control may be indicating the co-located network element to send, to the MEC platform, the traffic on which the traffic steering control needs to be performed, and an SF on the MEC platform performs local traffic steering control on the traffic. That is, in a co-located scenario, if the routing rule indicates the co-located network element to perform local traffic steering control, it may be understood as that the routing rule indicates the co-located network element to send the traffic to the MEC platform, so that the SF on the MEC platform performs local traffic steering control.

Step 1209: The co-located network element sends an N4 session modification response to the SMF network element, so that the SMF network element receives the N4 session modification response.

It should be noted that an example in which the routing rule is sent to the co-located network element in the N4 session modification request is used in FIG. 12. Certainly, the SMF network element may alternatively send the routing rule to the co-located network element in the N4 session establishment request. That is, the SMF sends the routing rule to the co-located network element in step 1206. If the routing rule is carried in the N4 session establishment request, step 1208 and step 1209 may be omitted.

Step 1210 and step 1211 are the same as step 1112 and step 1113. Details are not described herein again in this embodiment of this application.

Figure 13A:
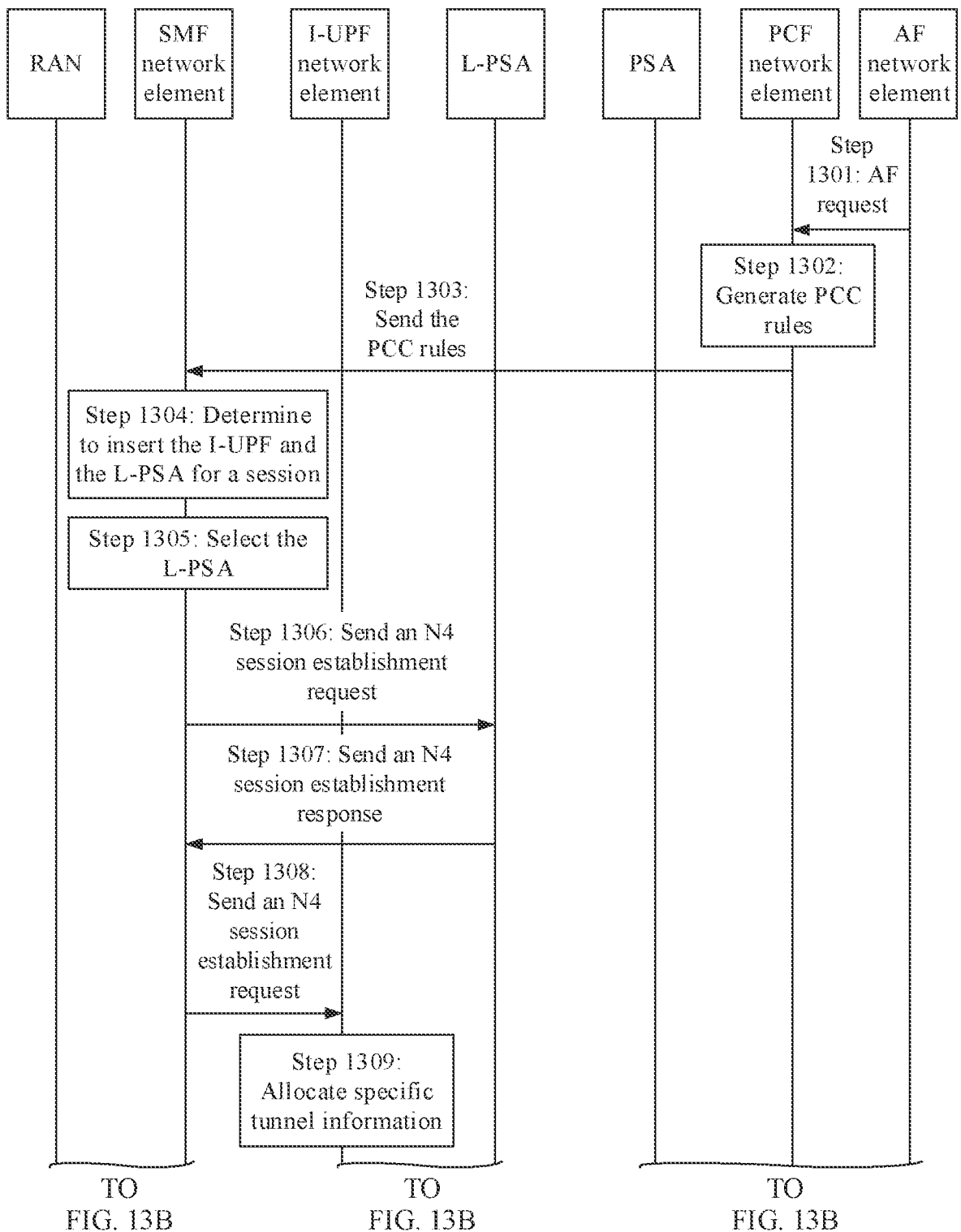
Figure 13B:
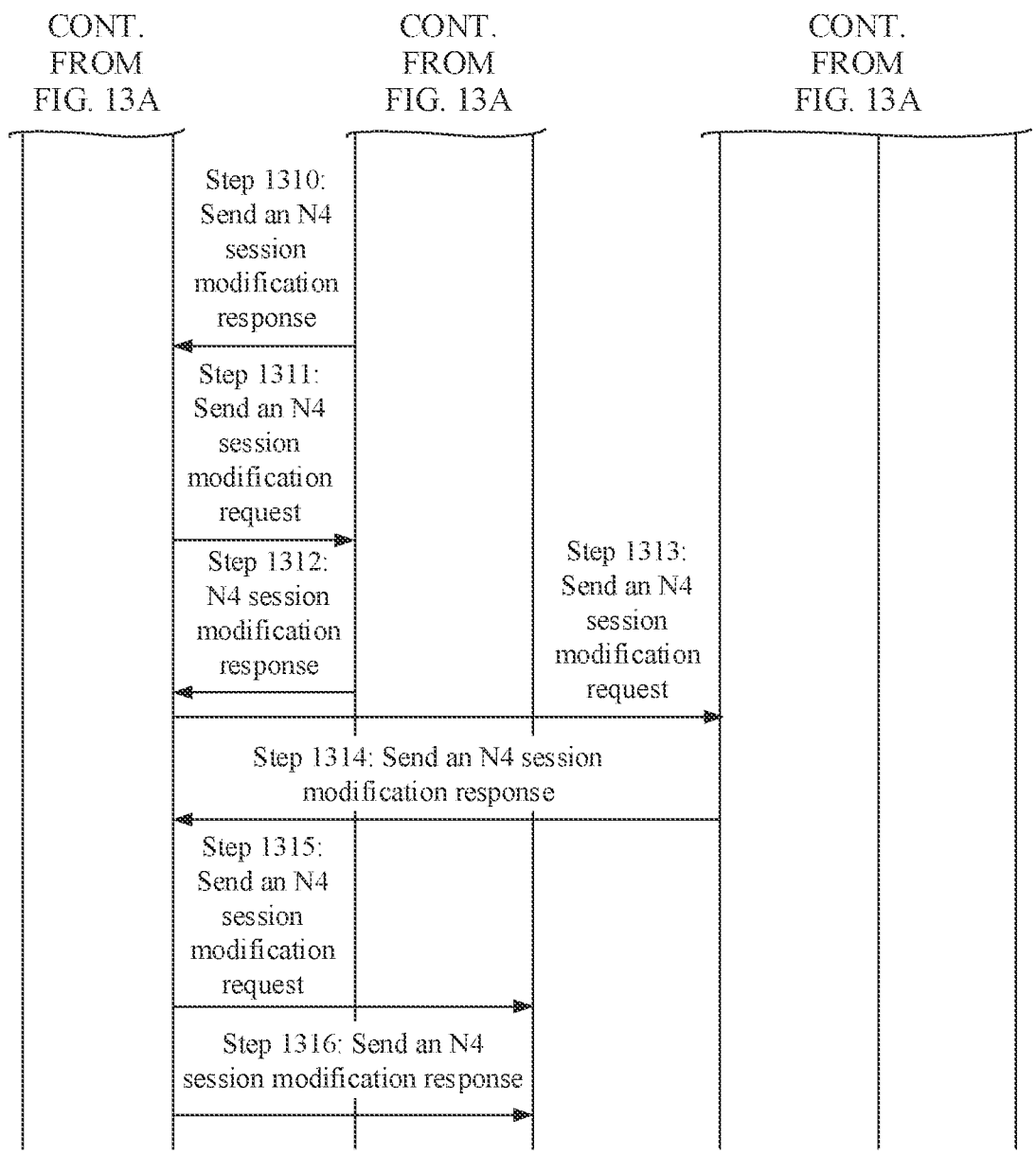
Figure 14A:
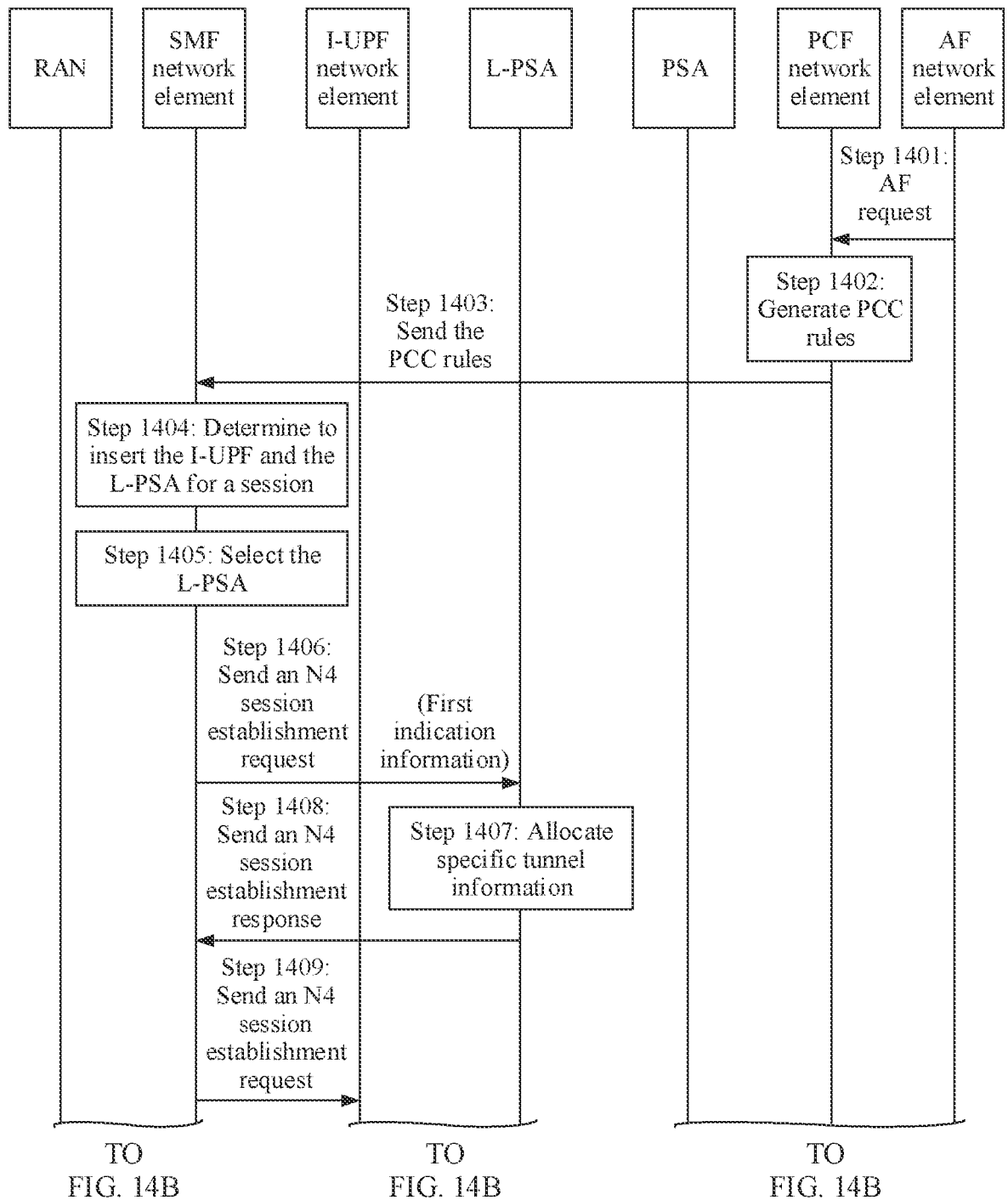
Figure 14B:
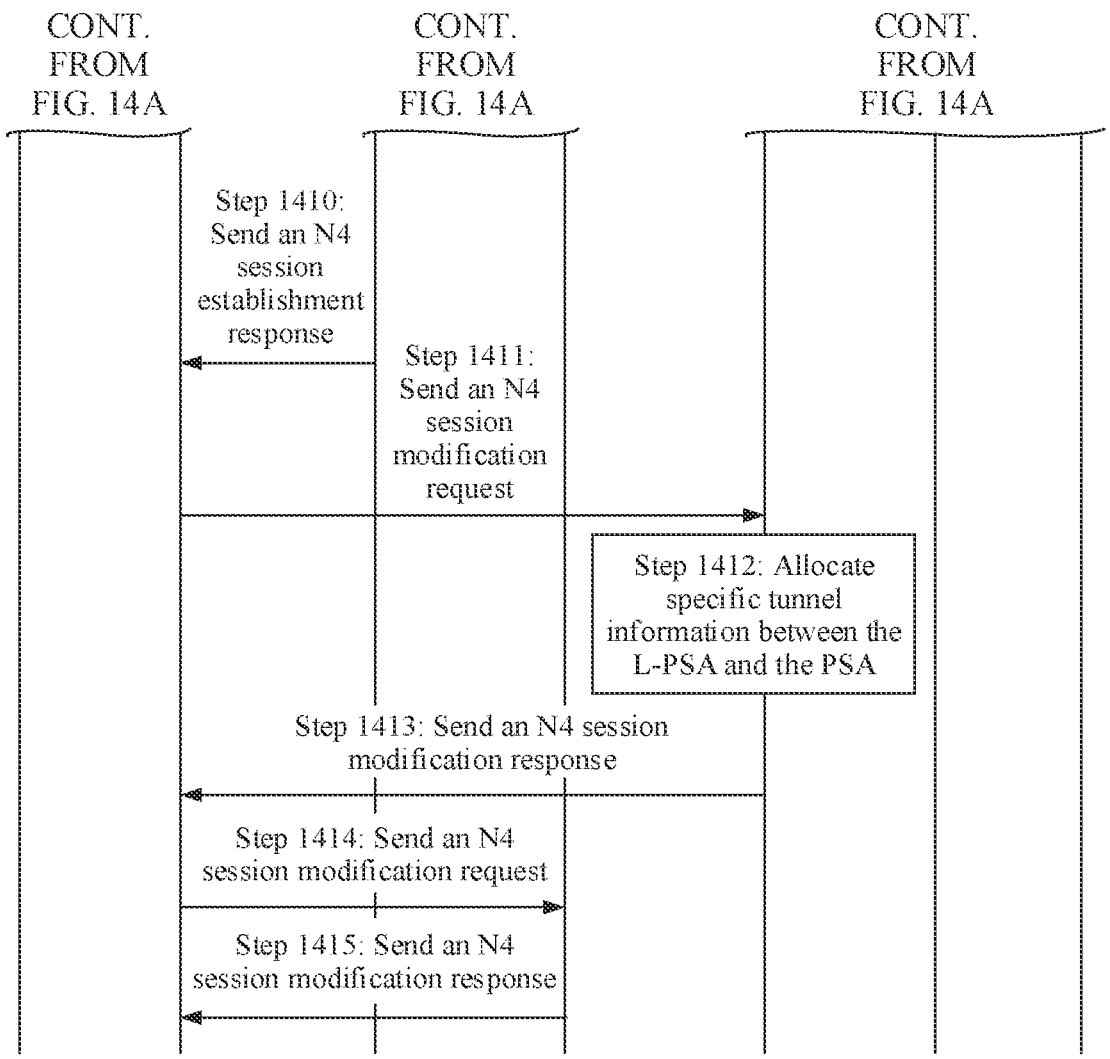

FIG. 13A and FIG. 13B show another specific implementation of a traffic routing method according to an embodiment of this application. The method includes the following steps.

Step 1301 to step 1307 are the same as step 1101 to step 1107. Details are not described herein again in this embodiment of this application.

Step 1308: The SMF network element sends an N4 session establishment request to the I-UPF, so that the I-UPF network element receives the N4 session establishment request. The N4 session establishment request carries first indication information, RAN tunnel information, PSA tunnel information, and L-PSA tunnel information.

The first indication information is used to indicate the I-UPF to allocate specific tunnel information, to establish a first specific tunnel between the I-UPF and the L-PSA and a second specific tunnel between the I-UPF and the PSA.

Other parameter information, such as the RAN tunnel information, the PSA tunnel information, and the L-PSA tunnel information, belongs to a conventional technology. Details are not described in the present invention.

Step 1309: The I-UPF allocates specific I-UPF tunnel information for L-PSA and specific I-UPF tunnel information for PSA based on the first indication information.

The specific I-UPF tunnel information for PSA is the foregoing second specific tunnel information. The specific I-UPF tunnel information for L-PSA is the foregoing first specific tunnel information.

Step 1310: The I-UPF returns an N4 session establishment response to the SMF network element, so that the SMF network element receives the N4 session establishment response. The N4 session establishment response carries I-UPF tunnel information for L-PSA, I-UPF tunnel information for PSA, I-UPF tunnel information for RAN, the specific I-UPF tunnel information for L-PSA, and the specific I-UPF tunnel information for PSA.

It should be noted that, when the I-UPF and the L-PSA are co-located, for ease of description, in the present invention, a network element obtained by co-locating the I-UPF and the L-PSA is still referred to as an I-UPF. The I-UPF (namely, the co-located network element) allocates the specific I-UPF tunnel information for PSA, and returns the N4 session establishment response to the SMF network element. In this case, the N4 session establishment response carries the I-UPF tunnel information for PSA, the I-UPF tunnel information for RAN, and the specific I-UPF tunnel information for PSA. The I-UPF and L-PSA are co-located. Therefore, the I-UPF may not allocate the following information: the I-UPF tunnel information for L-PSA and the specific I-UPF tunnel information for L-PSA.

Step 1311: The SMF network element sends an N4 session modification request to the I-UPF, so that the I-UPF receives the N4 session modification request. The N4 session modification request carries a routing rule.

The routing rule is used to indicate the I-UPF to perform the following processing on a traffic on which traffic steering control is to be performed or first traffic steering control has been performed:

sending a traffic received from the first specific tunnel (namely, the specific tunnel between the I-UPF and the L-PSA, that is, a traffic whose header carries the specific I-UPF tunnel info for L-PSA) to the PSA; or sending a traffic received from the second specific tunnel (namely, the specific tunnel between the I-UPF and the PSA, that is, a traffic whose header carries the specific I-UPF tunnel info for PSA) to the L-PSA.

Step 1312: The I-UPF sends an N4 session modification response to the SMF network element, so that the SMF network element receives the N4 session modification response.

It should be noted that an example in which the routing rule is sent to the I-UPF in the N4 session modification request is used in FIG. 13A and FIG. 13B. Certainly, the SMF network element may alternatively send the routing rule in the N4 session establishment request. That is, the SMF sends the routing rule to the I-UPF in step 1310. If the routing rule is carried in the N4 session establishment request, step 1311 may be omitted.

It should be noted that, when the I-UPF and the L-PSA are co-located, a forwarding rule is used to indicate the I-UPF (namely, the co-located network element) to perform one or more of the following steps for a traffic on which the first traffic steering control is to be performed or has been performed:

receiving an uplink traffic on which local traffic steering control has been performed, and sending the traffic to the PSA; or when receiving a downlink traffic from the second specific tunnel (namely, the specific tunnel between the I-UPF and the PSA), namely, a traffic whose header carries the specific I-UPF tunnel info for PSA, sending the traffic to the MEC platform to perform local traffic steering control.

For example, processing logic of the I-UPF for a traffic C (where an uplink traffic is represented by an SDF 1, and a downlink traffic is represented by an SDF 2) on which the local traffic steering control is to be performed or has been performed is described in Table 9.2.

TABLE 9.2

| | Description information | |
|---|---|---|
| Identifier of the traffic | Source of the traffic | Forwarding action |
| SDF 1 | From an access device, where for example, a traffic direction is an uplink direction (UL direction) | Send the SDF 1 to the L-PSA |
| SDF 1 | From the first specific tunnel, that is, carrying the specific I-UPF tunnel info for L-PSA | Send the SDF 1 to the PSA |
| SDF 2 | From the second specific tunnel, that is, carrying the specific I-UPF tunnel info for PSA | Send the SDF 2 to the L-PSA |
| SDF 2 | From the L-PSA | Send the SDF 2 to the access device |

Step 1313: The SMF network element sends an N4 session modification request to the PSA, so that the PSA receives the N4 session modification request. The N4 session modification request carries a first forwarding rule, the specific I-UPF tunnel information for PSA, and the I-UPF tunnel information for PSA.

The first forwarding rule is used to indicate the PSA to send, to the I-UPF through the second specific tunnel between the PSA and the I-UPF, a downlink traffic on which the local traffic steering control is to be performed. Alternatively, it may be understood that the first forwarding rule is used to indicate the PSA to include the specific I-UPF tunnel information for PSA in a header of the downlink traffic on which the local traffic steering control is to be performed.

The traffic C on which the local traffic steering control is to be performed or has been performed is used as an example for description. Assuming that the uplink traffic of the traffic C is represented by the SDF 1, and the downlink traffic is represented by the SDF 2, processing logic of the PSA for the traffic C is as follows:

When the central DN does not need to perform traffic steering control on the traffic C, for specific content of the first forwarding rule, refer to Table 10.

TABLE 10

| | Description information | |
|---|---|---|
| Identifier of the traffic | Source of the traffic | Processing action |
| SDF 1 | From the I-UPF | Send the SDF 1 to the AS |
| SDF 2 | | Send the SDF 2 to the I-UPF through the second specific tunnel, that is, include the specific I-UPF tunnel info for PSA in a GTP-U header |

When the central DN needs to perform traffic steering control on the traffic C, for specific content of the first forwarding rule, refer to Table 11.

TABLE 11

| | Description information | |
|---|---|---|
| Identifier of the traffic | Source of the traffic | Processing action |
| SDF 1 | From the I-UPF | Send the SDF 1 to the central DN, and the central DN performs traffic steering control |
| SDF 2 | | After the central DN performs traffic steering control, send the SDF 2 to the I-UPF through the second specific tunnel, that is, include the specific I-UPF tunnel information for PSA in a GTP-U header |

Step 1314: The PSA returns an N4 session modification response to the SMF network element, so that the network element receives the N4 session modification response.

Step 1315: The SMF network element sends an N4 session modification request to the L-PSA, so that the L-PSA receives the N4 session modification request. The N4 session modification request carries a second forwarding rule, the I-UPF tunnel information for L-PSA, and the specific I-UPF tunnel information for L-PSA.

The second forwarding rule is used to indicate the L-PSA to send, to the I-UPF through the first specific tunnel between the L-PSA and the I-UPF, an uplink traffic on which the local traffic steering control has been performed. In other words, the second forwarding rule is used to indicate the L-PSA to include the specific I-UPF tunnel information for L-PSA in a header of the uplink traffic on which the local traffic steering control has been performed.

For example, processing logic of the L-PSA for the traffic C (where the uplink traffic is represented by the SDF 1, and the downlink traffic is represented by the SDF 2) on which the local traffic steering control is to be performed or has been performed is described in Table 12.

TABLE 12

| | Description information | |
|---|---|---|
| Identifier of the traffic | Source of the traffic | Processing action |
| SDF 1 | From the I-UPF | The MEC platform performs traffic steering control |
| SDF 1 | From the MEC platform, that is, after the MEC platform performs traffic steering control | Send the SDF 1 to the I-UPF through the first specific tunnel, and include the specific I-UPF tunnel information for L- PSA in a header of the SDF 1 |
| SDF 2 | From the I-UPF | The MEC platform performs traffic steering control |

TABLE 12-continued

Description information

| Identifier of the traffic | Source of the traffic | Processing action |
|---|---|---|
| SDF 2 | After the MEC platform performs traffic steering control | Send the SDF 2 to the I-UPF through the first specific tunnel, and include the specific I-UPF tunnel information for L- PSA in a header of the traffic SDF 2 |

The L-PSA sends, to the I-UPF through the first specific tunnel between the L-PSA and the I-UPF, the SDF 1 on which the local traffic steering control has been performed. In other words, a GTP-U header encapsulated by the L-PSA for the SDF 1 includes the specific I-UPF tunnel information for L-PSA.

Step 1316: The L-PSA returns an N4 session modification response to the SMF network element, so that the SMF network element receives the N4 session modification response.

It should be noted that, when the I-UPF and the L-PSA are co-located, step 1315 and step 1316 may be omitted.

With reference to FIG. 2e or FIG. 2f, FIG. 14A and FIG. 14B provides another traffic routing method according to this application. A difference between the method and the embodiment shown in FIG. 13A and FIG. 13B lies in that, in the embodiment shown in FIG. 14A and FIG. 14B, a specific tunnel is established between an L-PSA and a PSA. In the embodiment shown in FIG. 13A and FIG. 13B, transmission of a traffic between the L-PSA and the PSA needs to be forwarded by the I-UPF. The method includes the following steps.

Step 1401 to step 1405 are the same as step 1101 to step 1105. Details are not described herein again in this embodiment of this application.

Step 1406: The SMF network element sends an N4 session establishment request to the L-PSA, so that the L-PSA receives the N4 session establishment request. The N4 session establishment request carries first indication information. The first indication information is used to indicate the L-PSA to allocate specific tunnel information, that is, allocate specific L-PSA tunnel information for PSA. The specific tunnel information is used to establish a specific tunnel connection between the PSA and the L-PSA.

Step 1407: The L-PSA allocates the specific tunnel information based on the first indication information.

Step 1408: The L-PSA returns an N4 session establishment response to the SMF network element, so that the SMF network element receives the N4 session establishment response. The N4 session establishment response carries L-PSA tunnel information and the specific L-PSA tunnel information for PSA.

The L-PSA tunnel information is used to establish a tunnel connection between the I-UPF and the L-PSA. This parameter belongs to a conventional technology. Details are not described in the present invention.

Step 1409: The SMF network element sends an N4 session establishment request to the I-UPF, so that the I-UPF receives the N4 session establishment request. The N4 session establishment request carries RAN tunnel information, PSA tunnel information, and the L-PSA tunnel information.

Step 1410: The I-UPF sends an N4 session establishment response to the SMF network element, so that the SMF network element receives the N4 session establishment response from the I-UPF. The N4 session establishment response carries I-UPF tunnel information for PSA and I-UPF tunnel information for L-PSA.

Step 1411: The SMF network element sends an N4 session modification request to the PSA, so that the PSA receives the N4 session modification request. The N4 session modification request carries a first forwarding rule, second indication information, the specific L-PSA tunnel information for PSA, and the I-UPF tunnel information for PSA.

The first forwarding rule is used to indicate the PSA to send, to the L-PSA through the specific tunnel, a downlink traffic on which traffic steering control is to be performed. That is, a header of the downlink traffic carries the specific L-PSA tunnel information for PSA. The second indication information is used to indicate the PSA to allocate specific tunnel information, that is, indicate the PSA to allocate specific PSA tunnel information for L-PSA. The specific tunnel information is sent to the L-PSA via the SW, to establish a specific tunnel connection between the PSA and the L-PSA.

In a possible implementation, the second indication information and the first forwarding rule are a same parameter, that is, the second indication information is implemented by using the first forwarding rule.

For a specific example, refer to Table 10. Details are not described herein again.

Step 1412: The PSA allocates the specific tunnel information, namely, the specific PSA tunnel information for L-PSA, based on the second indication information, to establish the specific tunnel between the L-PSA and the PSA. The specific tunnel information between the L-PSA and the PSA is used by the PSA to identify a traffic that is from the L-PSA. That is, a traffic carrying the specific tunnel information may indicate that the traffic is from the PSA.

Step 1413: The PSA returns an N4 session modification response to the SMF network element, so that the SMF network element receives the N4 session modification response. The N4 session modification response carries the specific PSA tunnel information for L-PSA allocated by the PSA based on the second indication information.

Step 1414: The SMF network element sends an N4 session modification request to the L-PSA, so that the L-PSA receives the N4 session modification request. The N4 session modification request carries a second forwarding rule, the specific PSA tunnel information for L-PSA, and the I-UPF tunnel information for L-PSA.

The second forwarding rule is used to indicate the L-PSA to send, to the PSA through the specific tunnel, an uplink traffic on which local traffic steering control has been performed. That is, a header of the uplink traffic on which the local traffic steering control has been performed carries the specific PSA tunnel information for L-PSA. In addition, the second forwarding rule may further indicate the L-PSA to send, to a MEC platform, a downlink traffic received from the specific tunnel, and the MEC platform performs local traffic steering control on the downlink traffic. That is, a header of the downlink traffic carries the specific L-PSA tunnel information for PSA. The I-UPF tunnel information for L-PSA is used to establish a tunnel between the I-UPF and the L-PSA. That is, a header of a traffic sent by the L-PSA to the I-UPF carries the I-UPF tunnel information for L-PSA.

Step 1415: The PSA returns an N4 session modification response to the SMF network element.

Figure 15A:
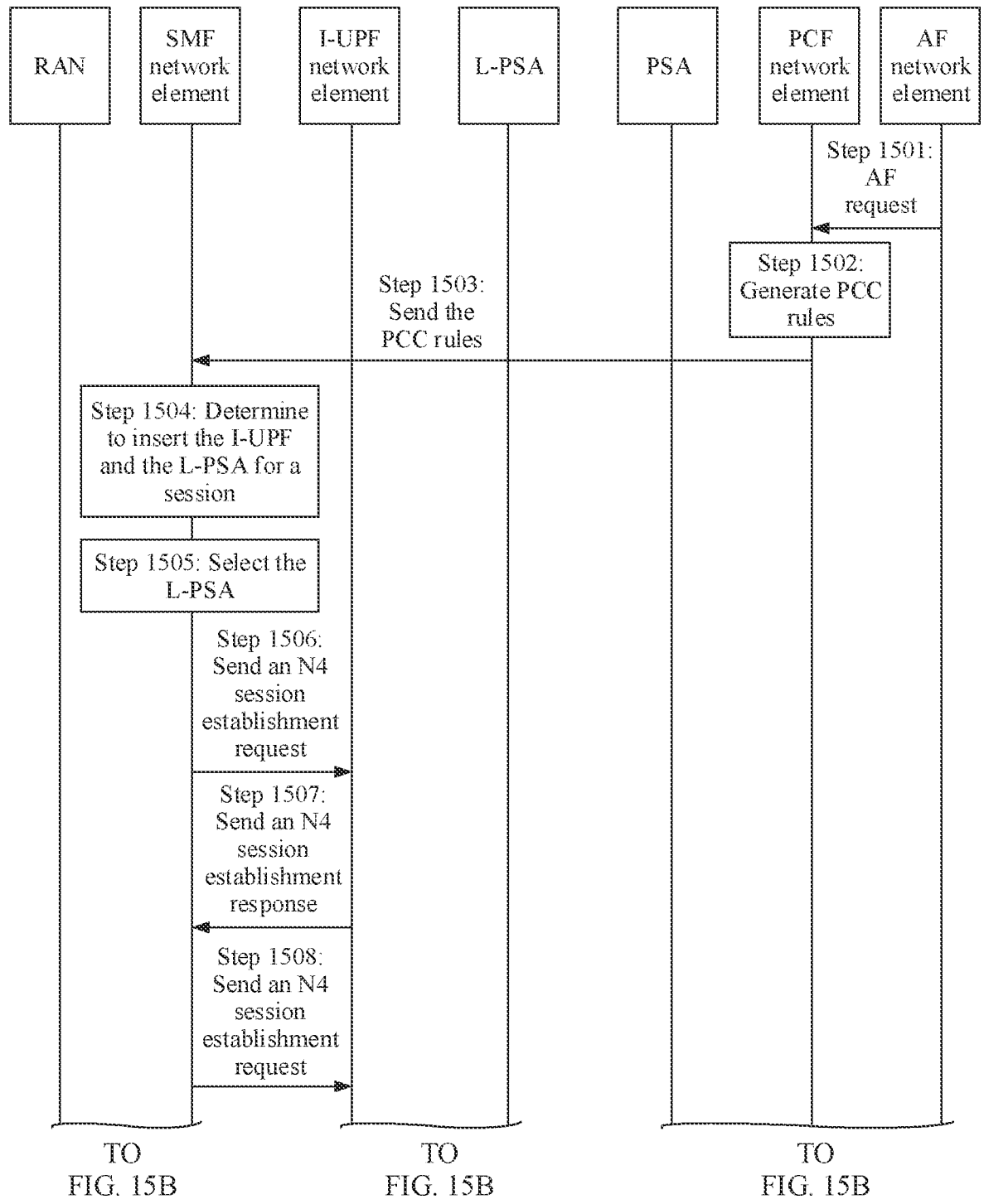
Figure 15B:
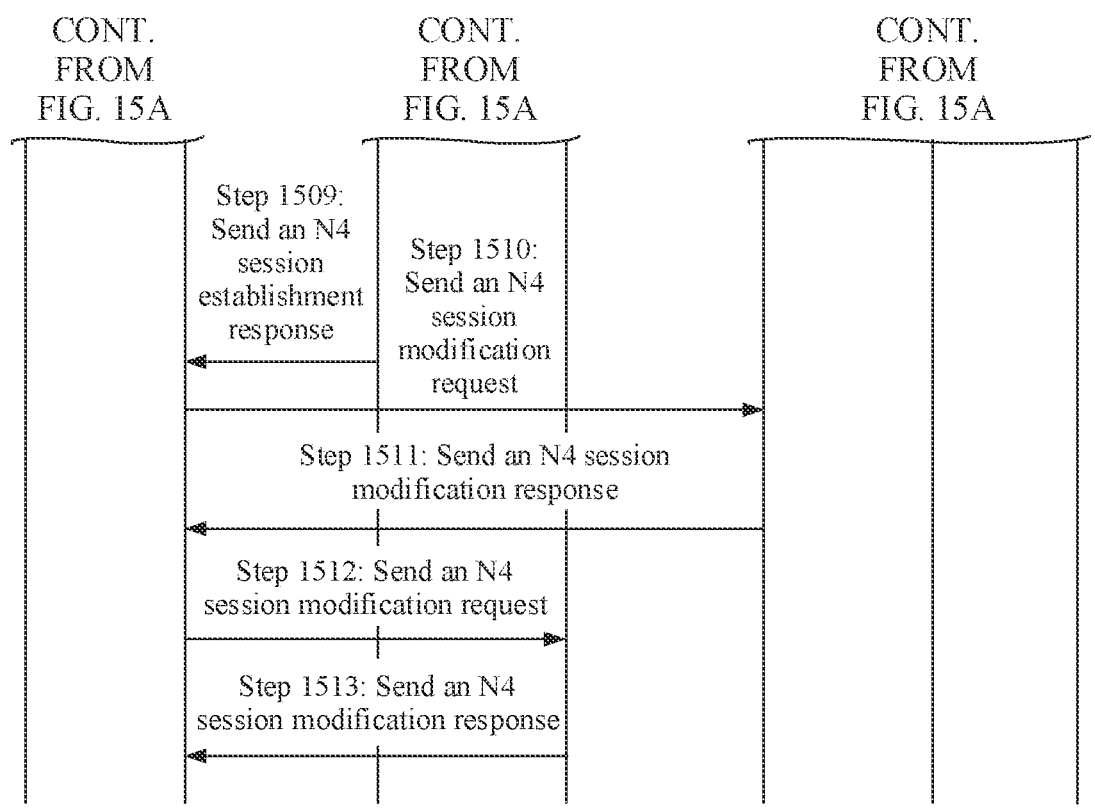

FIG. 15A and FIG. 15B show a specific implementation of another traffic routing method according to an embodiment of this application. The method includes the following steps.

Step 1501 to step 1505 are the same as step 1101 to step 1105.

Step 1506: The SMF network element sends an N4 session establishment request to the I-UPF, so that the I-UPF receives the N4 session establishment request. The N4 session establishment request carries L-PSA tunnel information.

Step 1507: The I-UPF sends an N4 session establishment response to the SMF network element, so that the SMF network element receives the N4 session establishment response from the I-UPF network element. The N4 session establishment response carries I-UPF tunnel information for PSA, I-UPF tunnel information for L-PSA, and I-UPF tunnel information for RAN. The I-UPF tunnel information for PSA is used to establish a tunnel between the PSA and the I-UPF. The I-UPF tunnel information for L-PSA is used to establish a tunnel between the L-PSA and the I-UPF. The I-UPF tunnel information for RAN is used to establish a tunnel between the RAN and the I-UPF.

Step 1508: The SMF network element sends an N4 session modification request to the I-UPF, so that the I-UPF receives the N4 session modification request. The N4 session modification request carries a routing rule. The routing rule is used to indicate the I-UPF to perform the following processing on a traffic on which local traffic steering control is to be performed or has been performed:

sending, to the L-PSA, an uplink traffic received from the RAN;

sending a received uplink traffic carrying a flag to the PSA, where this rule may also be described as follows: sending the traffic that is received from the L-PSA and that carries the flag to the PSA; or sending a received downlink traffic carrying a flag to the L-PSA, where this rule may also be described as follows: sending the traffic that is received from the PSA and that carries the flag to the L-PSA.

In addition, the routing rule is further used to indicate the I-UPF to send a received downlink traffic to the RAN.

The I-UPF determines a source of a traffic based on the following information:

If a header of the traffic carries the I-UPF tunnel information for RAN, the uplink traffic is from the RAN.

If a header of the traffic carries the I-UPF tunnel information for L-PSA, the uplink traffic is from the L-PSA.

If a header of the traffic carries the I-UPF tunnel information for PSA, the downlink traffic is from the PSA.

If a header of the traffic carries the I-UPF tunnel information for L-PSA, the downlink traffic is from the L-PSA.

For example, it is assumed that an uplink traffic of a traffic C on which first traffic steering control is to be performed is represented by an SDF 1, and a downlink traffic is represented by an SDF 2. A routing rule on the I-UPF is shown in Table 13.

TABLE 13

| Detection rule | Processing action |
| --- | --- |
| The (SDF 1) is (from the RAN, that is, a header of the SDF 1 carries the I-UPF tunnel information for RAN) | Send the SDF 1 to the L-PSA |
| (SDF 1) and (a header of the SDF 1 carries a flag), or (from the L-PSA, that is, the header carries the I-UPF tunnel information for L-PSA) and (the header carries the flag) | Send the SDF 1 to the PSA |
| (SDF 2) and (a header carries a flag), or (from the PSA, that is, the header carries the I-UPF tunnel information for PSA) and (the header carries the flag) | Send the SDF 2 to the L-PSA |

Step 1509: The I-UPF sends an N4 session modification response to the SMF network element, so that the SMF network element receives the N4 session modification response.

It should be noted that if the N4 session establishment request sent by the SMF network element to the I-UPF carries the routing rule, that is, includes the routing rule in step 1506, step 1508 and step 1509 may be omitted. Alternatively, the routing rule is not used in step 1508.

Step 1510: The SMF network element sends an N4 session modification request to the PSA, so that the PSA receives the N4 session modification request. The N4 session modification request carries a first forwarding rule and the I-UPF tunnel information for PSA.

The first forwarding rule is used to indicate the PSA to perform the following processing on a traffic on which local traffic steering control is to be performed:

when the central DN does not perform traffic steering control on the traffic on which the local traffic steering control is to be performed, adding a flag to a header of the traffic on which the local traffic steering control is to be performed, and sending the traffic to the I-UPF; or when the central DN needs to perform traffic steering control on the traffic on which the local traffic steering control is to be performed, adding a flag to a header of the downlink traffic on which the local traffic steering control is to be performed and on which the central DN has performed traffic steering control, and sending the traffic to the I-UPF.

Step 1511: The PSA returns an N4 session modification response to the SMF network element, so that the SMF network element receives the N4 session modification response.

Step 1512: The SMF network element sends an N4 session modification request to the L-PSA, so that the L-PSA receives the N4 session modification request. The N4 session modification request carries a second forwarding rule and the I-UPF tunnel information for L-PSA.

The second forwarding rule is used to indicate the L-PSA to perform the following processing on a traffic on which the local traffic steering control has been performed:

adding a flag to a header of a received traffic on which the local traffic steering control has been performed, and sending the traffic to the I-UPF.

Step 1513: The L-PSA returns an N4 session modification response to the SMF network element, so that the SMF network element receives the N4 session modification response.

Figure 16:
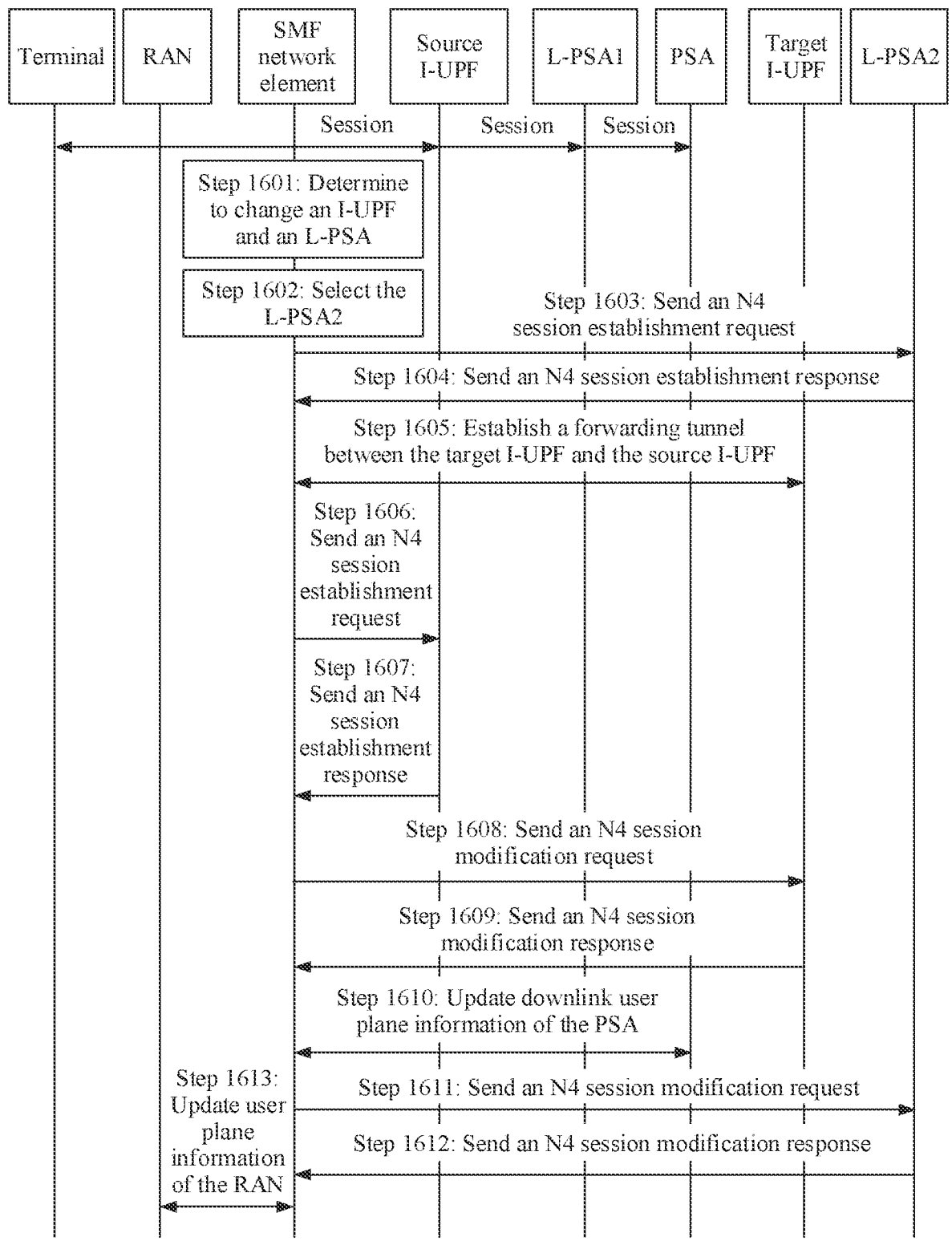

With reference to FIG. 9a, as shown in FIG. 16, an example in which the first traffic steering entity 20 is a source I-UPF, the second traffic steering entity 60 is a target I-UPF, the third function entity 70 is an L-PSA2, and the first function entity 30 is an L-PSA1 is used in FIG. 16. The method includes the following steps.

Step 1601: The SMF network element determines to change an I-UPF and an L-PSA.

Before step 1601, the terminal has established a session. A user plane connection 1 corresponding to the session is: Terminal→RAN→source I-UPF→L-PSA1→local traffic steering control→L-PSA1→PSA; and a user plane connection 2 is: Terminal→RAN→source I-UPF→PSA.

Step 1602: The SMF network element selects a target L-PSA, namely, the L-PSA2.

For example, when the terminal moves, the SMF selects the L-PSA2 based on a location of the terminal.

Step 1603: The SMF network element sends an N4 session establishment request to the L-PSA2, so that the L-PSA2 receives the N4 session establishment request.

Step 1604: The L-PSA2 sends an N4 session establishment response to the SMF network element, so that the SMF network element receives the N4 session establishment response from the L-PSA2. The N4 session establishment response carries L-PSA2 tunnel information.

The L-PSA2 tunnel information is tunnel information allocated by the L-PSA2.

Step 1605: The SMF network element selects the target I-UPF, and establishes a forwarding tunnel between the target I-UPF and the source I-UPF.

Specifically, step 1605 may be implemented in the following manner: The SMF network element sends an N4 session establishment request to the target I-UPF, so that the target I-UPF receives the N4 session establishment request. The N4 session establishment request carries the L-PSA2 tunnel information, RAN tunnel information, and PSA tunnel information.

It should be understood that an uplink tunnel between the target I-UPF and the L-PSA2 may be established by using the L-PSA2 tunnel information. For example, when sending a traffic, for example, a downlink traffic or an uplink traffic, to the L-PSA2, the target I-UPF includes the L-PSA2 tunnel information in a header of the traffic.

A downlink tunnel between the target I-UPF and the RAN may be established by using the RAN tunnel information. For example, when sending a downlink traffic to the RAN, the target I-UPF includes the RAN tunnel information in a header of the downlink traffic.

An uplink tunnel between the target I-UPF and the PSA may be established by using the PSA tunnel information. For example, when sending an uplink traffic to the PSA, the target I-UPF includes the PSA tunnel information in a header of the uplink traffic.

Then, the target I-UPF returns an N4 session establishment response to the SMF network element, so that the SMF network element receives the N4 session establishment response. The N4 session establishment response carries target I-UPF tunnel information for L-PSA1, target I-UPF tunnel information for source I-UPF, and target I-UPF tunnel information for L-PSA2.

The target I-UPF tunnel information for L-PSA1 is used to establish a downlink tunnel between the target I-UPF and the L-PSA1. In this way, a header of a traffic sent by the L-PSA1 to the target I-UPF may carry the target I-UPF tunnel information for L-PSA1.

The target I-UPF tunnel information for source I-UPF is used to establish a downlink tunnel between the source I-UPF and the target I-UPF. In this way, a header of a traffic sent by the source I-UPF to the target I-UPF may carry the target I-UPF tunnel information for source I-UPF.

The target I-UPF tunnel information for L-PSA2 is used to establish a downlink tunnel between the L-PSA2 and the target I-UPF. In this way, a header of a traffic sent by the L-PSA2 to the target I-UPF may carry the target I-UPF tunnel information for L-PSA2.

Step 1606: The SMF network element sends an N4 session modification request to the source I-UPF, so that the source I-UPF receives the N4 session modification request. The N4 session modification request carries target I-UPF tunnel information for source I-UPF.

Step 1607: The source I-UPF returns an N4 session modification response to the SMF network element, so that the SMF network element receives the N4 session modification response.

Optionally, the N4 session modification response carries source I-UPF tunnel information for target I-UPF. The source I-UPF tunnel information for target I-UPF is used to establish an uplink tunnel between the source I-UPF and the target I-UPF. In this way, a header of a traffic sent by the target I-UPF to the source I-UPF may carry the source I-UPF tunnel information for target I-UPF.

Step 1608: The SMF network element sends an N4 session modification request to the target I-UPF, so that the target I-UPF receives the N4 session modification request.

The N4 session modification request carries the source I-UPF tunnel information for target I-UPF and a forwarding rule.

The forwarding rule is used to indicate the target I-UPF to perform the following processing on a traffic on which local traffic steering control is to be performed: when receiving the traffic from the source I-UPF (that is, through a forwarding tunnel between the source I-UPF and the target I-UPF, that is, a header carrying the target I-UPF tunnel information for source I-UPF), sending the traffic to the RAN instead of to the L-PSA2. The forwarding rule is further used to indicate the target I-UPF to perform the following processing on the traffic on which the local traffic steering control is to be performed: when receiving the traffic from the PSA (that is, a header carrying the target I-UPF tunnel information for PSA), sending the traffic to the L-PSA2.

It should be noted that the forwarding rule may also be understood as indication information.

Step 1609: The target I-UPF returns an N4 session modification response to the SMF network element.

Step 1610: The SMF network element updates downlink user plane information of the PSA. Specifically, the SMF sends the N4 session modification request carrying the target I-UPF tunnel information for PSA to the PSA. The PSA returns the N4 session modification response.

Step 1611: The SMF network element sends an N4 session modification request to the L-PSA2, so that the L-PSA2 receives the N4 session modification request. The N4 session modification request carries target I-UPF tunnel information for L-PSA2.

Step 1612: The L-PSA2 returns an N4 session modification response to the SMF network element.

In this case, a transmission path of the downlink traffic on which the local traffic steering control is to be performed is as follows.

(1) Downlink traffic path 1
PSA→target I-UPF→L-PSA2→traffic steering control→L-PSA2→target UPF→(RAN→terminal (2) Downlink traffic path 2
PSA→source I-UPF→L-PSA1→traffic steering control→L-PSA1→source I-UPF→target I-UPF→RAN→terminal On the downlink traffic path 2, the target I-UPF forwards, to the RAN, the traffic from the source I-UPF. The traffic does not need to be sent to the L-PSA2 for local traffic steering control.

Step 1613: The SMF network element updates uplink user plane information of the RAN. Specifically, the SMF network element sends an N2 request carrying target I-UPF tunnel information for RAN to the RAN via the AMF network element. The RAN returns an N2 response.

In conclusion, in FIG. 16, although the I-UPF changes from the source I-UPF to the target I-UPF, the PSA may further send the downlink traffic C (where the downlink traffic C is a traffic on which the first traffic steering control is to be performed) to the source I-UPF (for example, the downlink traffic path 1). Therefore, when receiving the downlink traffic C from the PSA, the source I-UPF may still send the downlink traffic C to the L-PSA1, and a MEC platform corresponding to the L-PSA1 performs traffic steering control on the downlink traffic C. After the traffic steering control has been performed on the downlink traffic C, the source I-UPF sends, to the target I-UPF, the downlink traffic C on which the traffic steering control has been performed, and sends the downlink traffic C back to the RAN.

Figure 17:
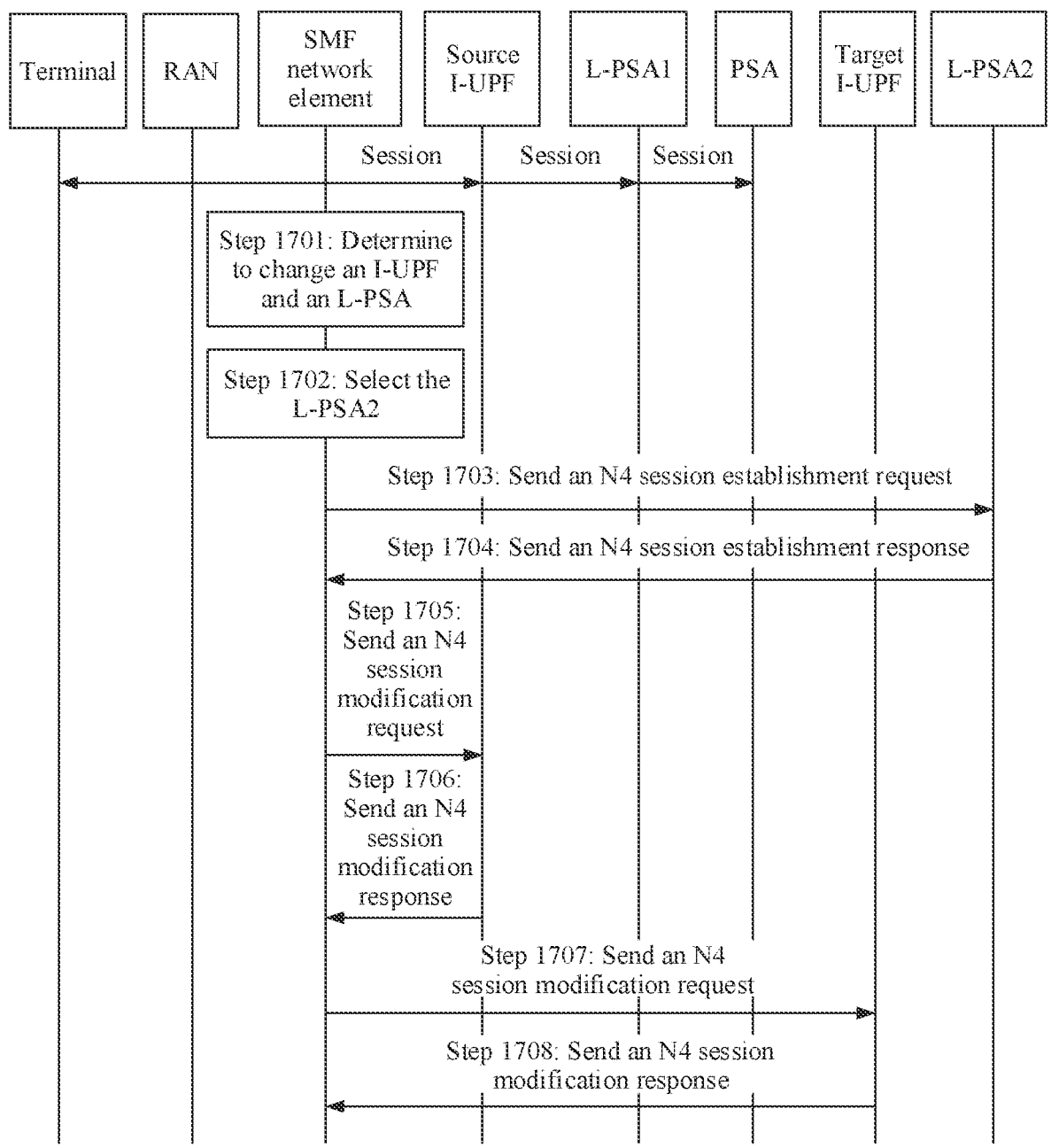

FIG. 17 shows another traffic routing method according to an embodiment of this application. A difference between the method and that in FIG. 16 lies in that in FIG. 17, a target I-UPF sends a downlink traffic to an L-PSA2, so that a MEC corresponding to the L-PSA2 performs traffic steering control on the traffic. A source I-UPF may forward a downlink traffic from a PSA to the target I-UPF, and does not need to forward the downlink traffic from the PSA to an L-PSA for traffic steering control by a MEC corresponding to the L-PSA1.

Step 1701 to step 1704 are the same as step 1601 to step 1604.

Step 1705: The SMF network element sends an N4 session modification request to the source I-UPF, so that the source I-UPF receives the N4 session modification request. The N4 session modification request carries target I-UPF tunnel information for source I-UPF and a forwarding rule.

The forwarding rule is used to indicate the source I-UPF to perform the following processing on a traffic on which local traffic steering control is to be performed: When receiving the downlink traffic from the PSA, the source I-UPF sends the downlink traffic to the target I-UPF, that is, sends the downlink traffic to the target I-UPF through a forwarding tunnel between the source I-UPF and the target I-UPF. In other words, the source I-UPF encapsulates the target I-UPF tunnel information for source I-UPF in a header of the downlink traffic.

It may be understood that the forwarding rule in step 1705 includes a detection rule and a forwarding action. The detection rule includes description information of the traffic on which the local traffic steering control is to be performed. The forwarding action is used to indicate that the traffic determined based on the description information of the traffic on which the local traffic steering control is to be performed is forwarded to the target I-UPF. The source I-UPF does not need to determine whether the downlink traffic from the PSA is a traffic on which the local traffic steering control is to be performed. Once determining that the downlink traffic from the PSA is received, the source I-UPF forwards the downlink traffic from the PSA to the target I-UPF.

Step 1706: The source I-UPF returns an N4 session modification response to the SMF network element, so that the SMF network element receives the N4 session modification response. Optionally, the N4 session modification response carries source I-UPF tunnel information for target I-UPF.

Step 1707: The SMF network element sends an N4 session modification request to the target I-UPF, so that the target I-UPF receives the N4 session modification request. The N4 session modification request carries the source I-UPF tunnel info information for target I-UPF and a forwarding rule.

The forwarding rule is used to indicate the target I-UPF to perform the following processing on a traffic on which local traffic steering control is to be performed: regardless of the traffic received from the source I-UPF (that is, through a forwarding tunnel between the source I-UPF and the target I-UPF, that is, a header carrying the target I-UPF tunnel information for source I-UPF) or received from the PSA (that is, a header carries target I-UPF tunnel information for PSA), sending the traffic to the L-PSA2.

Step 1708: The target I-UPF returns an N4 session modification response to the SMF network element.

It may be understood that the forwarding rule in step 1707 includes a detection rule and a forwarding action. The detection rule includes description information of the traffic on which the local traffic steering control is to be performed. The forwarding action is used to indicate that the traffic determined based on the description information of the traffic on which the local traffic steering control is to be performed is forwarded to the L-PSA2. The target I-UPF does not need to determine whether the downlink traffic from the PSA or the downlink traffic from the source I-UPF is a traffic on which the local traffic steering control is to be performed. Once determining that description information of the downlink traffic received from the PSA or the source I-UPF exists in the detection rule, the target I-UPF forwards the downlink traffic to the L-PSA2.

In embodiments of this application, when a MEC performs local traffic steering control on a traffic, and a central DN also performs traffic steering control on the traffic, how to deliver traffic steering information such as a traffic policy identifier is to be resolved.

Idea 1: After receiving the traffic steering policy information from a PCF network element, an SMF network element delivers traffic steering information 1 to an L-PSA, and delivers traffic steering information 2 to a PSA. Specifically, the SMF network element determines, based on a DNAI and the traffic steering policy information, to deliver the traffic steering information 1 to the L-PSA and deliver the traffic steering information 2 to the PSA.

For example, a traffic steering policy corresponds to an uplink direction of a traffic C, namely, an SDF 1, and the SDF 1 is processed by an SF 1, an SF 2, an SF 3, and an SF 4; and in a downlink direction, the SDF 1 is processed by the SF 3, the SF 4, an SF 5, and the SF 2. The SF 1 and the SF 2 are located on the MEC platform, and the L-PSA can access the MEC platform. The SF 3 and the SF 4 are located on the central DN, and the PSA can access the central DN.

Therefore, the traffic steering information 1 delivered by the SMF network element to the L-PSA (which is described by using only an uplink as an example) is: The SDF 1 needs to be processed by the SF 1 and the SF 2; and the traffic steering information 2 delivered to the PSA is: The SDF 1 needs to be processed by the SF 3 and the SF 4.

Idea 2: After receiving the traffic steering policy information from a PCF network element, an SMF network element sends the traffic steering information to an L-PSA, or delivers the traffic steering information to a PSA. That is, the SMF network element separately delivers corresponding traffic steering information to the L-PSA and the PSA. The foregoing example is used for description. In this case, in an uplink direction, the SMF network element delivers the traffic steering information to the L-PSA, and the traffic steering information indicates that an SDF 1 needs to be processed by an SF 1, an SF 2, an SF 3, and an SF 4. In a downlink direction, the SMF network element delivers the traffic steering information to the PSA, and the traffic steering information indicates that an SDF 2 needs to be processed by the SF 3, the SF 4, an SF 5, and the SF 2.

The foregoing mainly describes the solutions in embodiments of this application from a perspective of interaction between network elements. It may be understood that to implement the foregoing functions, the network elements, for example, the session management network element, the first traffic steering entity, the first function entity, and the second function entity, include hardware structures and/or software modules for performing the corresponding functions. A person skilled in the art should be easily aware that, in combination with examples of units and algorithm steps described in embodiments disclosed in this specification, this application can be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the session management network element, the first traffic steering entity, the first function entity, and the second function entity each may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, in embodiments of this application, division into the units is an example, and is merely logical function division. During actual implementation, another division manner may be used.

The foregoing describes the methods in embodiments of this application with reference to FIG. 6 to FIG. 17. The following describes a communication apparatus that is provided in an embodiment of this application and that performs the foregoing methods. A person skilled in the art may understand that the method and the apparatus may be mutually combined and referenced. The communication apparatus provided in this embodiment of this application may perform the steps performed by the session management network element or the first traffic steering entity in the foregoing communication methods.

Figure 18:
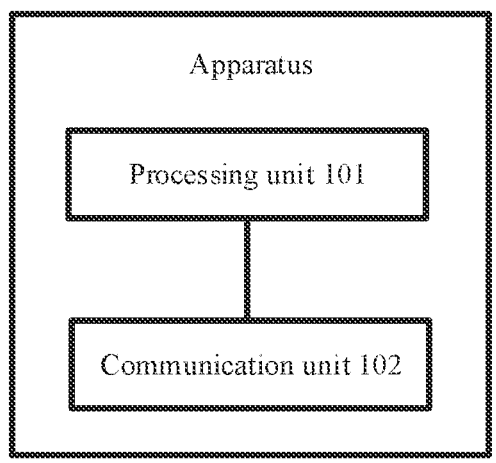
FIG. 18 is a schematic diagram of a structure of a communication apparatus according to an embodiment of this application.

When an integrated unit is used, FIG. 18 shows a communication apparatus in the foregoing embodiments. The communication apparatus may include a communication unit 102 and a processing unit 101.

In an example, the communication apparatus is a session management network element, or a chip used in the session management network element. In this case, the processing unit 101 is configured to support the communication apparatus in performing step 601 performed by the session management network element in FIG. 6 in the foregoing embodiments. The communication unit 102 is configured to support the communication apparatus in performing the sending action performed by the session management network element in step 602 in FIG. 6.

In a possible embodiment, the communication unit 102 is further configured to support the communication apparatus in performing the receiving action performed by the session management network element in step 606, the sending actions performed by the session management network element in (step 607, step 610, step 611, step 612, step 613, step 616, and step 617), the receiving action performed by the session management network element in step 608 or step 609, and the sending action performed by the session management network element in step 611 in the foregoing embodiments. The processing unit 101 is further configured to support the communication apparatus in performing the processing actions performed by the session management network element in step 609 and step 614 in the foregoing embodiments.

In another example, the communication apparatus is a first traffic steering entity, or a chip used in the first traffic steering entity. In this case, the communication unit 102 is configured to support the communication apparatus in performing the receiving action performed by the first traffic steering entity in step 602 in the foregoing embodiments. The processing unit 101 is configured to support the communication apparatus in performing the processing action performed by the first traffic steering entity in step 603 in the foregoing embodiments.

In a possible embodiment, the communication unit 102 is further configured to support the communication apparatus in performing the receiving action performed by the first traffic steering entity in step 607 and the receiving action performed by the first traffic steering entity in step 608 in the foregoing embodiments.

In still another example, the communication apparatus is a session management network element, or a chip used in the session management network element. The communication unit 102 is configured to support the communication apparatus in performing the sending action performed by the session management network element in step 1002 in the foregoing embodiments. The processing unit 101 is configured to support the communication apparatus in performing the processing action performed by the session management network element in step 1001 in the foregoing embodiments.

In a possible embodiment, the communication unit 102 is further configured to support the communication apparatus in performing the sending actions performed by the session management network element in step 1004, step 1006, step 1007, and step 1010 in the foregoing embodiments. The communication unit 102 is further configured to support the communication apparatus in performing the receiving action performed by the session management network element in step 1009. Alternatively, the processing unit 101 is configured to support the communication apparatus in performing the action of independently obtaining, by the session management network element, information used to establish a specific tunnel in step 1009.

Figure 19:
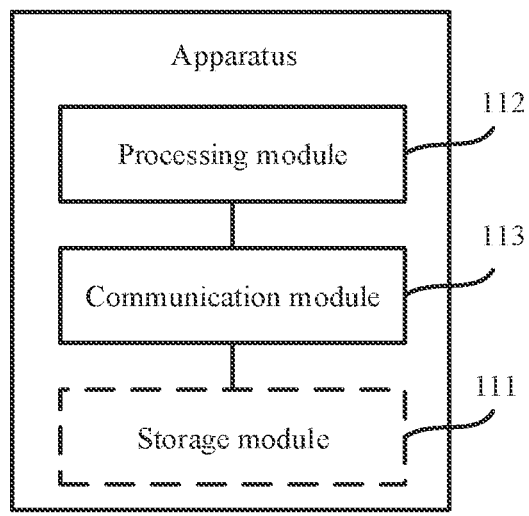
FIG. 19 is a schematic diagram of a structure of another communication apparatus according to an embodiment of this application.

When an integrated unit is used, FIG. 19 is a schematic diagram of a possible logical structure of the communication apparatus in the foregoing embodiment. The communication apparatus includes a processing module 112 and a communication module 113. The processing module 112 is configured to control and manage actions of the communication apparatus. For example, the processing module 112 is configured to perform a step of information/data, processing performed by the communication apparatus. The communication module 113 is configured to support the communication apparatus in performing a step of sending or receiving information/data.

In a possible embodiment, the communication apparatus may further include a storage module 111, configured to store program code and data of the communication apparatus.

In an example, the communication apparatus is a session management network element, or a chip used in the session management network element. In this case, the processing module 112 is configured to support the communication apparatus in performing step 601 performed by the session management network element in FIG. 6 in the foregoing embodiments. The communication module 113 is configured to support the communication apparatus in performing the sending action performed by the session management network element in step 602 in FIG. 6.

In a possible embodiment, the communication module 113 is further configured to support the communication apparatus in performing the receiving action performed by the session management network element in step 606, the sending actions performed by the session management network element in (step 607, step 610, step 611, step 612, step 613, step 616, and step 617), the receiving action performed by the session management network element in step 608 or step 609, and the sending action performed by the session management network element in step 611 in the foregoing embodiments. The processing module 112 is further configured to support the communication apparatus in performing the processing actions performed by the session management network element in step 609 and step 614 in the foregoing embodiments.

In another example, the communication apparatus is a first traffic steering entity, or a chip used in the first traffic steering entity. In this case, the communication module 113 is configured to support the communication apparatus in performing the receiving action performed by the first traffic steering entity in step 602 in the foregoing embodiments. The processing module 112 is configured to support the communication apparatus in performing the processing action performed by the first traffic steering entity in step 603 in the foregoing embodiments.

In a possible embodiment, the communication module 113 is further configured to support the communication apparatus in performing the receiving action performed by the first traffic steering entity in step 607 and the receiving action performed by the first traffic steering entity in step 608 in the foregoing embodiments.

In still another example, the communication apparatus is a session management network element, or a chip used in the session management network element. The communication module 113 is configured to support the communication apparatus in performing the sending action performed by the session management network element in step 1002 in the foregoing embodiments. The processing module 112 is configured to support the communication apparatus in performing the processing action performed by the session management network element in step 1001 in the foregoing embodiments.

In a possible embodiment, the communication module 113 is further configured to support the communication apparatus in performing the sending actions performed by the session management network element in step 1004, step 1006, step 1007, and step 1010 in the foregoing embodiments. The communication module 113 is further configured to support the communication apparatus in performing the receiving action performed by the session management network element in step 1009. Alternatively, the processing module 112 is configured to support the communication apparatus in performing the action of independently obtaining, by the session management network element, information used to establish a specific tunnel in step 1009.

The processing module 112 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processing module 112 may implement or execute logical blocks, modules, and circuits in various examples described with reference to content disclosed in this application. Alternatively, the processor may be a combination of processors implementing a computing function, for example, a combination of one or more microprocessors, or a combination of a digital signal processor and a microprocessor. The communication module 113 may be a transceiver, a transceiver circuit, a communication interface, or the like. The storage module 111 may be a memory.

When the processing module 112 is the processor 41 or the processor 45, the communication module 113 is the communication interface 43, and the storage module 111 is the memory 42, the communication apparatus in this application may be the communication device shown in FIG. 4.

Figure 20:
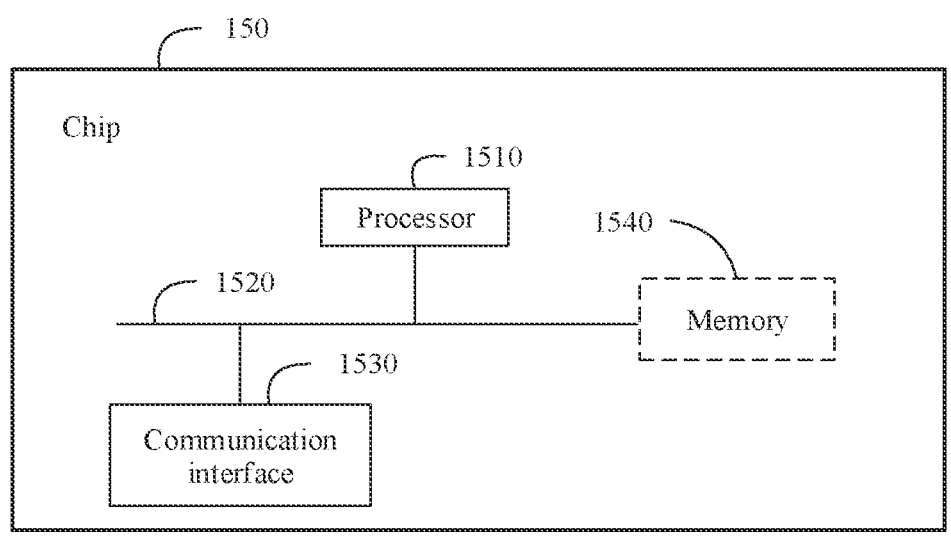
FIG. 20 is a schematic diagram of a structure of a chip according to an embodiment of this application.

FIG. 20 is a schematic diagram of a structure of a chip 150 according to an embodiment of this application. The chip 150 includes one or more (including two) processors 1510 and a communication interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an executable module or a data structure, a subset thereof, or an extended set thereof.

In this embodiment of this application, a corresponding operation is performed by invoking the operation instructions (where the operation instructions may be stored in an operating system) stored in the memory 1540.

In a possible implementation, structures of chips used in a session management network element and a first traffic steering entity are similar, and different apparatuses may implement respective functions by using different chips.

The processor 1510 controls a processing operation of any one of the session management network element or the first traffic steering entity. The processor 1510 may also be referred to as a central processing unit (CPU).

The memory 1540 may include a read-only memory and a random access memory, and provide instructions and data for the processor 1510. A part of the memory 1540 may further include an NVRAM. For example, in an application, the memory 1540, the communication interface 1530, and the memory 1540 are coupled together by using a bus system 1520. The bus system 1520 may further include a power bus, a control bus, a status signal bus, and the like in addition to a data bus. However, for clear description, various buses are marked as the bus system 1520 in FIG. 20.

The methods disclosed in the foregoing embodiments of this application may be applied to the processor 1510, or may be implemented by the processor 1510. The processor 1510 may be an integrated circuit chip, and has a signal processing capability. In an implementation process, steps in the foregoing methods may be implemented by using a hardware integrated logical circuit in the processor 1510, or by using instructions in a form of software. The processor 1510 may be a general-purpose processor, a digital signal processor (DSP), an ASIC, a field-programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communication interface 1530 is configured to perform the receiving and sending steps of the session management network element and the first traffic steering entity in the embodiments shown in FIG. 6 to FIG. 17. The processor 1510 is configured to perform the processing steps of the session management network element and the first traffic steering entity in the embodiments shower ire FIG. 6 to FIG. 17.

The communication unit may be a communication interface of the apparatus, and is configured to receive a signal from another apparatus. For example, when the apparatus is implemented as a chip, the communication unit is a communication interface used by the chip to receive a signal from another chip or apparatus or send a signal.

According to one aspect, an embodiment of this application may provide a computer-readable storage medium. The computer-readable storage medium stores instructions. When the instructions are run, the functions of the session management network element in FIG. 6 to FIG. 9 and FIG. 11A and FIG. 11B to FIG. 17 are implemented.

According to another aspect, an embodiment of this application may provide a computer-readable storage medium. The computer-readable storage medium stores instructions. When the instructions are run, the functions of the session management network element in FIG. 10 are implemented.

According to still another aspect, an embodiment of this application may provide a computer-readable storage medium. The computer-readable storage medium stores instructions. When the instructions are run, the functions of the first traffic steering entity in FIG. 6 to FIG. 17 are implemented.

According to one aspect, a computer program product including instructions is provided. The computer program product includes the instructions. When the instructions are run, the functions of the session management network element in FIG. 6 to FIG. 17 are implemented.

According to another aspect, a computer program product including instructions is provided. The computer program product includes the instructions. When the instructions are run, the functions of the first traffic steering entity in FIG. 6 to FIG. 17 are implemented.

According to one aspect, a chip is provided. The chip is used in a session management network element. The chip includes at least one processor and a communication interface, the communication interface is coupled to the at least one processor, and the processor is configured to run instructions, to implement the functions of the session management network element in FIG. 6 to FIG. 17.

According to another aspect, a chip is provided. The chip is used in a first splitting entity. The chip includes at least one processor and a communication interface, the communication interface is coupled to the at least one processor, and the processor is configured to run instructions, to implement the functions of the first traffic steering entity in FIG. 6 to FIG. 17.

An embodiment of this application provides a communication system. The communication system includes a session management network element and a first traffic steering entity. The session management network element is configured to perform any step performed by the session management network element in FIG. 6 to FIG. 17, and the first traffic steering entity is configured to perform any step performed by the first traffic steering entity in FIG. 6 to FIG. 17.

All or some of the foregoing embodiments may be implemented by using software, hardware, firmware, or any combination thereof. When being implemented by using the software, all or some of embodiments may be implemented in a form of a computer program product. The computer program product includes one or more computer programs or instructions. When the computer programs or the instructions are loaded and executed on a computer, the procedures or functions in embodiments of this application are completely or partially generated. The computer may be a general-purpose computer, a special-purpose computer, a computer network, a network device, user equipment, or another programmable apparatus. The computer programs or the instructions may be stored in a computer-readable storage medium or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium such as a floppy disk, a hard disk, or a magnetic tape, may be an optical medium such as a digital video disc (DVD), or may be a semiconductor medium such as a solid-state drive (SSD).

Although this application is described with reference to embodiments, in a process of implementing this application that claims protection, a person skilled in the art may understand and implement another variation of the disclosed embodiments by viewing the accompanying drawings, disclosed content, and the appended claims. In the claims. "comprising" does not exclude another component or another step, and "a" or "one" does not exclude a meaning of plurality. A single processor or another unit may implement several functions enumerated in the claims. Some measures are recorded in dependent claims that are different from each other, but this does not mean that the measures cannot be combined to produce a good effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of and all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A traffic routing method, comprising:
   determining, by a session management network element, a routing rule, wherein the routing rule indicates a first traffic steering entity to send a first traffic to a first function entity, or send a second traffic to a second function entity or an access device, wherein the first traffic is a traffic on which first traffic steering control is to be performed, and the traffic on which first traffic steering control is to be performed is a traffic that has not been processed by a service function on a mobile edge computing (MEC) platform, and the second traffic is a traffic on which the first traffic steering control has been performed, and the traffic on which the first traffic steering control has been performed is a traffic that has been processed by the service function on the MEC platform, the first function entity is for communicating with the MEC platform, the second function entity is for communicating with a central data network, wherein the first traffic is a downlink traffic that is in a session and that is from the central data network, or the second traffic is an uplink traffic that is in the session; and
   sending, by the session management network element, the routing rule to the first traffic steering entity in a session management process.

2. The method according to claim 1, wherein the routing rule comprises description information of the first traffic and information about the first function entity associated with the description information of the first traffic, or description information of the second traffic and information about the second function entity or the access device associated with the description information of the second traffic, and wherein the description information comprises source information of the first traffic or source information of the second traffic.

3. The method according to claim 2, wherein the routing rule comprises any one or both of the following information:
   when the description information of the first traffic indicates that the first traffic is from the access device or the second function entity, the first traffic steering entity sends the first traffic to the first function entity; or
   when the description information of the second traffic indicates that the second traffic is from the first function entity, the first traffic steering entity sends the second traffic to the access device or the second function entity.

4. The method according to claim 1, wherein the routing rule indicates the first traffic steering entity to send the first traffic from a second tunnel to the first function entity, or indicates the first traffic steering entity to send the second traffic from a first tunnel to the second function entity, and wherein:
   the second tunnel is located between the first traffic steering entity and the second function entity, and the first tunnel is located between the first traffic steering entity and the first function entity.

5. The method according to claim 4, wherein the method further comprises:
   obtaining, by the session management network element, one or both of first tunnel information and second tunnel information, wherein the first tunnel information is used to establish the first tunnel, and the second tunnel information is used to establish the second tunnel.

6. The method according to claim 5, wherein the method further comprises:
   sending, by the session management network element, the second tunnel information and a first forwarding rule to the second function entity, wherein the first forwarding rule indicates the second function entity to transmit the first traffic to the first traffic steering entity through the second tunnel.

7. The method according to claim 5, wherein the method further comprises:
   sending, by the session management network element, the first tunnel information and a second forwarding rule to the first function entity, wherein the second forwarding rule indicates the first function entity to transmit the second traffic to the first traffic steering entity through the first tunnel.

8. The method according to claim 5, wherein before the obtaining, by the session management network element, one or both of first tunnel information and second tunnel information, the method further comprises:
   sending, by the session management network element, first indication information to the first traffic steering entity, wherein the first indication information indicates the first traffic steering entity to allocate one or both of the first tunnel information and the second tunnel information; and
   the obtaining, by the session management network element, one or both of first tunnel information and second tunnel information comprises:
      receiving, by the session management network element, one or both of the first specific tunnel information and the second tunnel information from the first traffic steering entity.

9. The method according to claim 1, wherein:
   the first traffic is associated with a first identifier, and the routing rule indicates the first traffic steering entity to send the traffic associated with the first identifier to the first function entity; or
   the second traffic is associated with a second identifier, and the routing rule indicates the first traffic steering entity to send the traffic associated with the second identifier to the second function entity.

10. The method according to claim 9, wherein the method further comprises:
    sending, by the session management network element, third indication information to the second function entity, wherein the third indication information indicates the second function entity to comprise the first identifier in a header of the first traffic.

11. The method according to claim 9, wherein the method further comprises:
    sending, by the session management network element, fourth indication information to the first function entity, wherein the fourth indication information indicates the first function entity to comprise the second identifier in a header of the second traffic.

12. The method according to claim 1, wherein the method further comprises:
    determining, by the session management network element, that a traffic steering entity changes from the first traffic steering entity to a second traffic steering entity; and
    sending, by the session management network element, fifth indication information to the second traffic steering entity, wherein the fifth indication information indicates the second traffic steering entity to perform any one or both of the following steps:
sending a third traffic from the first traffic steering entity to the access device, wherein the third traffic is a traffic on which the first traffic steering control has been performed; or
sending a fourth traffic from the second function entity to a third function entity corresponding to the second traffic steering entity, wherein the fourth traffic is a traffic on which the first traffic steering control is to be performed.

13. The method according to claim 1, wherein the method further comprises:
determining, by the session management network element, that a traffic steering entity changes from the first traffic steering entity to a second traffic steering entity; and
sending, by the session management network element, sixth indication information to the first traffic steering entity or the second function entity, wherein the sixth indication information indicates the first traffic steering entity or the second function entity to send a fifth traffic to the second traffic steering entity, wherein the fifth traffic is a traffic on which the first traffic steering control is to be performed; and
sending, by the session management network element, seventh indication information to the second traffic steering entity, wherein the seventh indication information indicates the second traffic steering entity to send the fifth traffic to a third function entity corresponding to the second traffic steering entity.

14. An apparatus, comprising:
at least one processor;
one or more non-transitory computer-readable storage media coupled to the at least one processor and storing programming instructions for execution by the at least one processor, wherein the programming instructions, when executed, cause the apparatus to perform operations comprising:
determining a routing rule, wherein the routing rule indicates a first traffic steering entity to send a first traffic to a first function entity, or send a second traffic to a second function entity or an access device, wherein the first traffic is a traffic on which first traffic steering control is to be performed, and the traffic on which first traffic steering control is to be performed is a traffic that has not been processed by a service function on a mobile edge computing (MEC) platform, and the second traffic is a traffic on which the first traffic steering control has been performed, and the traffic on which the first traffic steering control has been performed is a traffic that has been processed by the service function on the MEC platform, the first function entity is for communicating with the MEC platform, the second function entity is for communicating with a central data network, wherein the first traffic is a downlink traffic that is in a session and that is from the central data network, or the second traffic is an uplink traffic that is in the session; and
sending the routing rule to the first traffic steering entity in a session management process.

15. The apparatus according to claim 14, wherein the routing rule comprises description information of the first traffic and information about the first function entity associated with the description information of the first traffic, or description information of the second traffic and information about the second function entity or the access device associated with the description information of the second traffic, and wherein the description information comprises source information of the first traffic or source information of the second traffic.

16. The apparatus according to claim 15, wherein the routing rule comprises any one or both of the following information:
when the description information of the first traffic indicates that the first traffic is from the access device or the second function entity, the first traffic steering entity sends the first traffic to the first function entity; or
when the description information of the second traffic indicates that the second traffic is from the first function entity, the first traffic steering entity sends the second traffic to the access device or the second function entity.

17. The apparatus according to claim 14, wherein the routing rule indicates the first traffic steering entity to send the first traffic from a second tunnel to the first function entity, or indicates the first traffic steering entity to send the second traffic from a first tunnel to the second function entity, and wherein:
the second tunnel is located between the first traffic steering entity and the second function entity, and the first tunnel is located between the first traffic steering entity and the first function entity.

18. The apparatus according to claim 17, wherein the operations further comprise:
obtaining one or both of first tunnel information and second tunnel information, wherein the first tunnel information is used to establish the first tunnel, and the second tunnel information is used to establish the second tunnel.

19. The apparatus according to claim 18, wherein the operations further comprise:
sending the second tunnel information and a first forwarding rule to the second function entity, wherein the first forwarding rule indicates the second function entity to transmit the first traffic to the first traffic steering entity through the second tunnel.

20. The apparatus according to claim 18, wherein the operations further comprise:
sending the first tunnel information and a second forwarding rule to the first function entity, wherein the second forwarding rule indicates the first function entity to transmit the second traffic to the first traffic steering entity through the first tunnel.

* * * * *

UNITED STATES PATENT AND TRADEMARK OFFICE
CERTIFICATE OF CORRECTION

PATENT NO. : 11,963,032 B2
APPLICATION NO. : 17/738782
DATED : April 16, 2024
INVENTOR(S) : Yongcui Li, Ao Lei and Hui Ni It is certified that error appears in the above-identified patent and that said Letters Patent is hereby corrected as shown below:

In the Claims

Column 72, Line 34, Claim 8, after "first" please delete "specific".

Signed and Sealed this
Twentieth Day of August, 2024

Katherine Kelly Vidal
*Director of the United States Patent and Trademark Office*